US008798974B1

(12) United States Patent
Nunns

(10) Patent No.: US 8,798,974 B1
(45) Date of Patent: Aug. 5, 2014

(54) METHOD AND SYSTEM FOR INTERACTIVE GEOLOGICAL INTERPRETATION, MODELING AND RESTORATION

(76) Inventor: Alan Gordon Nunns, Danville, CA (US)

(*) Notice: Subject to any disclaimer, the term of this patent is extended or adjusted under 35 U.S.C. 154(b) by 518 days.

(21) Appl. No.: 13/231,879

(22) Filed: Sep. 13, 2011

Related U.S. Application Data

(60) Provisional application No. 61/382,924, filed on Sep. 15, 2010.

(51) Int. Cl.
*G06G 7/48* (2006.01)
*G01V 99/00* (2009.01)
*G06F 7/48* (2006.01)

(52) U.S. Cl.
CPC .......... *G01V 99/005* (2013.01); *G01V 2210/64* (2013.01); *G01V 2210/66* (2013.01); *G01V 2210/72* (2013.01); *G01V 2210/74* (2013.01); *G06F 2217/16* (2013.01)
USPC ................................................ 703/6; 702/16

(58) Field of Classification Search
CPC . G06F 17/50; G06F 17/5009; G06F 2217/16; G09B 23/40; G01V 99/005; G01V 1/28; G01V 1/282; G01V 2210/64; G01V 2210/66; G01V 2210/72; G01V 2210/74
USPC .................................... 703/1, 2, 6, 10; 702/16
See application file for complete search history.

(56) References Cited

U.S. PATENT DOCUMENTS

| 4,862,357 | A | 8/1989 | Ahlstrom | |
|---|---|---|---|---|
| 5,838,564 | A | 11/1998 | Bahorich | |
| 6,256,603 | B1 * | 7/2001 | Celniker | 703/10 |
| 7,356,414 | B2 | 4/2008 | Cacas | |
| 7,359,844 | B2 | 4/2008 | Sung | |
| 7,523,024 | B2 | 4/2009 | Endres | |
| 7,756,694 | B2 | 7/2010 | Graf | |
| 2003/0216897 | A1 * | 11/2003 | Endres et al. | 703/10 |
| 2006/0253759 | A1 | 11/2006 | Wei | |
| 2009/0265152 | A1 | 10/2009 | Cacas | |
| 2011/0106507 | A1 * | 5/2011 | Lepage | 703/2 |

* cited by examiner

*Primary Examiner* — Kamini S Shah
*Assistant Examiner* — Luke Osborne
(74) *Attorney, Agent, or Firm* — Murray Tech Law; Kenneth A. Murray; Jay S. Jongjitirat

(57) ABSTRACT

The present invention comprises a computer-implemented method for interactive geological interpretation, structural modeling and structural restoration, in which instantaneous feedback is provided to an interpreter. A software module is loaded into and executed by the computer system to implement the method of the invention. The method and system are employed by a technician or scientist, such as an earth scientist, geologist or geophysicist, hereinafter called an "interpreter". Using the method and system, the interpreter can make skilled qualitative and quantitative appraisals of geologic structures that occur within the upper parts of the earth's crust, including both the current state of such structures and their kinematic development through time. One use of such appraisals is to evaluate resources found in structures within sedimentary basins, including but not limited to oil and gas resources. The method and system can be used to train novice and advanced interpreters to improve their understanding.

19 Claims, 35 Drawing Sheets

METHOD AND SYSTEM FOR INTERACTIVE GEOLOGICAL INTERPRETATION, MODELING AND RESTORATION

CROSS-REFERENCE TO RELATED APPLICATIONS

This application claims the benefit of U.S. Provisional Application No. 61/382,924, filed Sep. 15, 2010.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

1. Field of the Invention

The present invention and associated embodiments and versions relate to methods and systems for geological analysis of geologic structures.

2. Description of Related Art

Earth scientists, geologists and geophysicists engaged in evaluating petroleum resources in the upper parts of the earth's crust typically analyze a range of subsurface data, including such data as 2D and 3D seismic reflection data and log data from well bores. The objective of the analysis is to determinate the likely configuration and nature of rocks and fluids in the subsurface. The process of analyzing the subsurface data using computer-implemented tools is commonly known as "subsurface interpretation" or "interpretation", because the earth scientist, geologist or geophysicist must "interpret" or make sense of the signals in the data that he or she is analyzing. Typical tasks involved in interpretation involve the mapping of geological faults and horizons based on reflection seismic data and the picking and correlation of geological formation tops from well log data.

Because subsurface data is typically incomplete, ambiguous, and noisy, in various aspects, the interpreter may need to apply skilled judgment to effectively analyze subsurface structures. One common approach is for the interpreter to rely on geological analogs and antecedents to supplement an inadequacy of data. Where there is insufficient data, the interpreter "fills in the gaps" by inferring that parts of geologic structures look similar to those observed elsewhere. This approach is imprecise and is also dependent on the experience of the interpreter.

Another approach is to support the interpretation of subsurface structures using the tools of quantitative geological modeling. In this approach, the interpreter constrains and improves his or her interpretation of subsurface structures using realistic quantitative models that embody the principles of formation of geologic structures. In the field of structural geology, accurate quantitative theories have been developed to model the sequential folding of strata in sedimentary basins in response to movement along underlying faults. This type of structural development is generically known as fault-related folding, and resulting structures are often called fault-related structures. Quantitative theories of fault-related folding are primarily kinematic in nature and incorporate geometric models of rock deformation that can differ depending on whether the overall mode of deformation involves contraction or extension. These theories can also deal with situations where there is syndepositional development of structures, meaning that the overall structure is developing at the same time that sedimentary strata are accumulating.

Another approach to support the interpretation of subsurface structures is to use the techniques of structural restoration, wherein the present-day configuration of a geological structure is structurally "retro-deformed" or "restored" to its likely configuration at some time in the past.

Despite the presence of a body of scientific theory related to quantitative modeling and structural restoration of geologic structures, present systems have limited capability to flexibly and rapidly incorporate such modeling and restoration capabilities into the day-to-day work processes of interpreters. In many cases, existing computer-implemented systems require substantial data input and setup before interpretation, modeling, and restoration can be performed. Such execution is typically performed in a weakly-interactive mode where it is difficult or impossible to see useful results until a complex series of steps have been completed, which can take days and even weeks. Further, the modes of interaction with these systems follow an inflexible ordering. Still further, these complex systems do not readily lend themselves to use in training where real-time response is required to convey and communicate various geological modeling and restoration concepts and theories in a timely manner.

For the foregoing reasons, there is a need for a more approachable computer-implemented method and system to expedite and optimize the process of interactive geological interpretation, modeling and restoration. In particular, there is a need for such a method and system that allows the judgment and skill of an interpreter to be integrated and enhanced via the real-time application of quantitative models and structural restorations to more quickly arrive at a satisfactory interpretation of a seismic reflection profiles, geological sections and other earth profiles of interest. Such a system would support the hybrid implementation of both qualitative and quantitative assessment to provide a rapid and flexible, interactive approach for geologic interpretation, modeling and restoration.

BRIEF SUMMARY OF THE INVENTION

The present invention is directed to a more approachable computer-implemented method and system to simplify, expedite and optimize the process of interactive geological interpretation, modeling and restoration, wherein the both a qualitative and quantitative approach is supported in a hybrid manner. The computer-implemented method and system comprises a suitable computer system to implement the method of the invention via a software module supporting interactive geological interpretation, modeling and restoration. A pre-existing earth profile, comprised of seismic data, well bore data, annotations and other geologic information is first imported into the system and displayed on a graphical window for interaction by an interpreter, typically a geologist or geophysicist. The interpreter interprets and models the earth profile interactively using graphical tools which cause the interpretation and model to be instantly computed and overlaid on the backdrop of the originally imported earth profile. Once a new interpretation and model is instantly computed, the interpreter can compare the interpretation and model to the earth profile. Additionally, the interpreter can direct the software to animate the structural development of the earth profile according to the interpretation and model for further assessment. The interpreter may then assess whether the current interpretation and model is satisfactory and delivers an improved understanding of fault and reservoir shapes, structural correlations, structural history and stratigraphic history. Finally, the interpreter can output the interpretation and model as a solution file for further analytical iteration or for use in other geologic interpretation systems.

The method and system of the present invention can instantly restore interpreted earth profiles, including seismic reflection sections and geological sections by flattening with respect to a reference horizon while restoring slip across faults that intersect the horizon. Further, the present invention supports unraveling structural and stratigraphic history, checking seismic correlations across faults and revealing subtle features and relationships that have been masked by tectonic dissection. In one embodiment, the present invention supports structural restoration techniques which are more useful than the simple flattening in many seismic interpretation systems, which does not take fault slips into account.

The present invention further includes a novel data structure incorporated and encoded as an element of the software for implementation on the computer system, hereinafter, a STRUCTX file format, which supports the interactive and instantaneous computation of multiple interpretations and models requiring provision of limited or sparse data by the interpreter. The STRUCTX file format is unique to the present invention.

Additionally, the present invention is configured to support a plurality of geologic modeling systems and theories while still delivering the interactive essence necessary to support real-time operational feedback to an interpreter.

The present invention supports and delivers several advantages and features, some of which are described below. For example, the present invention provides a method and system to optimally integrate a hybrid qualitative and quantitative approach to interpretation, modeling and restoration using interactive and iterative computer-implemented methods and geologic models to expedite analysis and produce more confident results. Further, the present invention provides a computer-implemented method and system to support training of both novice and advanced interpreters. Still further, the present invention provides a software module to support the implementation of a plurality of differing geologic interpretation models via a hybrid interactive qualitative and quantitative approach. Even further, the present invention provides a 2-D interpretation method and system that can be used to confirm and reinforce geologic interpretations as a precursor to implementation of more lengthy and expensive 3-D computer modeling systems, thereby substantially reducing cost and while improving quality of the resulting 3-D model. Further, the present invention provides a simpler approach to support and expedite correlation between seismic reflection data and well bore log data. Additionally, the present invention provides a strongly interactive interpretation and modeling approach that differs sharply from approaches where the operations are weakly interactive, follow an inflexible ordering, or require batch computations. And, still further, the present invention allows the interpretation and modeling of earth profiles on a fault-by-fault basis to support confirmation of interpretations across common fault zones.

The present invention also provides a unique implementation of principles and assumptions as described in Xiao and Suppe (1992). The present invention lets the variables identified by Xiao and Suppe, which control shapes of rollover folds, to be modeled, including: fault shape, total slip after fault deposition, direction of relative rock motion in hanging-wall collapse, and, history of sedimentation relative to fault slip.

The software implemented as an element of the present invention uniquely allows an interpreter to vary the principal variables while continuously overlaying the resulting model with a seismic or geological cross section, referred to herein as an "earth profile."

Further scope of applicability will become apparent from the detailed description presented hereinafter. It should be understood, however, that the detailed description and the specific examples and usage scenarios set forth below are given by way of illustration only, since changes and modifications within the spirit and scope of the method and system for interactive geological interpretation and modeling as described and claimed in this disclosure, will become obvious to one skilled in the art from a reading of the following detailed description. These and other features, aspects, and advantages of the present invention will become better understood with regard to the following description and accompanying drawings.

BRIEF DESCRIPTION OF THE SEVERAL VIEWS OF THE DRAWINGS

A full understanding will be obtained from the detailed description contained hereinbelow, and the accompanying drawings which are given by way of illustration only and are not intended to be limitative to any extent, and wherein.

DETAILED DESCRIPTION OF THE INVENTION

Figure 1:
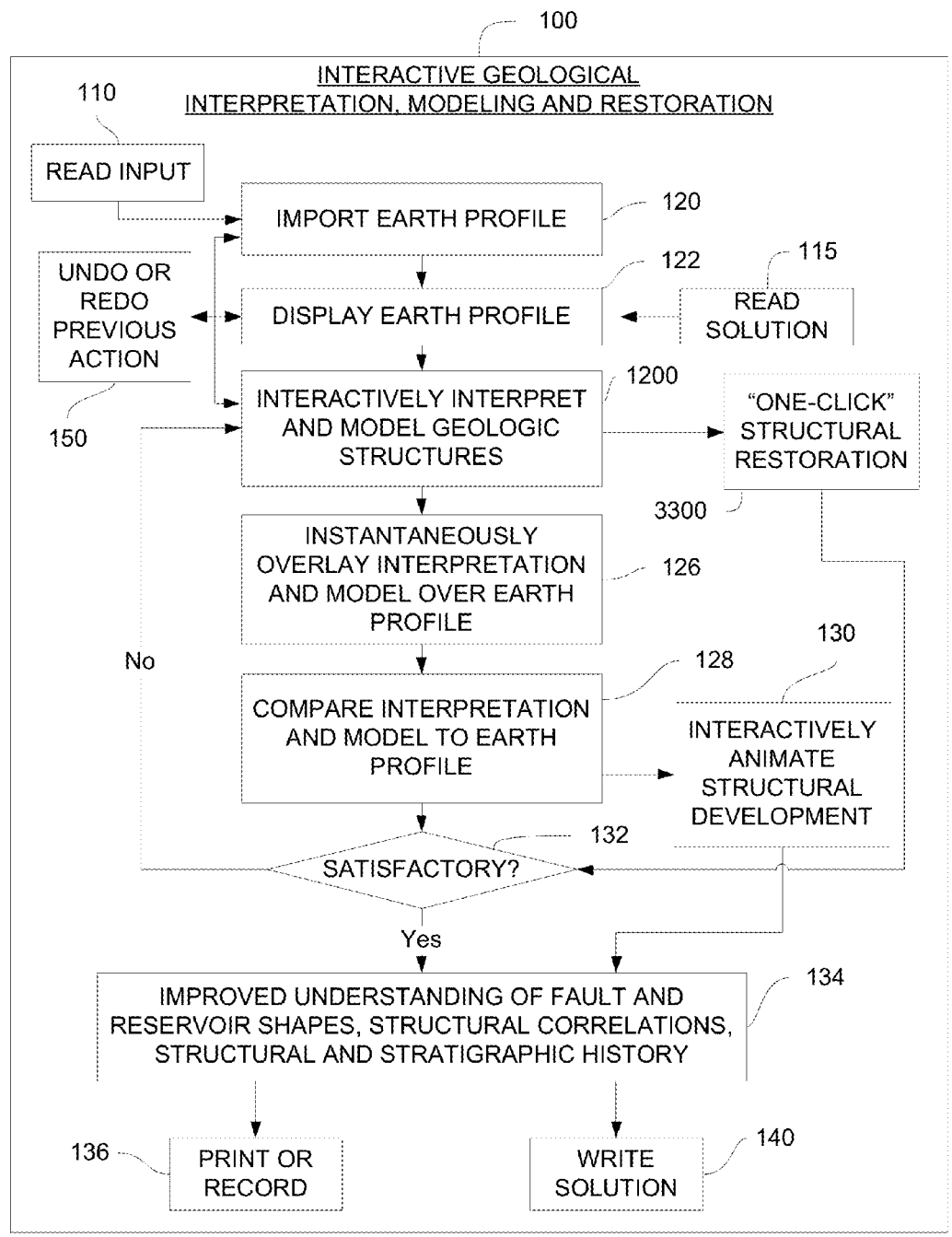
FIG. 1 illustrates a high-level process flow for a method of interactive geological interpretation, modeling, and restoration, according to one embodiment of the invention.
Figure 2:
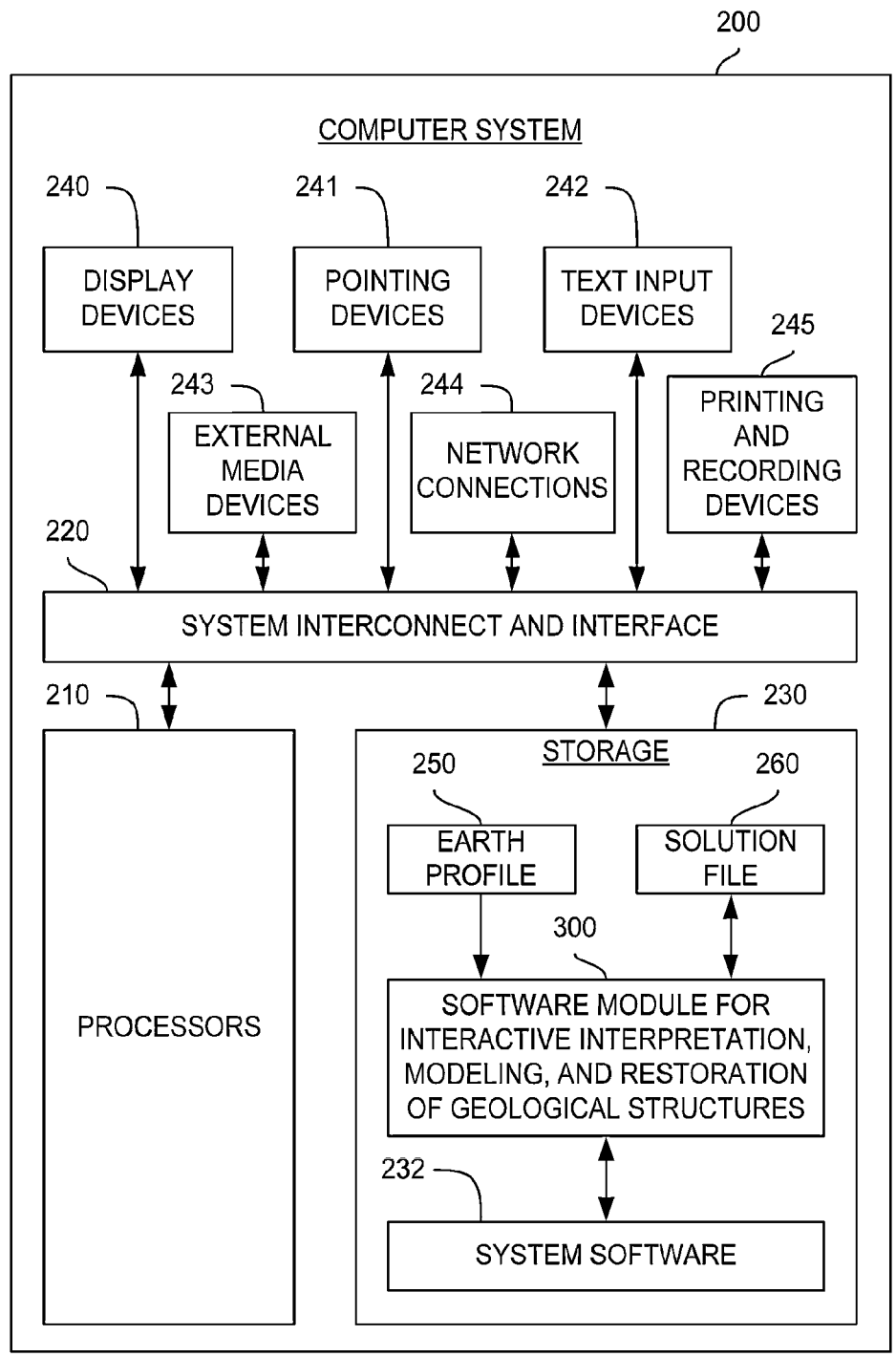
FIG. 2 illustrates the principal components of a computer system which stores and executes a software module for interactive geological interpretation, modeling, and restoration, according to one embodiment of the invention.
Figure 3:
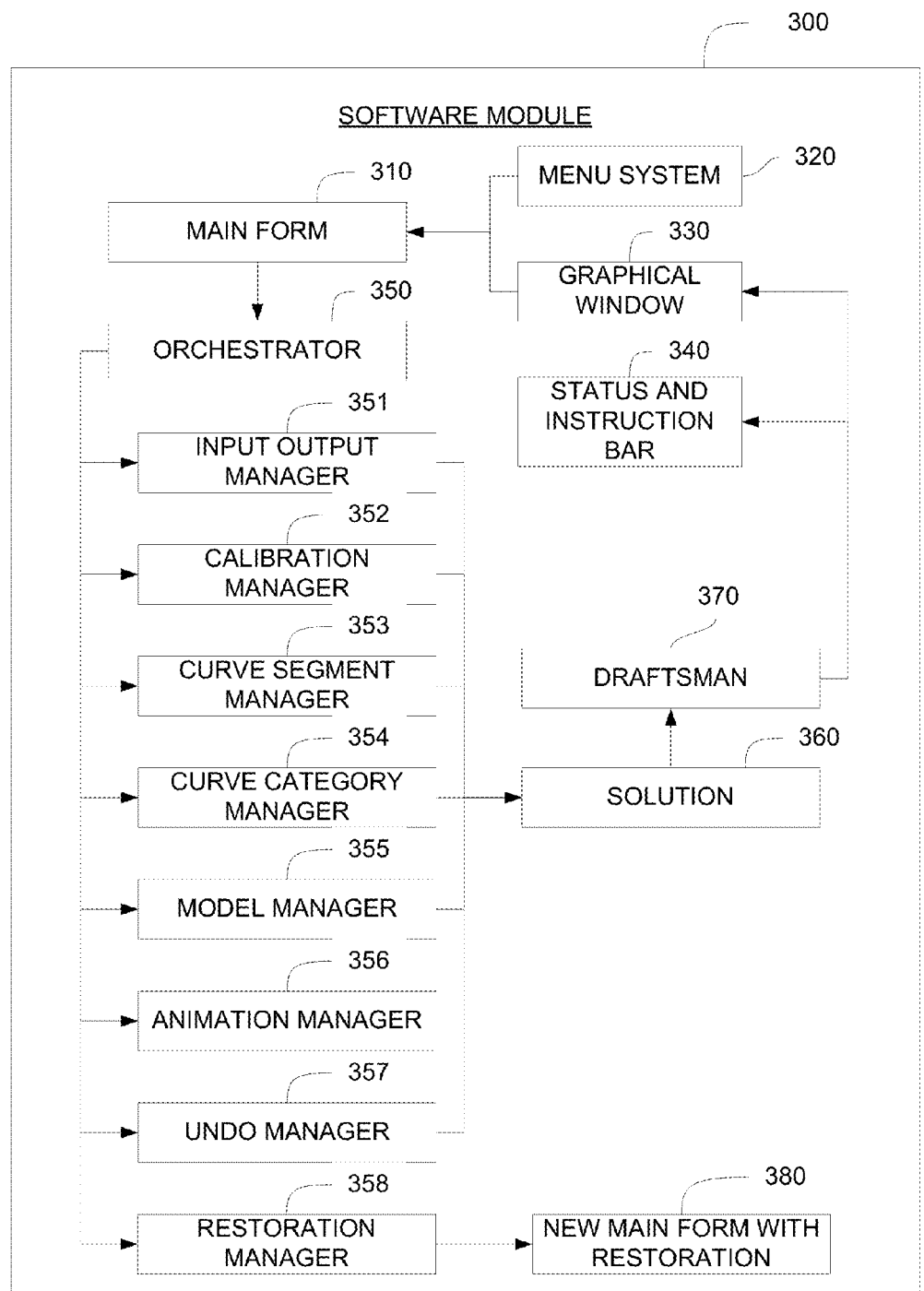
FIG. 3 illustrates the principal components and internal interactions of a software module for interactive interpretation, modeling, and restoration of geological structures, according to one embodiment of the invention.

Overview of Method and System—FIGS. 1-3

With reference to FIG. 1, the invention comprises a method 100 for interactive geological interpretation, modeling, and restoration that is implemented on a suitable computer system 200, shown in FIG. 2. A software module 300 is loaded into and executed by the computer system 200 to implement the method 100 of the invention. The method and system are employed by a technician or scientist, such as an earth scientist, geologist or geophysicist, hereinafter called an "interpreter". Using the method and system the interpreter can make skilled qualitative and quantitative appraisals of geologic structures that occur within the upper parts of the earth's crust, including both the current state of such structures and their kinematic development through time. One use of such appraisals is to evaluate resources found in structures within sedimentary basins in the upper parts of the earth's crust, including but not limited to oil and gas resources. The method and system can be used to train novice and advanced interpreters to improve their understanding of the nature and development of geologic structures.

FIG. 1 illustrates a high-level operational flow chart of the interactive interpretation, modeling, and restoration method 100.

FIG. 2 is a block diagram of the major elements of the computer system 200. The computer system 200 is adapted to store and execute a software module 300 that embodies the method 100. An interpreter directs certain aspects of the operational flow of method 100 through continual, time-varying interaction with the computer system 200. The interpreter interacts with the computer system 200 and thereby the software module 300 using a plurality of peripheral devices 240 to 245. Many of the results of the operations performed by the software module 300 are made apparent to the interpreter in the form of graphical representations such as images, drawings and text that are rendered onto one or more display devices 240. Throughout the remainder of this disclosure we use the term "graphical display" to refer to the results of the operations of the software module 300 as such results are rendered graphically onto the display devices 240.

FIG. 3 is an illustration of the high-level components of the software module 300, wherein the components provide functionality to support the interactive method of interpretation, modeling, and restoration 100.

Key Concepts and Terms

Prior to describing the flow chart of FIG. 1 in greater detail we define certain key concepts and terms that apply throughout this disclosure.

The method and system of the invention is useful in analyzing geologic structures in sedimentary basins in the earth's crust where the rocks predominantly comprise strata that have been sequentially deposited over time. Sedimentary basins are often subjected to stresses that tend to extend or contract the rocks within the basin in a horizontal direction over time. In response to such overall extension or contraction, sedimentary strata typically displace along faults. Furthermore, because the faults are not simple planes, the sedimentary strata deform into folds to accommodate movement around bends in the fault surfaces. If additional sedimentary strata are being deposited at the same time that faulting and folding are taking place, which is often the case, the geometries of the resulting "syndepositional" geological structures can be complex and difficult to unravel. While all geological structures are intrinsically three-dimensional, it is often the case that geological structures within a sedimentary basin are geometrically self-similar along a horizontal trend that is perpendicular to a dominant direction of extension and/or contraction. The essential aspects of such approximately two-dimensional geologic structures can be determined by the analysis of vertical cross-sections that are orthogonal to the trend of structural self-similarity and contain within themselves the dominant horizontal direction of extension and/or contraction.

An "earth profile" 250 means a rectangular image containing visual data representative of subsurface geologic conditions within a vertical cross-section through a geological structure of interest. The vertical cross-section containing the earth profile 250 is assumed to be appropriately situated to give a reliable two-dimensional representation of the geological structure of interest, in the sense discussed above. The earth profile 250 and the geologic structure that is represented within the earth profile 250 are the objects of analysis in the method and system of the invention. The earth profile 250 is not fundamentally modified during the operations of interactive geological interpretation and modeling, but is used as a backdrop over which the computer system 200 overlays interpretations and models produced during the execution of method 100.

The earth profile 250 can be any rectangular image containing useful data as described above. In many cases of the practical use of the method and system of the invention, the primary data within the earth profile 250 will come from a 2D seismic reflection survey or from a vertical slice through a 3D seismic reflection survey. In these cases the earth profile 250 will contain a representation of reflection amplitudes in a vertical seismic reflection profile wherein the amplitude variations provide a useful depiction of faulted and folded sedimentary strata. The seismic reflection amplitudes can be represented by variations in color, grayscale, by wiggle or variable area traces or in variety of other ways. The earth profile 250 can also include appropriately located data obtained from well logs, such as the location of formation tops. The earth profile 250 can also include a variety of annotations and drawings based on previous geological and geophysical analyses. The earth profile 250 may also be an image of a 2D geological section constructed by any means.

Figure 12:
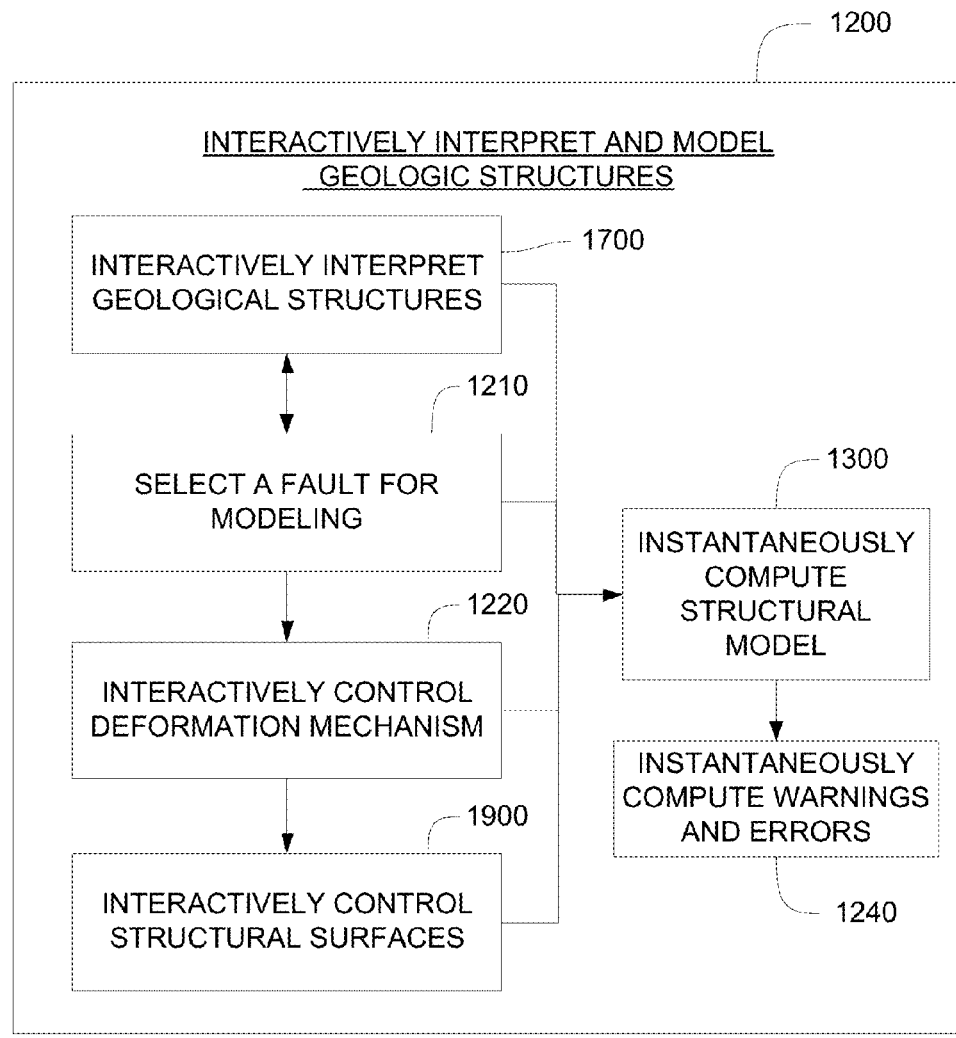
FIG. 12 is an operational flow diagram showing the plurality of subordinate operations comprising the operation 1200 of FIG. 1 for interactively interpreting and modeling geologic structures, according to one embodiment of the invention.

The core process of "interactive interpretation and modeling", which is represented as operation 1200 in FIG. 1 and is shown in more detail in FIG. 12, is a novel implementation, combination and hybridization of the processes of "interpretation" and "structural modeling".

With reference to the method 100 in FIG. 1, the process of "interpretation" involves the operations of (1) categorizing and drawing features such as faults and "horizons" that are observed and inferred on an earth profile 250 and (2) storing a digital representation of the categories and drawings in the software module 300. In the conventional terminology of interpretation, a "horizon" represents an interface within a sequence of sedimentary strata, often corresponding to a single instant of sedimentary deposition. Horizons may be broken into individual segments by faults. If the earth profile 250 contains seismic reflection data, interpreted horizons often follow laterally continuous seismic reflection events.

With reference to the method 100 in FIG. 1, the process of "structural modeling" (or simply "modeling") involves the operations of (1) creating a geometric and kinematic model of part or all of a geologic structure and (2) storing a digital representation of the model in the software module 300. The structural model is created using quantitative computational means that embody scientific principles that accurately represent the manner in which geologic structures form in the earth.

The processes of interpretation and modeling are linked together as follows in the method and system of the invention:
1. Part or all of an interpretation can form the geometric basis for a structural model. For example, a structural model can be based on the interpretation of an individual fault selected from a plurality of faults in an interpretation.
2. In the process of modeling, the interpreter interactively provides the software module 300 additional specifications for the model. These additional specifications are relatively few in number and are provided to the software module 300 through a straightforward, intuitive interface. For example, the interpreter can specify the "reference depths" of structural surfaces at sufficient distance on either side of a selected fault (as will be described in more detail below).
3. The software module 300 uses these sparse specifications of the structural model together with the selected part of the interpretation to create a detailed structural model. For example, the software module 300 uses the reference depths of structural surfaces together with the interpreted geometry of the fault to create a detailed structural model. This structural model shows the shape of structural surfaces as they would have been deformed by movement on the fault.

4. The interpreter can use the results of structural modeling in an interactive way to constrain and refine his or her interpretation of the geological structure. For example, the interpreter might modify the interpretation of the selected fault until the modeled structural surfaces better match observations. Additionally, the interpreter might use the modeled structural surfaces as a guide in refining his or her interpretation of the shape and cross-fault correlations of horizons.

With reference to operation 3300 of FIG. 1, the process of structural restoration transforms an earth profile representing the present day subsurface configuration of folded and faulted sedimentary strata into a restored earth profile that represents the likely configuration of the subsurface at some time in the geologic past.

Structural restoration is a powerful tool for unraveling structural and stratigraphic history, checking seismic correlations across faults and revealing subtle features and relationships that have been masked by tectonic dissection. Structural modeling and structural restoration are in many respects complementary "inverse" operations, with structural modeling working forward in geologic time, while structural restoration works backward in geological time. The method of "one-click" restoration provides a much superior result to the simple flattening capability present in many interpretation systems, which does not take faulting into account.

The combination of interpretation, structural modeling and structural restoration creates a particularly powerful set of capabilities for the interpreter.

Nunns (1991) described a computer-implemented method for performing structural restorations of 2D earth profiles consist of seismic reflection sections or geological sections. The publication of Nunns (1991) is incorporated herein by reference.

The processes of interpretation and structural restoration are closely linked together in the method and system of the invention. The methods provided for interpretation create the geometric capability of supporting "one-click" structural restoration 3300 wherein the interpreter can create a reliable and useful restoration automatically and almost instantaneously at any time during the interpretation process.

A "solution" comprises the totality of all components of a specific geological analysis performed using the method and system of the invention. A solution includes (1) the earth profile 250 together with ancillary data related to its calibration and display parameters, (2) the totality of data describing the interpretation of the earth profile 250 together with all the data that fully describes any structural models that are associated with parts of the interpretation, and (3) additional notes and descriptions provided by the interpreter. The operation of "one-click" structural restoration creates a completely new "restored solution" 360 within a new self-contained version of the software module 300 with its own graphical display.

Referring to FIG. 2 and FIG. 3, in the internal workings of the software module 300, a solution object 360 represents the current state of the solution. The solution can also be output as a solution file 260 (FIG. 2) from the software module 300, creating a fully instantiated external representation of the solution object 360. The solution file 260 can be stored or transmitted to another interpreter and can be input into another instance of the software module 300 for review and modification.

The method and system of the invention transforms input data in the form of an earth profile 250 into a more complete solution file 260 that encapsulates a skilled, qualitative and quantitative appraisal of the geological structures represented in the earth profile 250.

The method and system of the invention is designated as "interactive" to emphasize that interactivity is a key aspect of the method which is enabled by the nature of the computer system 200 and software module 300. This interactivity has three primary components:

1. An interpreter continually interacts with the software module 300 during operations of interpretation, modeling and restoration to provide input and control through the peripheral devices 240 through 245 of the computer system 200 as mediated by system software 232.
2. All critical computations and graphical display provided by the software module 300 are designed and implemented so that they are "instantaneous" in the sense that they take place without perceptible time delay from the point of view of the interpreter. In particular the interpreter receives instant graphical feedback as to how well his or her interpretation and model conform to an earth profile 250. "One-click" structural restorations are also performed without perceptible delay.
3. The architecture of the software module 300 is designed to enable highly flexible ordering of the operations and subordinate operations of the method 100 according to the judgment of the interpreter.

The net combined effect of these three components of interactivity is that the interpreter can effectively direct the flow of operations in the method 100 in a variable and flexible manner depending on needs, with results and feedback being provided in real-time. In this regard the method and system of geological interpretation, modeling and restoration of the invention differs markedly from approaches where the operations are weakly interactive, require batch or delayed computations, or follow inflexible ordering of operations.

The software module 300 is designated as a "module" to indicate that it may be used by an interpreter in stand-alone mode or in useful combination with other specialized software modules.

High-Level Method Flow

With reference to FIG. 1, in operation 110 the software module 300 reads an input data file containing an earth profile 250 that the interpreter wishes to interpret and model according to the method 100 of the invention. In one instance, the earth profile 250 can be read into the software module 300 as a rectangular image file, in one of a variety of file formats, including common formats such as JPEG, TIFF, GIF, BMP, and PNG. As part of operation 120, the interpreter can provide additional data to the software module 300 to calibrate the earth profile 250 in real world coordinates of horizontal distance and depth and set various display parameters. The interpreter can also define a blank section as an earth profile 250 rather than importing a preexisting earth profile 250. Using a blank section as a backdrop for interpretation and modeling is useful in training and in the development of geological concepts. Operation 120 initiates the creation of a new solution 360 within the software module 300.

Alternatively, in operation 115, the software module 300 reads a preexisting solution file 260, which contains an earth profile 250 and other data elements that form part of the solution.

In operation 122, the software module 300 displays the earth profile 250 within a graphical window 330 (FIG. 3). The interpreter can control the vertical and horizontal scale of the section. The interpreter can also choose to temporarily hide the earth profile 250 to show any interpretation and models by themselves, which is sometimes helpful. The interpreter can also determine positions within the earth profile 250 in real-world coordinates by using an interactive "locate" function.

In operation 1200, the interpreter directs the software module 300 through a variety of more detailed subordinate operations which collectively allow the interpretation and modeling of the earth profile 250. The nature of these subordinate operations is described in greater detail below in the narrative associated with FIG. 12.

Each of the detailed subordinate operations within operation 1200 involves a degree of interaction on the part of the interpreter followed by a response on the part of the software module 300. The responses on the part of the software module 300 are structured so that they can be computed instantaneously in order to provide maximum interactivity.

As soon as any change is made to the interpretation and/or model in operation 1200 the software module 300 in operation 126 instantaneously renders a graphical display of the earth profile 250 with an overlay of the updated interpretation and model. The graphical display responds immediately to the subordinate operations performed in operation 1200. This results in a continuous transformation of the graphical display in response to continuous interactive directions from the interpreter.

In operation 128, a comparison is made between the interpretation and model and the input data, leading to a decision 132 as to whether a satisfactory match has been achieved between the interpretation and model and the earth profile 250. In the software module 300, the decision 132 is made by the interpreter based on a visual inspection of the current graphical display. However, the software module 300 also displays diagnostic messages to aid the interpreter in this respect.

If the decision 132 is made that the interpretation and/or model can be improved further then the interpreter continues with operation 1200 to iterate and make further improvements in the interpretation and/or model so that a better match with observed data is achieved.

If the decision 132 is made that a satisfactory match has been achieved between the interpretation and model and the observed data, this means that the interpreter has, in operation 134, achieved an improved understanding of the geology of interest, including one or more of the following: an improved understanding of fault and reservoir shapes; structural correlations across faults; structural history; and stratigraphic history.

In operation 130, to provide the interpreter with an additional method of understanding the geological structure that is being analyzed, the software module 300 can create a continuous smooth animation of the development of the geological structure through time. The animation can be run at a variety of speeds, forwards or backwards in time, and can be started and stopped at will by interaction of the interpreter. While it is not possible to show such an animation effectively in this disclosure, FIGS. 7a through 7d and FIGS. 23a through 23b, show some individual sequential "frames" from such animation sequences.

In operation 3300 the software module performs a "one-click" structural restoration based on the current earth profile 250 and the current state of the interpretation. In operation 132 the interpreter can examine the results of the restoration to see whether operation 3300 has satisfactorily restored the earth profile 250 and interpretation to a configuration that is geologically reasonable. If the restoration appears to have problems the interpreter can return to operation 1200, modify the interpretation and then repeat the operation 3300. A detailed discussion of "one-click" structural restoration will be given in the narrative associated with FIGS. 33 through 35.

As part of operation 134, the interpreter may choose to record his or her understandings by adding digital notes to the solution object 360 (FIG. 3). The interpreter may also choose to output the current solution in the form of a solution file 260 (FIG. 2) that can be retrieved for later use, or used to communicate with other interested people. The interpreter may also choose to print or record 136 the results of his or her analysis in the form of hard-copy or videos that are created using printing and recording devices 245 (FIG. 2).

In operation 150, the interpreter can request the software module 300 to "undo" or "redo" actions associated with operations 120, 122 and 1200 and the subordinate operations therein. As will be described in more detail below, the software module 300 achieves this capability by storing a copy of the current solution object 360 every time a significant operation takes place. In practice, for the interpreter, this means that almost any operation resulting from selection from the menu system 320 (FIG. 3) can be undone or redone at will. This capability frees the interpreter from concern when making changes to the display, the interpretation or the current structural model.

Figure 6:
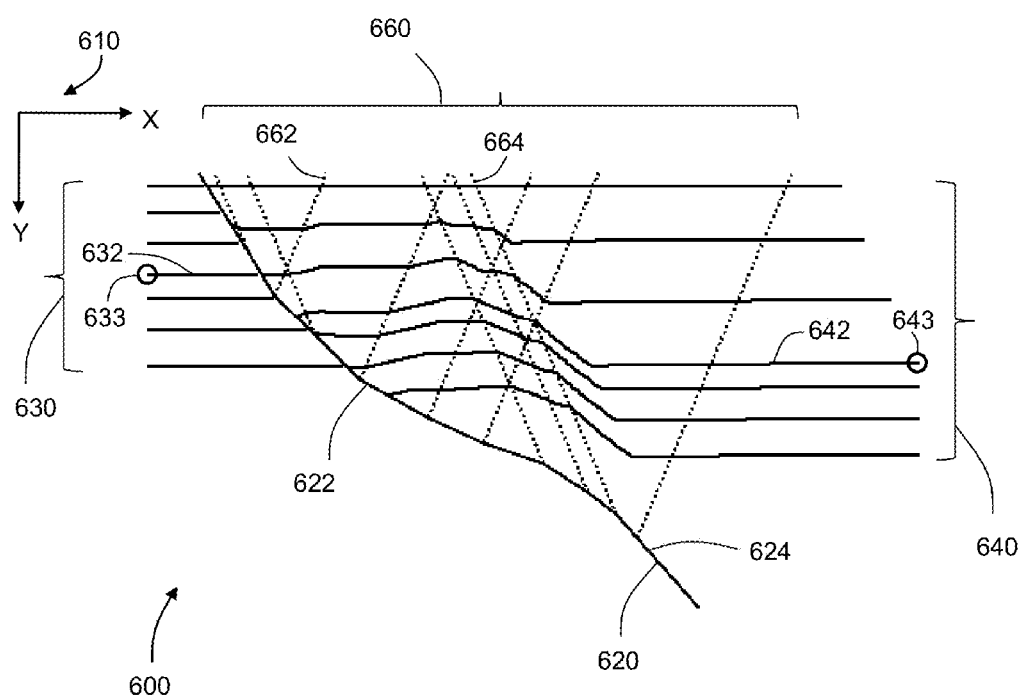
FIG. 6 illustrates an exemplary quantitative model of a geologic structure, according to one embodiment of the invention.

Structural Model—FIGS. 6-7

FIG. 6 illustrates an example of a quantitative model of a geologic structure which has been produced using the method and system of the invention. In this example, the type of structure that has been modeled is an extensional syndepositional fault system representative of an economically important class of geologic structures found in many sedimentary basins throughout the world. FIG. 6 illustrates a structural model 600 of the fault system represented within a planar vertical cross-section. Coordinates within the cross-section are defined with respect to a set of axes 610, in which X represents horizontal distance within the cross-section and Y represents depth within the cross-section. For the purposes of model development, the fault system is assumed to be self-similar along a horizontal trend perpendicular to the cross-section and all structural deformation is assumed to be parallel to the plane of the cross-section. FIG. 6 illustrates what is known as a two-dimensional structural model.

Note that in each subsequent figure within this disclosure, the presence of a set of axes 610 indicates that the figure contains a representation of a planar vertical cross-section, with coordinates X and Y defined as above.

Referring again to FIG. 6 the structural model 600 comprises a fault 620 together with a sedimentary sequence on the underlying or "footwall" side 622 of the fault and a sedimentary sequence on the overlying or "hangingwall" side 624 of the fault. Throughout this disclosure, in accordance with conventional geological terminology, the term "footwall" is used as a descriptor of entities that are on the underlying side of a fault, and the term "hangingwall" is used as a descriptor of entities that are on the overlying side of a fault.

The sedimentary sequence on the footwall side 622 of the fault is divided into layers by a plurality of footwall structural surfaces 630 that are shown embraced by brackets. Likewise the sedimentary sequence on the hangingwall side 624 of the fault is divided into layers by a plurality of hangingwall structural surfaces 640 that are also shown embraced by brackets. For each structural surface such as 632 on the footwall side 622 of the fault there is a corresponding structural surface 642 on the hangingwall side 624 of the fault.

For each structural surface, we define two "reference points", one on the footwall and one on the hangingwall of the fault. The footwall reference point is the point on the footwall structural surface that is farthest away from the fault. The hangingwall reference point is the point on the hangingwall structural surface that is farthest away from the fault, assumed to be beyond all shear axes 660, as described below. Thus in FIG. 6 a circle 633 represents the reference point for the footwall structural surface 632 and a circle 643 represents the reference point for the hangingwall structural surface 642.

The Y-coordinate of the reference point for a footwall or hangingwall surface is defined as the "reference depth" for that surface. The difference between the reference depths of two vertically adjacent surfaces is further defined as the "reference thickness" of the layer between the surfaces. The ratio of the hangingwall reference thickness to the footwall reference thickness for the same layer is defined as the "expansion ratio" for the layer.

The geometry of the structural model 600 has been determined using a computational implementation of the two-dimensional balanced structural modeling technique described by Xiao and Suppe (1992), which has been demonstrated to produce accurate structural models of real geologic structures. The publication of Xiao and Suppe (1992) is incorporated herein by reference.

According to the theory described by Xiao and Suppe (1992) instantaneous deformation of rocks moving in the hangingwall of a syndepositional extensional fault takes place by a mechanism of "coulomb collapse" along shear surfaces emanating from bends in the fault. The embraced dashed lines 660 in FIG. 6 represent a plurality of shear surfaces each emanating from a discrete bend in the fault 620. According to the theory of Xiao and Suppe (1992) those shear surfaces such as shear surface 662 that emanate from concave-upwards bends in the fault 620 dip in an opposed or "antithetic" sense to the fault 620, whereas those shear surfaces such as shear surface 664 that emanate from convex-upwards bends in the fault 620 dip in concordant or "synthetic" sense to the fault 620. As will be discussed in greater detail in the narrative for FIGS. 15*a* and 15*b*, the senses and magnitudes of the displacements associated with the shear surfaces 660 are such that they allow hangingwall rocks to displace around fault bends while conserving volume.

The modeled structural cross-section 600 in FIG. 6 represents the final stage of a continuous development of the structure through time. During this development there was both horizontal extension on the fault and simultaneous sedimentary deposition on both sides of the fault. FIG. 7*a* through FIG. 7*d* illustrate stages in the development of the structure represented by structural model 600.

Figure 7A:
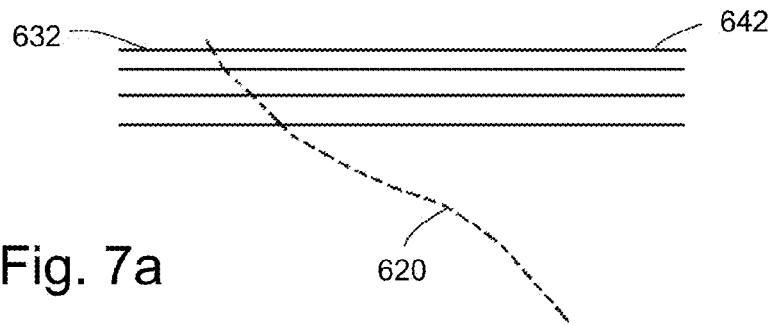
FIGS. 7a through 7d illustrate stages in the development through geologic time of an exemplary quantitative model of a geologic structure, according to one embodiment of the invention.

FIG. 7*a* shows the structure at a time immediately after the first three sedimentary layers have already been deposited. Up until this time there has been no movement on the fault 620, which is consequently shown dashed, and the first three layers have constant thickness or equivalently, expansion ratios of 1.00. The footwall structural surface 632 is continuous with the hangingwall structural surface 642 and represents the surface of instantaneous sedimentary deposition.

Figure 7B:
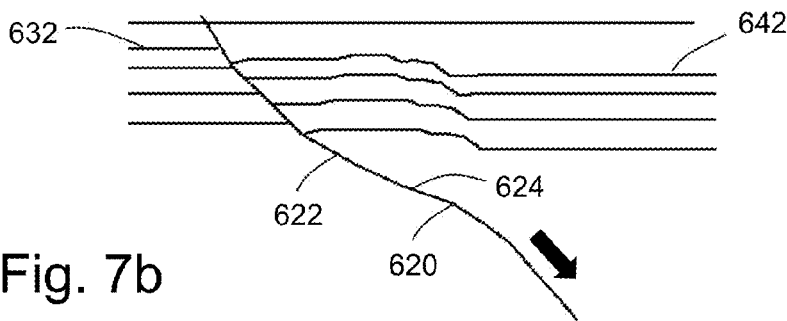

FIG. 7*b* shows the structure at the end of deposition of a fourth sedimentary layer. During the deposition of this layer the fault 620 dislocates and then continuously moves with a relative sense of displacement indicated by the bold arrow. The top of the fault 620 also propagates upwards and its tip remains at the depositional surface. There is a greater thickness of sediment deposited on the hangingwall side 624 of the fault 620 than on the footwall side 622. The fourth layer has an expansion ratio of 2.0. Furthermore, hangingwall structural surface 642 and deeper hangingwall structural surfaces deform into relatively complex shapes because of the adjustment of the sediments on the hangingwall side 624 of the fault 620 to movement over the non-planar surface of the fault 620.

Figure 7C:
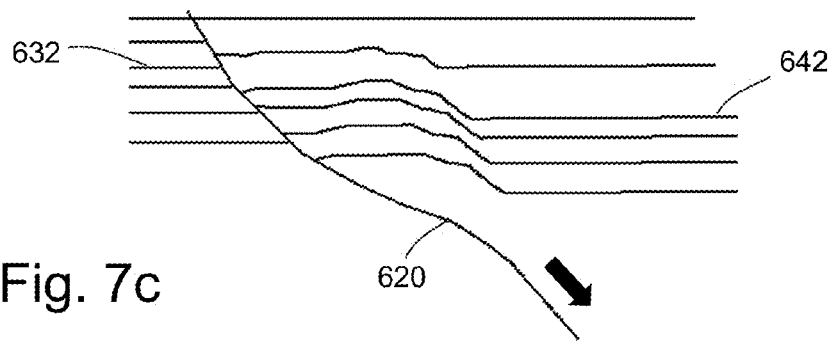
Figure 7D:
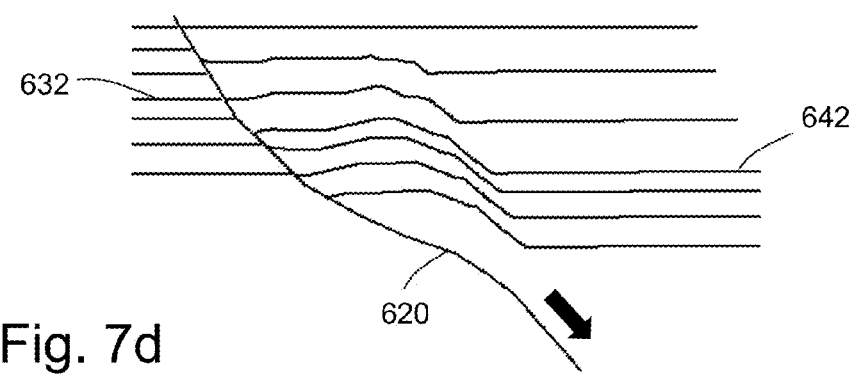

FIGS. 7*c* and 7*d* continue the progression with the deposition of the fifth and sixth sedimentary layers respectively. Movement on the fault 620 continues and its tip propagates upwards. There is more growth of sedimentary thickness and progressive deformation of structural surfaces on the hangingwall side of the fault. The fifth and sixth layers also have expansion rations of 2.0. FIG. 7*d* represents the final stage of development of the structural model 600 as in FIG. 6.

Throughout the development of the structural model 600 in FIG. 6, as sequentially illustrated in FIGS. 7*a* through 7*d*, the model remains structurally balanced and kinematically consistent, by virtue of its consistency with the theory of Xiao and Suppe (1992).

Example of Usage Scenario—FIGS. 8-11

Figure 8:
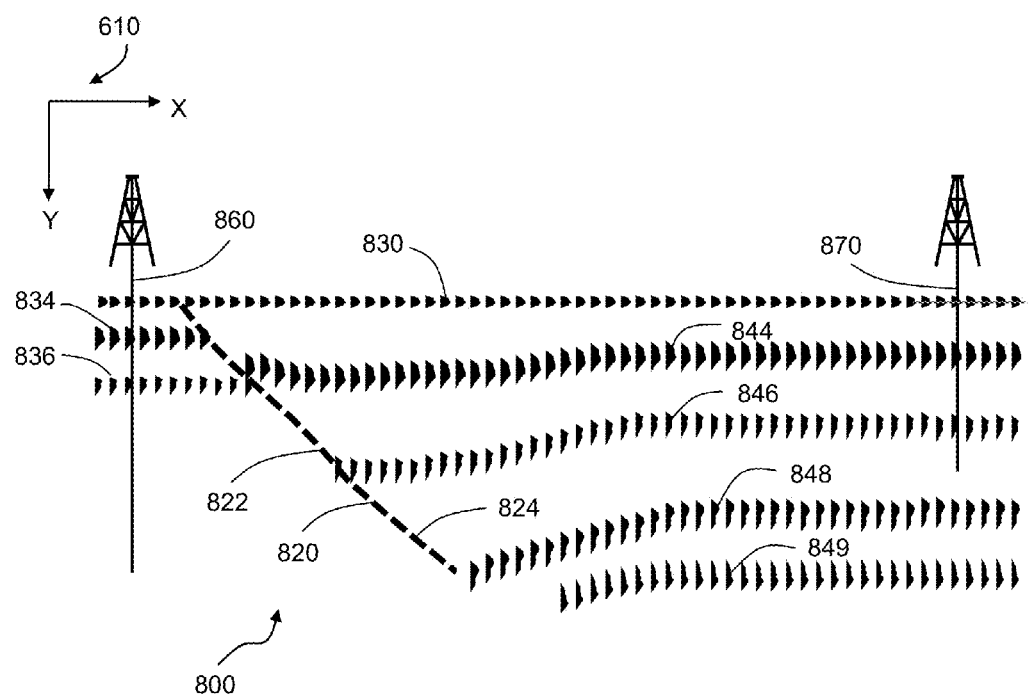
FIG. 8 illustrates a display of an earth profile of acquired data over an extensional syndepositional fault system that provides the basis for interactive interpretation and modeling, according to one embodiment of the invention.
Figure 9:
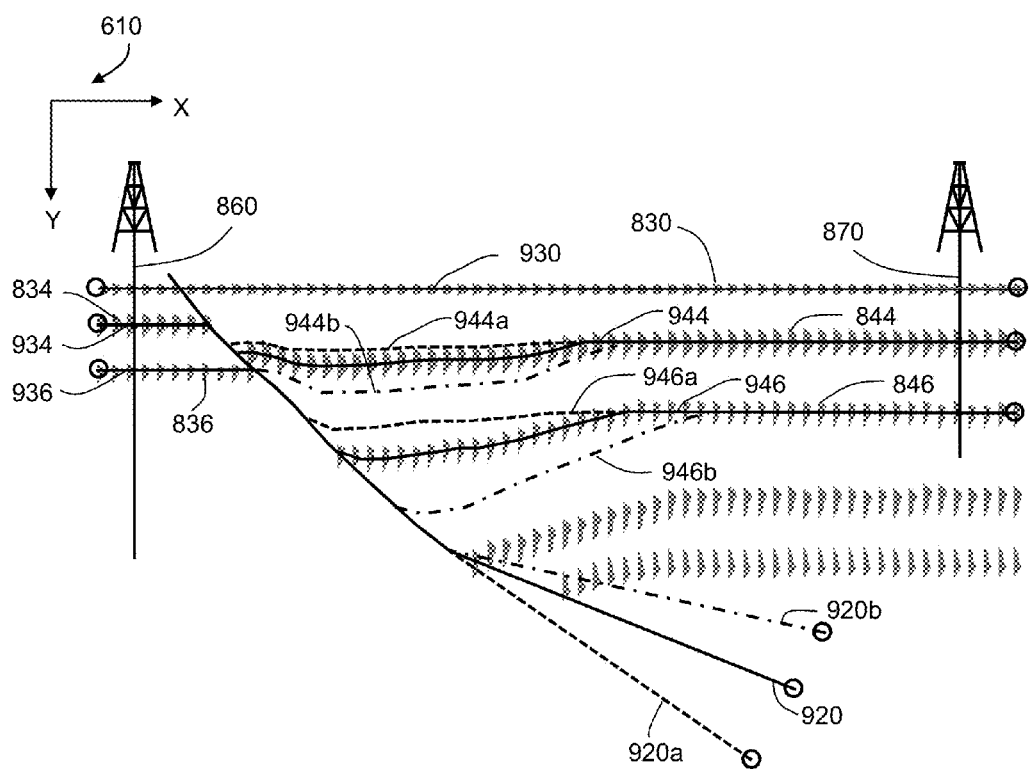
FIG. 9 illustrates an interactive display in which the earth profile of FIG. 8 is being interpreted and modeled, according to one embodiment of the invention.
Figure 10:
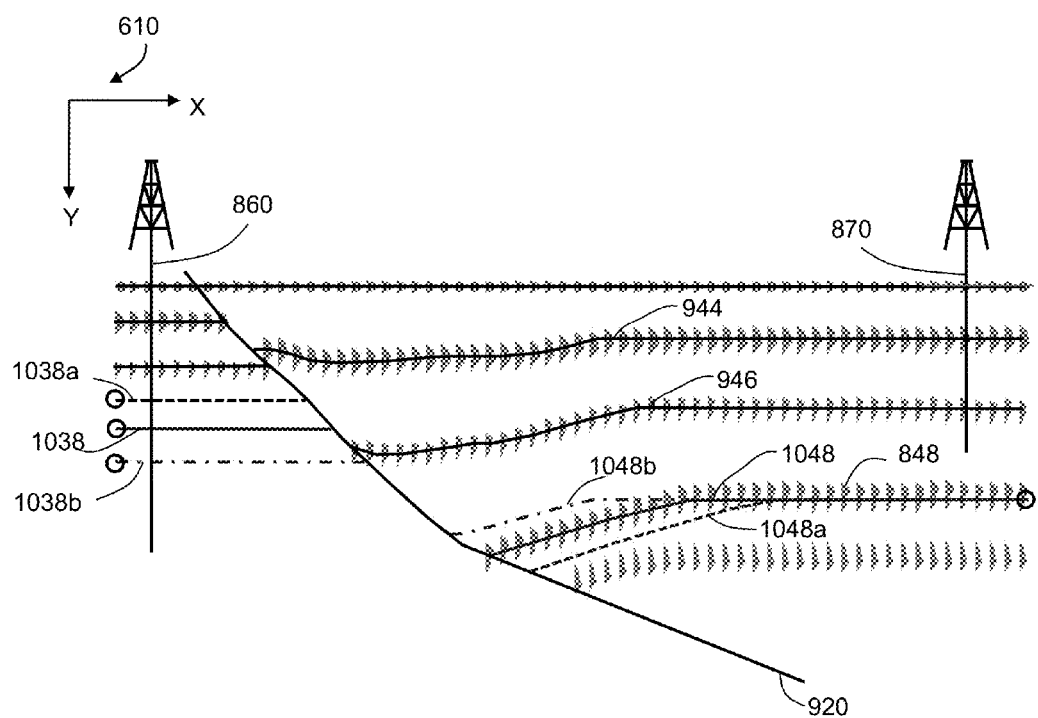
FIG. 10 illustrates an interactive display in which the earth profile of FIG. 8 is being further interpreted and modeled, according to one embodiment of the invention.

FIGS. 8 through 10 illustrate a scenario example in which an interpreter uses the method and system of the invention to make a skilled qualitative and quantitative appraisal of a geologic structure within the upper part of the earth's crust. This scenario example is schematic in nature and illustrates just one possible usage of the invention. Nevertheless it conveys the spirit of operation and the reader should readily be able to envisage other similar scenarios.

FIG. 8 is an illustration of an earth profile 800 consisting of acquired data that pertains to an orthogonal vertical cross-section across a geologic structure of interest, which in this case is an extensional syndepositional fault system. The earth profile 800 is a specific instance of the earth profile 250 of FIG. 2, for exemplary purposes. In this particular example the principal data in the earth profile 800 comes from a vertical seismic reflection profile that has been converted into depth. The seismic reflection data is illustrated schematically by positive amplitude variable area wiggle traces of which only some are shown in the schematic depiction of FIG. 8. A continuous uppermost seismic reflection event 830 represents the top of the sedimentary sequence. A plurality of deeper horizontally extensive seismic reflection events 834, 836, 844, 846, 848 and 849 represent deeper sedimentary interfaces within the overall sedimentary sequence. The interpreter also has access to well log information from two well bores 860 and 870, whose vertical extents are shown on the earth profile 800. Inspecting a display of the earth profile 800 the interpreter is able to ascertain with some certainty that there is a fault trace 820 crossing the section, as shown by a dashed line. The location of this fault trace 820 in the upper part of the cross-section can be determined by means of seismic reflection discontinuities, for example the discontinuities at the right end of seismic reflection events 834 and 836 and at the left end of seismic reflection events 844 and 846. The deeper trajectory of the fault trace cannot be determined with confidence by visual inspection. By means of well log data in well bores 860 and 870, the interpreter determines that the seismic reflection event 834 on the footwall side 822 of the fault 820 represents an equivalent sedimentary interface to the sedimentary interface that is represented by the deeper seismic reflection event 844 on the hangingwall side 824 of the fault 820. In other words, seismic reflection event 834 correlates with seismic reflection event 844. Likewise, seismic reflection event 836 correlates with seismic reflection event 846. However, the interpreter is unable to determine any deeper correlations across the fault.

FIG. 9 represents an interactive display which schematically represents an instance of the graphical window 330 that is displayed by the software module 300 on a display device 240 of the computer system 200. The display consists of the earth profile 800 of FIG. 8 as a backdrop (not specifically indicated) overlain by graphical representations of a fault interpretation and a structural model. The interpreter is using the method and system of the invention to further constrain his or her analysis of the geologic structure represented in the earth profile 800. The interpreter has interpreted the trajectory of a fault 920. This fault 920 is coincident with the fault trace 820 of FIG. 8 in the upper part of the earth profile 800 and has been hypothetically extended deeper beyond the zone of direct control. The interpreter has also added a modeled structural surface 930 representing the top of the sedimentary sequence. The interpreter has introduced a modeled structural surface consisting of a footwall part 934 and a hangingwall part 944 that is intended to model the configurations of the seismic reflection events 834 and 844 respectively. The vertical position of the footwall structural surface 934 is controlled by the footwall reference point at the left end of the surface, shown as a circle in FIG. 9, which the interpreter sets to match the depth of the seismic reflection event 834. The vertical position of the hangingwall structural surface 944 is controlled by the hangingwall reference point at the right end of the surface, also shown as a circle in FIG. 9, which the interpreter sets to match the depth of the right hand part of the seismic reflection event 844. The detailed shape of the hangingwall structural surface 944 depends on the reference depths for surfaces 934 and 944 and the shape of the fault 920. This detailed shape is calculated according to the method of the invention and is displayed as an overlay over the cross-section. Similar descriptions and considerations apply for a second structural surface that the interpreter has introduced consisting of a footwall part 936 and a hangingwall part 946 that is intended to model the configurations of the seismic reflection events 836 and 846 respectively.

Referring to FIG. 9 it can be seen that there is a close geometric correspondence between the modeled surface 944 and the seismic reflection event 844 and between the modeled surface 946 and the seismic reflection event 846. This indicates that the shape of the fault 920 is correct both in its upper part where it matches an observed fault trace 820 as in FIG. 8 and in its hypothesized deeper extension. Using the method and system of the invention, the interpreter is able to interactively change the shape of the fault 920 while instantaneously observing the changes in the modeled structural surfaces. If, for example, the interpreter moves the deeper segment of the fault 920 from a position represented by the solid line 920 to a new position represented by the dashed line 920*a*, the modeled surfaces change correspondingly. In this case, the shape of the hangingwall modeled surface 944 adjacent to the fault changes to a shape represented by the dashed curve 944*a*. Likewise, the shape of the hangingwall modeled surface 946 adjacent to the fault changes to a shape represented by the dashed curve 946*a*. Because the shapes 944*a* and 946*a* do not match the seismic reflection events 844 and 846 respectively, there is a strong indication that the fault cannot have the shape 920*a*. In similar fashion, if the lower fault shape is changed to that represented by 920*b*, the modeled surfaces 944*b* and 946*b* also do not match the observed seismic reflection events 844 and 846. Thus, in this example, the interpreter is able to use the method of the invention to corroborate the observed shape of the fault 820 as shown in the upper part of the cross-section of FIG. 8 and confidently extend its trajectory to greater depth as shown in FIG. 9.

Further, FIG. 10 represents an interactive display building on the display shown in FIG. 9, in which the interpreter uses the method and the system of the invention to further constrain his or her analysis of the geologic structure, beyond the results explained in the narrative for FIG. 9. The interpreter has introduced an additional modeled structural surface consisting of a footwall part 1038 and a hangingwall part 1048. This surface is intended to model the configuration of the seismic reflection event 848 on the hangingwall side of the fault 920 and to determine the position of a geologically equivalent interface on the footwall side of the fault 920. The vertical position of the footwall structural surface 1038 is controlled by the footwall reference point at the left end of the surface, shown as a circle in FIG. 10. The vertical position of the hangingwall structural surface 1048 is controlled by the hangingwall reference point at the right end of the surface, also shown as a circle in FIG. 10. The detailed shape of the hangingwall structural surface 1048 depends on: (1) the reference depth for hangingwall surface 1048, which the interpreter sets to match the depth of the right hand part of the seismic reflection event 848, (2) the shape of the fault 920, which has been previously determined, and (3) the reference depth for footwall structural surface 1038, which the interpreter is free to vary.

Referring again to FIG. 10 it can be seen that there is a satisfactory match between the modeled surface 1048 and the seismic reflection event 848. This indicates that the depth of the modeled footwall surface 1038 is correct and in fact establishes a cross-fault correlation corresponding to the hangingwall seismic reflection event 848. Using the method and system of the invention, the interpreter is able to interactively change the depth of the modeled footwall surface 1038 while instantaneously observing the changes in the modeled hangingwall structural surface 1048. Suppose, for example, that the interpreter moves the modeled footwall structural surface from a position represented by 1038 to a new position represented by the dashed line 1038*a*. Then, in this example, the shape of the hangingwall modeled surface adjacent to the fault changes from a shape represented by line 1048 to a shape represented by the dashed curve 1048*a*. Because the shape of 1048*a* does not match seismic reflection event 848, there is a strong indication that the depth of the footwall modeled surface 1038*a* must be incorrect. In similar fashion, if the modeled footwall surface 1038 is moved to a new position represented by 1038*b*, the modeled hangingwall surface 1048*b* will also not match the observed seismic reflection event 848. Thus, in this example, the interpreter is able to use the method and system of the invention to find a correlative position on the footwall side of fault 920 for the sedimentary interface associated with hangingwall seismic reflection event 848.

Figure 11:
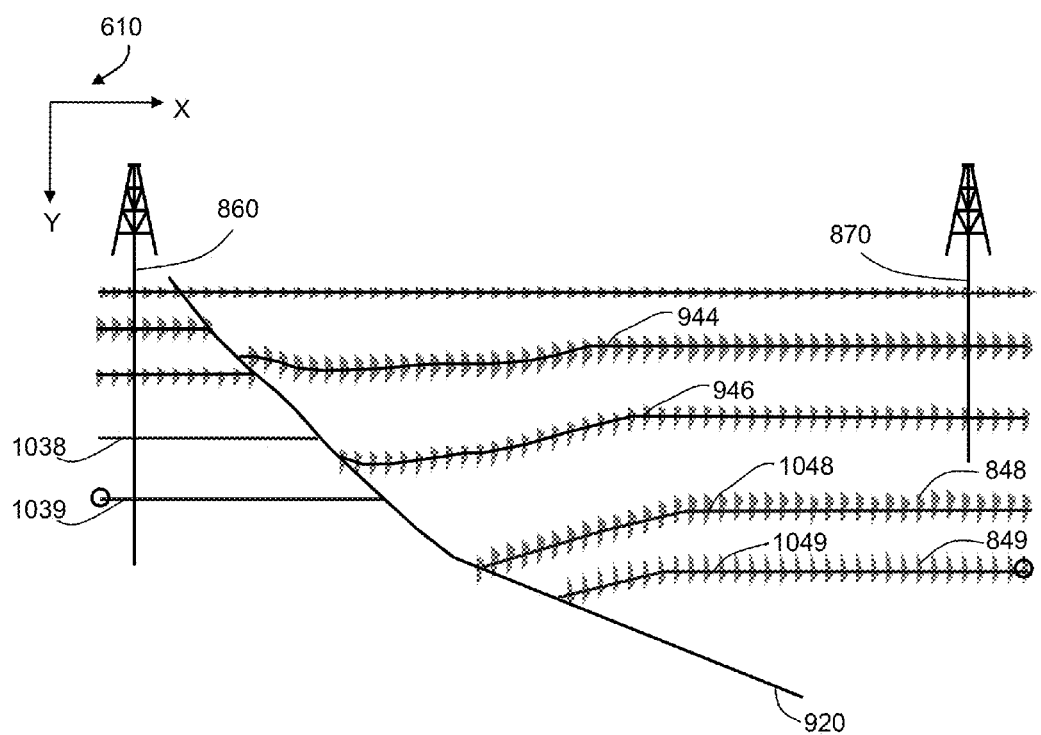
FIG. 11 illustrates an interactive display in which the earth profile of FIG. 8 is being still further interpreted and modeled, according to one embodiment of the invention.

Now, still further, FIG. 11 represents an interactive display building on the display shown in FIG. 10, in which the interpreter is using the method and system of the invention to further constrain his or her analysis of the geologic structure represented by the earth profile 800 that forms the backdrop to the display. In this example, the interpreter has introduced an additional modeled structural surface consisting of a footwall part 1039 and a hangingwall part 1049. This surface models the configuration of the seismic reflection event 849 on the hangingwall side of the fault 920 and determines the depth of a geologically equivalent interface on the footwall side of the fault 920, using the same approach explained in the narrative for FIG. 10.

Referring again to FIG. 11 it is seen that the interpreter has been able to establish correlative depths on the footwall side of fault 920 for the sedimentary interfaces associated with the hangingwall seismic reflection events 848 and 849. Because these correlative footwall depths are penetrated by the wellbore 860, the interpreter can examine the well logs of that wellbore to establish the nature of the sedimentary interfaces represented by footwall modeled surfaces 1038 and 1039. By inference the interpreter can attribute the same or similar characteristics to the sedimentary interfaces represented by hangingwall seismic reflection events 848 and 849.

Referring again to FIG. 11 the interpreter can infer from the expansion ratios of hangingwall versus footwall sedimentary layers that the fault 920 was non-existent or inactive prior to the time of deposition associated with seismic reflection event 848, and was thereafter steadily active. This observation has relevance in predicting the nature of sedimentary rock types on the hangingwall side of the fault 920.

Finally, in summary of the usage scenario represented by the narratives for FIGS. 8 through 11, the reader can understand that through the use of the method and system of the invention, the interpreter has significantly enhanced his or her analysis of a geological profile across a faulted geologic structure. The interpreter has used the method and system of the invention to corroborate the interpretation of a fault and extend it to greater depth with confidence. The interpreter has been able to gain a reliable estimate of the certain stratigraphic correlations across the fault which would otherwise be highly uncertain. The interpreter has been able to understand the growth history of the structure and potentially gain insight into stratigraphic variations.

While the usage scenario represented in FIGS. 8 through 11 is hypothetical, it is realistic and quite typical of actual case studies performed using the method and system of the invention. However the method and system of the invention provide for wide variability in the order of interactive operations and the exact nature of solutions obtained, depending on the nature of the geologic structure that is analyzed and the presence or quality of seismic reflection, well data and other geological data.

Computer System—FIG. 2

Now referring to FIG. 2, we provide a more detailed description of the computer system 200. To clarify the nature of the computer system 200 and its components we give examples that are illustrative but are not inclusive of all possible manifestations.

In FIG. 2, a computer system 200 is illustrated. The computer system 200 is adapted for storing and executing a software module 300. The computer system 200 is also adapted to allow an interpreter to rapidly comprehend the results provided by the software module 300 and to interactively direct the operational flow of the software module 300.

The computer system 200 of FIG. 3 includes one or more processors 210 operatively connected via a system interconnect and interface 220 to storage 230 and a plurality of peripheral interface devices, 240 to 245. The processors 210 are sufficiently fast to perform "instantaneous" computations and graphical refresh in the main event loop of the software module 300 as will be described below. The storage 230 contains system software 232 that is executed by the processors 210 to enable the computer system 200 to operate as required.

An example of a suitable computer system 200 is a network-connected personal computer, PC, with attached peripheral devices. In this case, the PC's processors includes a multi-core CPU and one or more graphical processors connected to a system bus and interface that represent the system interconnect and interface 220. The PC's storage 230 comprises a combination of random access memory and disk storage. The system software 232 comprises an operating system such as Microsoft's Windows Operating System, a software framework for supporting application programs, such as Microsoft's .NET framework, together with device drivers and configuration files.

Another example of a computer system 200 has a distributed architecture wherein a network such as a local area network or the internet provides the functions of the system interconnect and interface 220. In this case, processors 210 and storage 230 can be remote from the peripheral devices 240 to 245 that are physically accessible to the interpreter. In this instance the system software 232 includes capabilities for supporting the provisioning of appropriate services across a network.

The storage 230 further contains a version of the software module 300 that the computer system 200 can execute in combination with the appropriate system software 232. The software module 300 can be loaded into the computer system 200 via an external media device 243 or from another computer system via network connections 244. Examples of external media devices include CD/DVD reader/writers, external hard drives, and USB flash drives.

The interpreter interacts with the software module 300 via the peripheral devices 240 to 245 that form part of the computer system 200. These peripheral devices are under the combined software control of the software module 300 and the system software 232.

Many of the results of the operations performed by the software module 300 are made apparent to the interpreter in the form of a graphical display rendered onto one or more display devices 240. The graphical display continually varies in response to the operations of the software module 300 as directed by the interpreter's interactive input.

The interpreter is able to provide interactive input to the software module 300 by use of one or more pointing devices 241 whereby the interpreter can designate and select a position or graphical component within the graphical display. When the interpreter moves a pointing device 241, the virtual position of the pointing device 241 within the graphical display will be designated by a graphical cursor that moves within the graphical display, with the form and position of the cursor being under the combined control of the software module 300 and the system software 232. Throughout this disclosure we say that the interpreter "moves the cursor" to refer to the operation of engaging a pointing device 241 to designate a position within the graphical display.

Having moved the cursor to a preferred position, the interpreter can also interact with the software module 300 by clicking a specified button on a pointing device 241. In such circumstances, the software module 300 is notified that the interpreter has clicked a specific button and is also notified of the position of the cursor within the graphical display at the time the click occurred. We assume that each of the pointing devices 241 has been configured to allow at least two differentiable types of click, which we designate as a "left button click" and a "right button click". When we say that the interpreter "left clicks" or "right clicks" on the display we mean that the interpreter has made a left button click or a right button click respectively after moving the cursor to a preferred position within the display.

Examples of pointing devices 241 include a computer mouse, a trackball, a touchpad, a graphics tablet and pen, and a joystick. In each of these examples the pointing device buttons are explicit. However a pointing device can also comprise a touch screen or similar device whereby the interpreter can make selections directly with his or her fingers and designate "button clicks" via appropriate gestures.

The interpreter can also use one or more text input devices 242 to type strings of letters and numbers that provide input to the software module 300. An example of a text input device is a computer keyboard. Another example is a virtual keyboard rendered within the graphical display that allows the interpreter to make text selections via a pointing device 241. In many cases the software module 300 renders a graphical "dialog box" within the graphical display wherein the letters and characters that are typed by the interpreter on a text input device 242 are instantaneously displayed. In such cases we say that the interpreter "enters text into a dialog box" to refer to the combined operation of text entry via a text input device 242 and instantaneous display of the text within a graphical dialog box under control of the software module 300.

The interpreter, as required, provides the software module 300 with an earth profile 250 in the form of a computer file or other functionally equivalent form. The interpreter may also wish to load or extract solution files 260 into or from the software module 300. The earth profile 250 and solution files 260 may be loaded or extracted via external media devices 243. Earth profiles 250 and solution files 260 may also be loaded from or extracted to a separate computer system via a network connection 244.

The interpreter can from time to time print or record results from the software module 300 using a printing or recording device 245. An example of a printing device is an ink-jet or laser printer capable of printing formatted display output. An example of a recording device is a video camera or software-enabled equivalent capable of recording real-time displays from the software module in the form of videos.

Software Module—FIG. 3

FIG. 3 illustrates the principal high-level objects comprising the software module 300 together with a representation of flow of interaction between the objects. In one instance the software module 300 is designed and implemented using the paradigms and techniques of object-oriented software development, supported by system software 232 that enables event-oriented graphical interaction. For clarity we shall use terminology consistent with this type of development environment. However, the software module 300 could achieve the same results if it were implemented in any one of a number of modern development environments.

The main form 310 is the highest-level object in the software module 300. The main form 310 instantiates and manages a plurality of subordinate objects including a menu system 320, a graphical window 330, a status and instruction bar 340 and an orchestrator 350. The main form 310 operates under the supervision of system software 232 running on the computer system 200 of FIG. 2. The system software 232 continuously performs the generic tasks involved in managing the interactions between the software module 300 and the peripheral devices 240 through 245 of the computer system 200. The system software 232 also performs the generic tasks associated with managing the behavior of interactive displays, menus and dialog boxes at all hierarchical levels of the software module 300.

The software module 300 displays a representation of the main form 310 on a display device 240. Along one side of the main form 310 there is a menu system 320 with a plurality of drop-down submenus sufficient to cover all of the primary operations of the software module 300. By moving the cursor and clicking on a menu item, the interpreter can direct the software module 300 to initiate a new operation. The main form 310 further contains a scrollable graphical window 330, within which graphical results are continuously updated. During some operations, the interpreter interacts with the software module 300 by means of cursor movements and clicks in the graphical window 330. On another side of the main form 310 there is a status and instruction bar 340 that displays textual information about the operational state of the software module 300 together with context-specific instructions. During certain operations textual information can also be displayed within the graphical window 330 as a dynamic label that tracks the cursor. During certain operations the software module 300 can display additional windowed dialog boxes into which the interpreter can enter data.

In other parts of FIG. 3, the orchestrator object 350 is responsible for the interactive orchestration of the operations of the software module 300 including objects 351 through 370. The manager objects 351 through 358 are responsible for the detailed operational responses of the software module 300. The solution object 360 fully encapsulates all of the data necessary to describe the current state of the analysis being performed within the software module 300. The draftsman object 370 is a software object dedicated to graphical operations that is fully capable of rendering a graphical display of the complete solution together with ancillary instructions and status information.

The software module 300 runs in a continuous loop in response to primary interactive events. Primary interactive events occur when the interpreter (1) makes a selection from the menu system 320, or (2) moves the cursor and/or clicks within the graphical window 330, or (3) occludes, uncovers, or resizes the main form 310. The system software 232 detects primary events and sequentially notifies the main form 310. The main form 310 handles each event by making an appropriate call to the orchestrator object 350, which in turn invokes one of its subordinate manager objects 351 through 358 to manage the response to the event. In some cases, a manager object 351 through 358 that is commanded by the orchestrator 350 will, in turn, command another manager object 351 through 358 to help it complete an operation. Except in trivial "no operation" cases, each invocation of one of the manager objects 351 to 358 causes a change to the current solution 360, because each of the manager objects 351 through 358 acts upon the solution 360. A change in the solution 360 will in turn result in change in the visual appearance of the display. This change is instantaneously achieved when the draftsman object 370 renders the current solution 360 onto the graphical window 330 and renders any status updates and instructions onto the status and instruction bar 340.

The principal task of the orchestrator object 350 is to keep track of the current operation and to cause the appropriate action to take place when notified by the main form 310 that a primary interactive event has occurred.

First, we will discuss the response when the main form 310 calls the orchestrator 350 after a primary interactive event associated with the interpreter clicking a selection from the menu system 320. In the event that there was a previous operation in progress that must be terminated, the orchestrator 350 commands the appropriate subordinate manager object 351 to 358 to complete clean-up actions for the previous operation. The orchestrator 350 then initiates the new operation as appropriate by invoking actions from one of the subordinate manager objects 351 to 358. Each manager object 351 to 358 is capable of performing any one of a set of related operations upon appropriate instruction from the orchestrator 350. In some instances the new operation can be performed in its entirety by the manager object 351 to 358 when invoked. For example, if the request is to read an input file, then the input output manager 351 performs this operation in its entirety. Such an operation may require the manager object 351 to 358 to raise additional dialog boxes and respond to secondary interactive events from the interpreter. In other instances, in order to be completed in its entirety, the new operation may require continuous interaction via cursor movements and pointer clicks in the main form 310. For example, if the request is to draw a curve segment (operation 1722 of FIG. 17) as part of an interpretation, multiple calls to the curve segment manager 353 will be required. In the case of this type of operation the orchestrator makes an initial call to an appropriate manager object 351 to 358. The appropriate manager object 351 to 358 performs its initial action and maintains a record of its operational state in readiness for the next command from the orchestrator 350.

We now discuss the response when the main form 310 calls the orchestrator 350 after a primary interactive event associated with the interpreter moving the cursor or clicking within the graphical window 330. In the event that the software module 300 is in the middle of an operation that requires continuous interaction via cursor movements and pointer clicks, the orchestrator 350 invokes the appropriate manager object 351 to 358 to make the next incremental change. The appropriate manager object 351 to 358 performs the required action and maintains a record of its operational state in readiness for the next command from the orchestrator 350. For example, the orchestrator object 350 might notify the curve segment manager 353 that the interpreter has made a left click during a "draw curve segment" operation (1722 in FIG. 17). In this instance the curve segment manager 353 would add a point to the active curve segment within the solution 360. In the software module 300, a right click in the display window is a signal to terminate any current continuous operation. In the event of being notified by the main form 310 of a right click, the orchestrator 350 commands the appropriate subordinate manager object 351 to 358 to complete clean-up actions for the current operation, and then sets the current operation to "no operation". In all instances, if there is no continuous operation in progress when the orchestrator 350 is notified of a primary interactive event associated with the interpreter moving the cursor or clicking within the graphical window 330, then the orchestrator 350 returns control to the main form 310 without invoking any action.

We now discuss the response when the main form 310 calls the orchestrator 350 after a primary interactive event associated with the interpreter occluding, uncovering or resizing the main form 310. In this instance, the orchestrator 350 commands the draftsman object 370 to redraw the current solution 360 within the graphical window 330 and refresh any status updates and instructions in the status and instruction bar 340.

The input output manager 351 manages and performs the operations of (1) reading a file containing an earth profile 250 (operation 110 of FIG. 1), (2) reading an existing solution file (operation 115 of FIG. 1) and, (3) writing a solution file 260 of FIG. 2 (operation 140 of FIG. 1). The input output manager 351 invokes dialog boxes wherein the interpreter can specify file names and other data for reading and writing.

As part of the operation "import earth profile" 120 of FIG. 1, the calibration manager 352 manages the interactive operations of calibrating a displayed earth profile 250 so that the software module 300 has the correct transformation between display coordinates and real world coordinates. The calibration manager 352 invokes a dialog box wherein the interpreter can enter appropriate real world coordinate data and also receives continuous interactive input from within the graphical window 330 whereby the interpreter specifies coordinates within the display of the earth profile 250 by moving the cursor and clicking.

Figure 17:
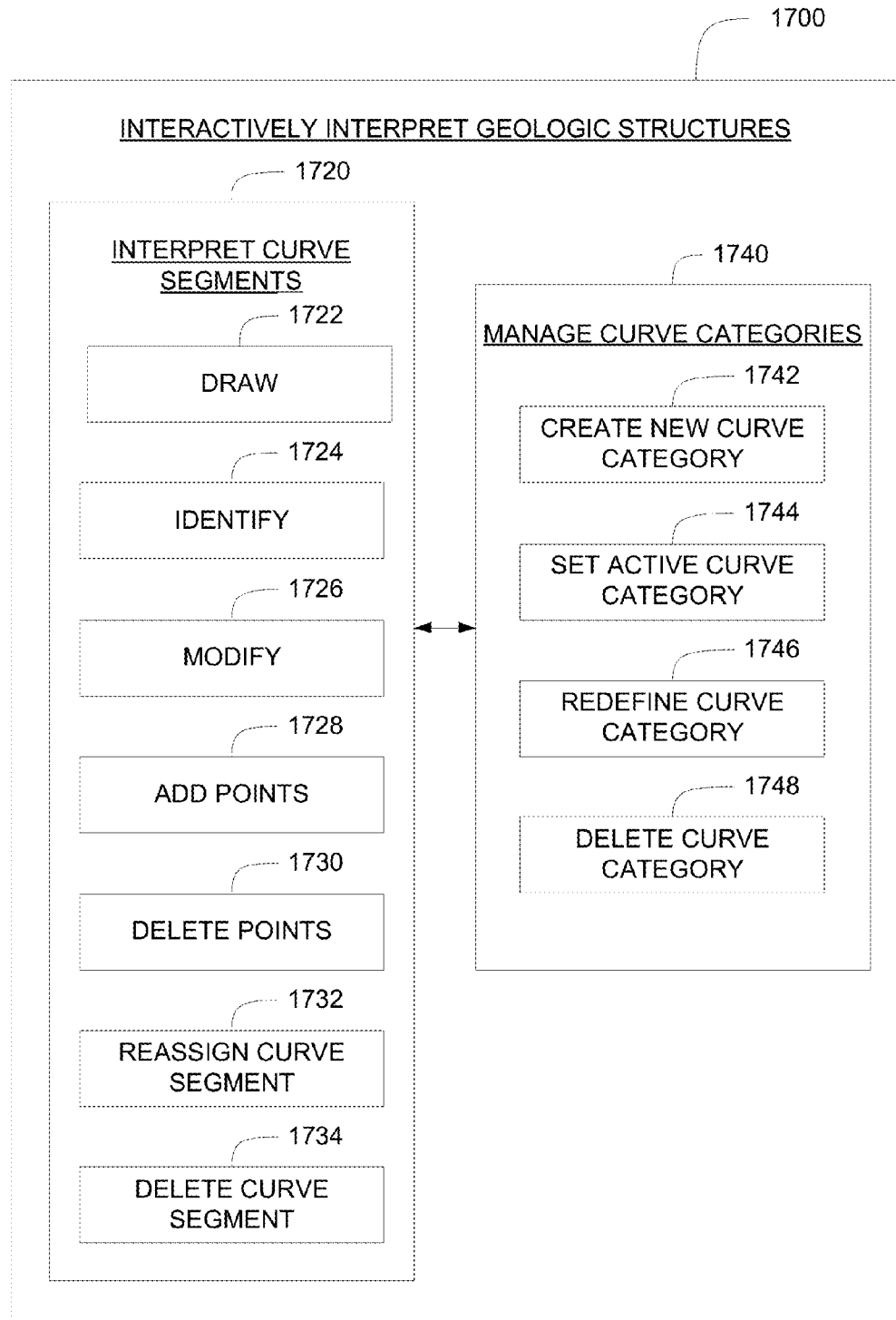
FIG. 17 is an operational flow diagram showing the plurality of subordinate operations comprising the operation 1700 of FIG. 12 for interactively interpreting geologic structures, according to one embodiment of the invention.

Together the curve segment manager 353 and curve category manager 354 manage and perform the high-level operation "interactively interpret geological structures" 1700 shown in FIGS. 12 and 17 and described in associated narrative. The curve category manager 354 is used by the model manager 355 to manage curve categories associated with modeled structural surfaces.

Figure 13:
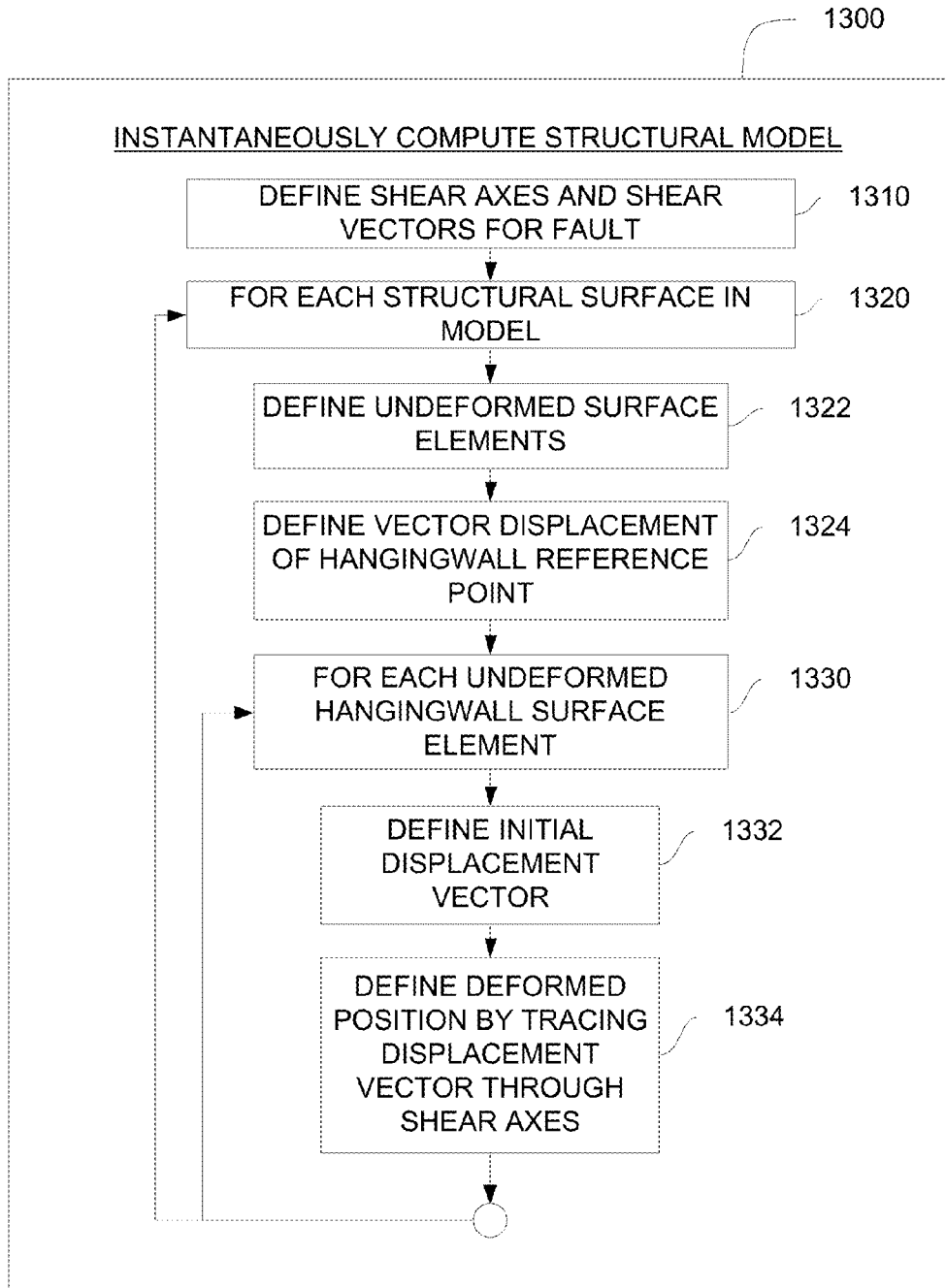
FIG. 13 is an operational flow diagram showing the plurality of subordinate computational operations comprising the operation 1300 of FIG. 12 for instantaneously computing a structural model, according to one embodiment of the invention.

The curve segment manager 353 manages and performs the interactive operations of interpreting curves segments such as horizons and faults, as shown in operations 1720 through 1734 in FIG. 17 and described in associated narrative. The curve segment manager 353 acts on a continuous series of interactive events associated with cursor movements and clicks as commanded by the orchestrator 350. As needed to assign curve category information to a curve segment, the curve segment manager 353 invokes the curve category manager 354. If the curve segment manager 353 performs any operation that modifies a fault that is currently "selected for modeling" as in operation 1210 in FIG. 12, the curve segment manager 353 further commands the model manager 355 to perform the operation "instantaneously compute structural model" 1300 (FIGS. 12 and 13). This important linkage ensures that the current structural model is fully interactive.

The curve category manager 354 manages the list of curve categories to which curve segments are assigned, as shown in operations 1740 through 1748 in FIG. 17 and described in associated narrative. The curve category manager 354 also manages individual curve categories associated with structural surfaces. The curve category manager 354 invokes dialog boxes wherein the interpreter can enter and modify data about curve categories.

The model manager 355 manages and performs the operations associated with creating and modifying a structural model, comprising:

"Select a fault for modeling" 1210 in FIG. 12.
"Interactively control deformation mechanisms" 1220 in FIG. 12.
"Interactively control structural surfaces" 1900 in FIGS. 12 and 19.
Subordinate operations 1920 through 1930 in FIG. 19.
"Instantaneously compute structural model" 1300 in FIGS. 12 and 13.
Subordinate operations 1310 through 1334 in FIG. 13.
"Instantaneously compute warnings and errors" 1240 in FIG. 12.
"Interactively animate structural development" 130 in FIG. 1.

The model manager 355 acts on a continuous series of interactive events associated with cursor movements and clicks as commanded by the orchestrator 350. In the case of the operations "add new surface" 1920 and "modify attributes of surface" 1930 in FIG. 19 the model manager 355 also invokes the curve category manager 354 so that the interpreter can define or modify the attributes associated with a modeled structural surface. In the case of the operation "interactively control deformation mechanisms" 1220 in FIG. 12, the model manager 355 also invokes a dialog box 2080 (see FIG. 20c) wherein the interpreter can specify parameters.

In FIG. 3 the software object "animation manager" 356 manages the operations associated with continuous animation of the structural model in operation 130 of FIG. 1. The animation manager 356 invokes a dialog box containing interactive controls whereby the interpreter can start and stop the animation at any point and control the speed and direction of the structural animation. The animation manager 356 achieves its results by first storing a temporary copy of the current solution object 360 for later retrieval and reinstatement. Under control of events arising from the animation dialog box, the animation manager 356 successively manipulates the controls for the current structural model within the solution 360 and invokes the model manager 355 to instantaneously compute a series of intermediate structural models through operation 1300 of FIG. 12. Each successive version of the solution 360 is rendered within the graphical window 330 by the draftsman 370. When the interpreter indicates that he or she wishes the animation to terminate, the animation manager 356 restores the saved copy of the solution object 360 and the original contents of the graphical window 330 are once again displayed.

The "undo manager" 357 manages the operation 150 of FIG. 1 associated with undoing and redoing previous operations. To achieve this functionality, the undo manager 357 manages an "undo stack" and a "redo stack". These stacks contain last-in-first-out lists of copies of solution objects 360. The orchestrator 350 invokes the undo manager 357 every time a significant operation has been completed, at which point the undo manager 357 pushes a copy of the current solution object 360 onto the undo stack. To undo the most recent operation, upon the appropriate selection from the menu system 320 by the interpreter, the undo manager 357 pops the solution object from the top of the undo stack and pushes it onto the redo stack, then replaces the current solution object 360 with a copy of the solution object at the top of the undo stack. To redo an undone operation, upon the appropriate selection from the menu system 320 by the interpreter, the undo manager 357 pops the solution object from the top of the redo stack and pushes it onto the undo stack, then replaces the current solution object 360 with a copy of the solution object at the top of the undo stack.

The restoration manager object 358 performs the operation of "one-click" structural restoration 3300 (FIG. 1). The restoration manager 358 takes as its input the solution data object 360, which is fully sufficient for the needs of the operation 3300.

The restoration manager 358 produces as its output a new, self-contained main form 380, which can independently execute operations of the software module 300.

The new main form 380 comes with an earth profile as a backdrop that is a structural restoration of the original earth profile with a graphically embedded version of the interpretation, from the antecedent main form 310. The new main form 380 is fully functional and can independently execute operations of the software module 300. The solution object 360 managed by the new main form 380 has appropriate components including an earth profile 250 representative of the structurally restored earth profile with a graphically embedded version of the original interpretation. A more detailed description of the process of "one-click restoration" is given in the narrative for FIGS. 33 through 35.

Figure 4:
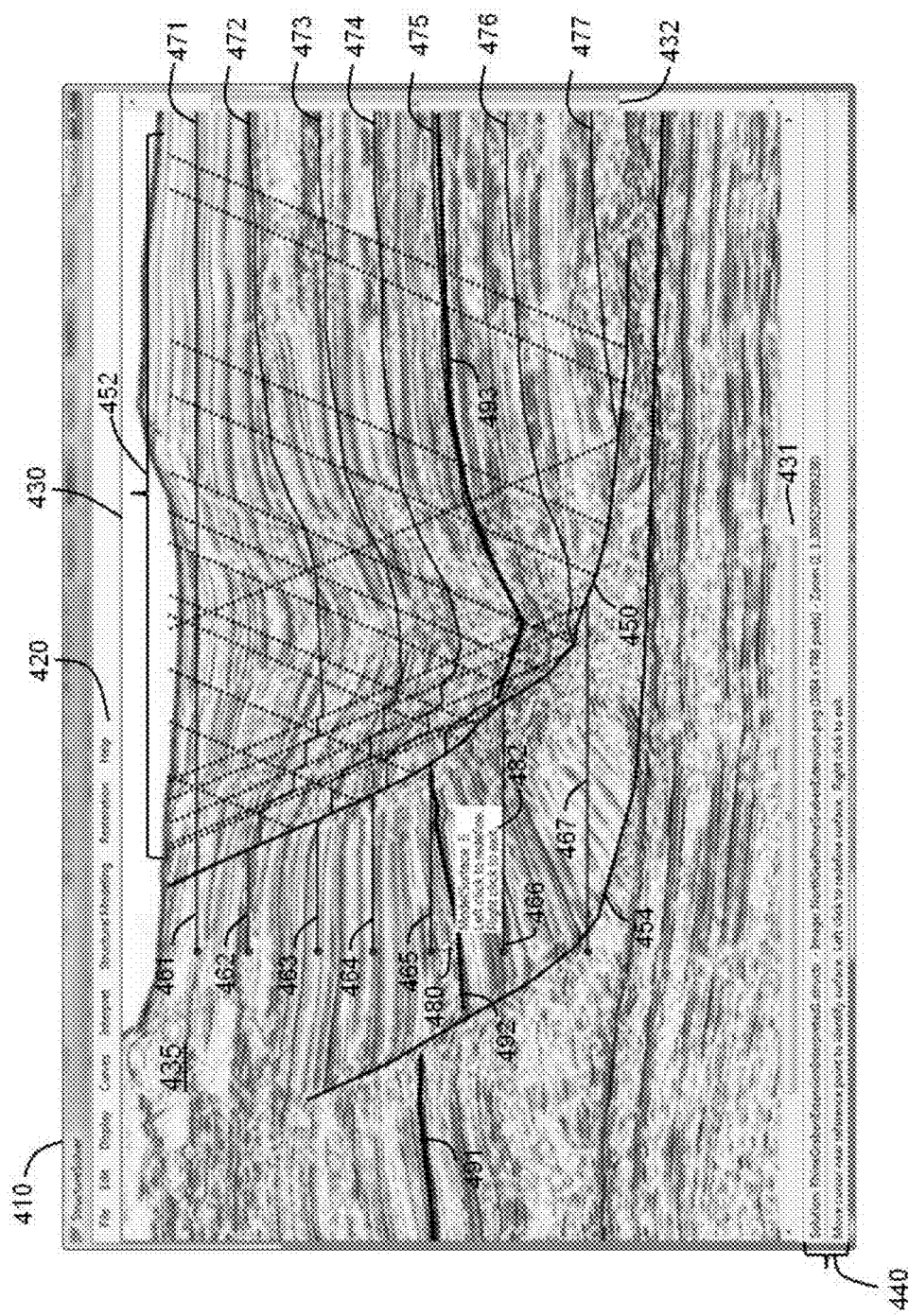
FIG. 4 illustrates a display of the main form of the software module and its components during an interactive operation, according to one embodiment of the invention.

Displays Created by the Software Module 300—FIGS. 4 and 5

Referring to FIG. 4, which illustrates a screen capture created by an exemplary instance of the software module 300.

The main form 410 exemplifies a displayed version of the main form object 310 in the software module 300 (FIG. 3).

The main form 410 has a menu system 420 that exemplifies a displayed version of the menu system software object 320 in the software module 300 (FIG. 3).

The main form 410 has a graphical window 430 that exemplifies a displayed version of the graphical window object 330 in the software module 300 (FIG. 3). The graphical window 430 can be moved by horizontal and vertical scroll bars 431 and 432.

The main form 410 has a status and instruction bar 440 that exemplifies a displayed version of the status and instruction bar object 320 in the software module 300 (FIG. 3).

Within the graphical window 430, an earth profile 435, comprising seismic reflection data, forms the backdrop to the display. The earth profile 435 is an exemplary instance of the earth profile 250 in FIG. 2.

Superimposed upon the backdrop of the earth profile 435 is a plurality of drawings representing the state of interactive geological interpretation and modeling according to the system and the method of the invention.

The interpreter has interpreted two faults, 450 and 454, based on observation of the seismic reflection amplitudes in the earth profile 435.

The interpreter has also interpreted three curve segments 491, 492, and 493 that each belong to the same horizon, that is, they each are assigned to the same "curve category" of type "horizon" (see narrative associated with operation 1700 below).

The interpreter has selected the fault 450 for modeling (see narrative associated with operation 1210 below). Consequently the current state of the structural model associated with the fault 450 is displayed. Even though there is also a structural model associated with fault 454, this fault 454 is not selected for modeling, so its associated structural model is not displayed.

The visualization of the structural model associated with fault 450 comprises:

A plurality of footwall modeled structural surfaces 461 through 467, represented by horizontal line segments The small circles at the left ends of the footwall modeled structural surfaces 461 through 467 represent the reference points for the footwall modeled structural surfaces 461 through 467.

A plurality of hangingwall modeled structural surfaces 471 through 477, represented as curved lines. The reference points for the hangingwall modeled structural surfaces 471 through 477 are not shown because they are off the edge of the currently visible part of the graphical window 430.

An embraced plurality of shear surfaces 452 each associated with a bend in fault 450.

Note that the shapes of the hangingwall modeled structural surfaces 471 through 477 conform to the configurations of the seismic reflections in the earth profile 435, indicating a satisfactory match between model and the observed geologic structure. Furthermore the structural model gives a good control on the stratigraphic correlations across the fault 450. The interpreter has used this control, along with similar control afforded by a structural model for fault 454 (not shown), in order to constrain the positioning of the interpreted horizon segments 491, 492, and 493.

The display in FIG. 4 illustrates the main form 410 during an interactive operation 1930 (see associated narrative below) to modify the attributes of a modeled structural surface. The software module 300 is displaying a dynamic label 482, identifying the structural surface nearest to the cursor 480. If the interpreter left clicks, the software module 300 will display a dialog box in which the interpreter can modify the attributes of the selected modeled structural surface, which in this case, is the modeled structural surface consisting of foot wall part 465 and hangingwall part 475.

Figure 5A:
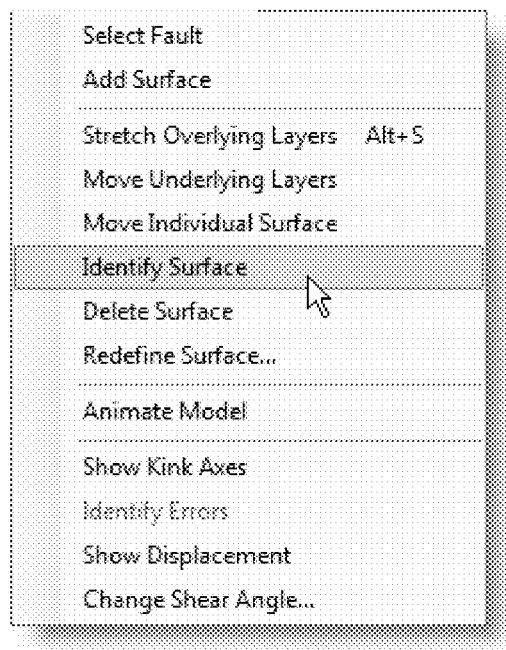
FIG. 5a illustrates an example of a drop-down sub-menu forming part of the menu system of the software module, according to one embodiment of the invention.

FIG. 5a illustrates an example of a drop-down sub-menu forming part of the menu system 420, in FIG. 4, being a representative example of the inner workings of the menu system 320 in the software module 300. This is a sub-menu associated with the operations 1210, 1220, and 1920-1930.

Figure 5B:
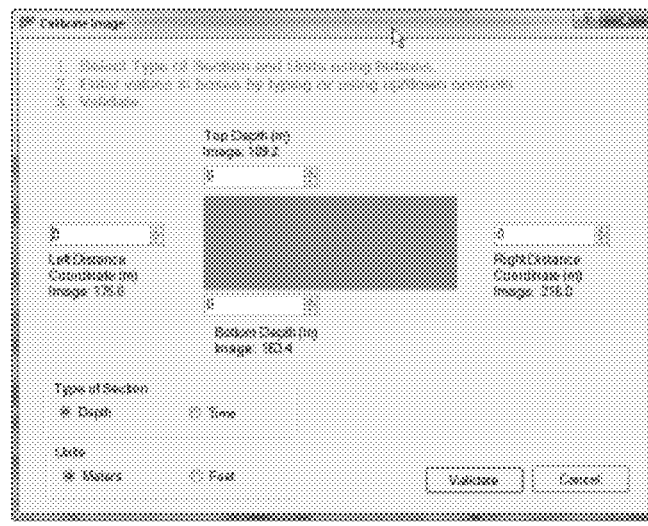
FIG. 5b illustrates an example of a dialog box raised by the software module, according to one embodiment of the invention.

FIG. 5b illustrates an example of a dialog box that the software module 300 has raised to obtain detailed information from the interpreter. This is a dialog box associated with calibration of an earth profile 250 as part of operation 120 (FIG. 1).

Interactive Interpretation and Modeling—FIG. 12

As described above, in operation 1200 of FIG. 1 the interpreter directs the software module 300 through a variety of more detailed subordinate operations which collectively allow the interpretation and modeling of an earth profile 250.

FIG. 12 is an operational flow diagram that shows the plurality of subordinate operations that comprise operation 1200 of FIG. 1. These subordinate operations are executed by the software module 300 under interactive direction of an interpreter.

In operation 1700 of FIG. 12 the interpreter directs the software module 300 through a variety of more detailed subordinate operations which collectively allow the interpretation of an earth profile 250 that was input in operation 120 of FIG. 1. These subordinate operations are described in greater detail below in the narrative associated with FIG. 17. These subordinate operations 1720 through 1748 are managed and performed by the curve segment manager 353 and curve category manager 354 within the software module 300.

In operation 1210 of FIG. 12 the interpreter selects a fault for modeling from the plurality of faults that have been interpreted in operation 1700. The interpreter makes an appropriate menu selection and then, in response to instructions from the software module 300, selects a fault for modeling by moving the cursor over the graphical window 330 that displays the current interpretation of the earth profile 250. The software module 300 highlights the fault that is closest to the cursor by thickening its line width. If the interpreter "left clicks", the fault is selected for modeling. If the software module 300 has stored a previous structural model for the selected fault, then that preexisting structural model is instantiated and made available for modification. Otherwise, the interpreter can create a new model associated with the selected fault. Operation 1210 is managed and performed by the model manager 355 within the software module 300.

In operation 1220 the interpreter directs the software module 300 to interactively define the structural deformation mechanism that will be used to create the structural model associated with the selected fault. The interpreter makes an appropriate menu selection and the software module 300 raises a dialog box wherein the interpreter can make selections and entries to define the deformation mechanism. An illustrative example is shown in FIG. 20c. Operation 1210 is managed and performed by the model manager 355 within the software module 300.

In operation 1900 of FIG. 12 the interpreter interactively directs the software module 300 through a variety of more detailed subordinate operations which collectively control the specifications for a structural model associated with the fault that was selected in operation 1210. These subordinate operations are described in greater detail below in the narrative associated with FIG. 19. These subordinate operations are managed and performed by the model manager 355 within the software module 300.

The operations 1700, 1210, 1220 and 1900 and their subordinate operations all make changes to the core data elements associated with the interpretation and the active structural model. These core data elements are stored within the current solution 360 in the software module 300. However these core data elements, by themselves, do not fully specify the current solution 360. In particular, the core data elements for the active structural model consist of relatively sparse control data, such as the hangingwall and footwall reference depths for modeled structural surfaces, as will be described below. Thus in order to complete the specification of the current solution 360, the software module 300 performs the critical operation 1300, whereby the full structural model is "instantaneously" computed.

The computations in operation 1300 are performed every time that one of the following events occurs:

A fault that is currently selected for modeling is modified in operation 1700.

A new fault is selected for modeling in operation 1210.

The deformation mechanism is changed in operation 1220.

One of the interactive controls for the active structural model is changed in operation 1900.

Referring back to the main narrative associated with the software module 300, the reader will appreciate that under many circumstances the operation 1300 will be performed every time that the interpreter moves a cursor or clicks in the graphical window.

Synchronous with the execution of operation 1300 the software module 300 also detects potential problems with the current interpretation and structural model and instantaneously displays warnings in the graphical window 330. For example, if part of a fault that is selected for modeling becomes unrealistically steep during the execution of operation 1700 an error warning will be raised. Numerous other warning conditions also pertain.

Computation of Structural Model—FIGS. 13-16

The operation "instantaneously compute structural model" 1300 of FIG. 12 is a key component of the method and system. We provide details of this operation before elaborating on some of the other operations shown in FIG. 12.

In one embodiment of the invention the manner in which the system 200 and software module 300 compute the structural model is based on the theory of Xiao and Suppe (1992). However, one skilled in the art will recognize that the methods described here may be adapted to accommodate other kinematic or dynamic models of structural development, while still retaining the essence of the interactivity. The adaptation of other such models enables additional embodiments of the invention which benefit from the core interactivity delivered by the present invention.

Referring now to FIG. 13, a flow chart showing the key subordinate computational operations 1310 through 1334 that comprise operation 1300 is provided.

In computational operation 1310, of the flowchart the software module 300 defines the geometry of the shear axes and the corresponding "shear vectors" associated with each bend of the modeled fault. More detail will be provided below.

In operational loop 1320, the software module 300 iterates over all the structural surfaces in the model performing a plurality of subordinate computations for each surface.

In surface computational operation 1322, the software module 300 defines a series of evenly spaced "surface elements" for the footwall and undisplaced hangingwall parts of the current surface.

In surface computational operation 1324, the software module 300 defines a "reference displacement vector" for the current surface corresponding to the displacement of the hangingwall reference point.

In operational loop 1330, the software module 300 iterates over each hangingwall surface element for the current surface performing a plurality of computations for each surface element.

In surface element operation 1332 the software module 300 defines an "initial displacement vector" for the current hangingwall surface element.

In surface element operation 1334, the software module 300 traces the initial displacement vector for the current surface element through the fault's shear axes to determine the deformed position for the surface element.

These computations will now be illustrated and explained with reference to FIGS. 14 through 16. Note that these images are intended to illustrate the operation of the software module 300 in computing a structural model and therefore a backdrop of an original earth profile 250 is not shown.

Figure 14:
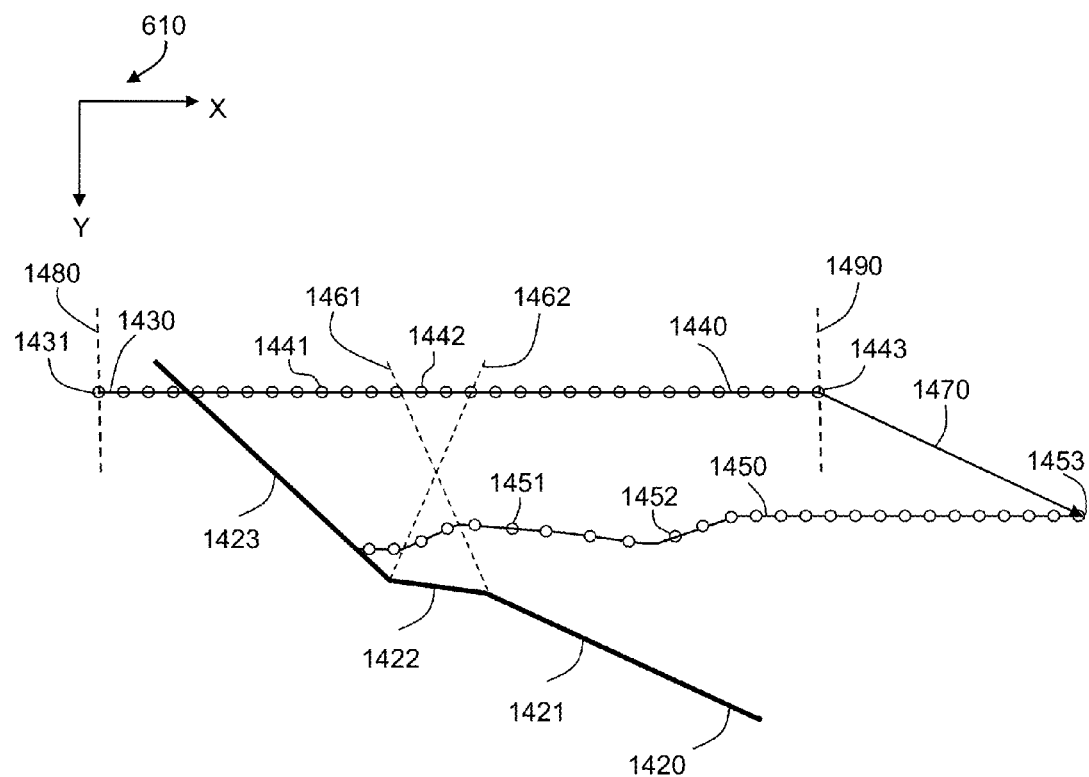
FIG. 14 is a vertical cross-section across a structural model of an extensional fault structure, illustrating computational nomenclature related to operation 1300, according to one embodiment of the invention.

FIG. 14 shows a vertical cross-section across a structural model of an extensional fault structure. The fault trace 1420 consists of a series of straight line segments 1421 through 1423 which are given index numbers from the bottom of the fault upwards in the order 1, 2, 3, etc. In this simple illustrative example, where the fault 1420 consists of only three segments, segment 1421 is given the index number 1, segment 1422 is given the index number 2, and segment 1423 is given the index number 3. This numbering scheme will be used in the later exposition associated with FIG. 15.

Again referring to FIG. 14, successive fault segments meet at bends. Referencing the theory developed by Xiao and Suppe (1992), a shear surface emanates from each fault bend and acts to deform rocks moving in the hangingwall of the fault. In FIG. 14, dashed lines 1461 and 1462 represent shear surfaces. Each shear surface is given an index number that is the same as the index number of the lower fault segment from whose end-point the shear surface emanates. Thus in FIG. 14, the shear surface 1461 is given the index 1 and shear surface 1462 is given the index 2. This numbering scheme will be used in the later exposition associated with FIG. 15.

Again referring to FIG. 14, each shear surface that emanates from a concave-upwards fault bend has an opposing or "antithetic" direction of dip as the main fault 1420. Each shear surface that emanates from a convex-upwards fault bend has the same or "synthetic" direction of dip as the main fault 1420. Thus shear surface 1462, which emanates from the concave-upward junction of fault segments 1422 and 1423, is an antithetic shear surface, meaning that it dips in an opposing direction to fault 1420. Shear surface 1461, which emanates from the convex-upward junction of fault segments 1421 and 1422, is a synthetic shear surface, meaning that it dips in the same direction as fault 1420.

Again referring to FIG. 14, surfaces 1430 and 1450 comprise a modeled structural surface, of which 1430 is the footwall part and 1450 is the displaced hangingwall part. At the time of deposition of the surface, the hangingwall part 1450 was originally in the position shown by line 1440, contiguous with the footwall part 1430. The hangingwall part 1450 was then displaced downwards, deforming in response to the bends in the fault 1420. The right hand end of the hangingwall surface 1450 moved along the trajectory indicated by the vector 1470, which is parallel to the deepest segment on the fault. Other points on the hangingwall surface 1450 were displaced in a more complicated trajectory as will be explained below. The footwall surface 1430 does not displace.

In the surface operation 1322 in FIG. 13 we represent an undeformed structural surface by a plurality of (X, Y) points, each of which is referred to as a "surface element". The spacing of these points is chosen to be close enough to represent the structural surface in effectively continuous fashion. In FIG. 14 the circles shown on the footwall structural surface 1430 and the undeformed hangingwall surface 1440 represent undeformed surface elements. The surface elements are defined between a footwall X-limit 1480 and a hangingwall X-limit 1490, both of which are represented by vertical dashed lines in FIG. 14. The footwall and hangingwall X-limits 1480, 1490 are chosen such that the structural model extends appropriately far on both footwall and hangingwall sides of the fault.

The surface element 1431 in FIG. 14 is the first surface element of the footwall structural surface 1430, and is also the "footwall reference point" for the structural surface, as described in the narrative associated with FIG. 6. The surface elements 1441 and 1442 are interior points in the undeformed hangingwall surface 1440. The surface element 1443 is the last surface element of the undeformed hangingwall structural surface 1440 and is also the "hangingwall reference point" for the structural surface.

As the hangingwall surface in FIG. 14 moves from its undeformed configuration 1440 to its deformed configuration 1450, each hangingwall surface element also moves. Thus, for example surface element 1441 moves to the position 1451, surface element 1442 moves to position 1452 and the last surface element 1443 moves to position 1453. The deformed surface elements comprising the deformed structural surface 1450 are no longer evenly spaced, as a result of deformational shear. The last surface element 1453 in the deformed hangingwall surface 1450 also represents the hangingwall reference point for the structural surface, as described in the narrative for FIG. 6.

In the computational method 1300 for the instantaneous computation of the structural model, the key to modeling the deformation of hangingwall surfaces is to take into consideration the deformation that surface elements undergo when they pass through shear surfaces. This entails a detailed consideration of the geometry of fault bends and shear surfaces.

Figure 15A:
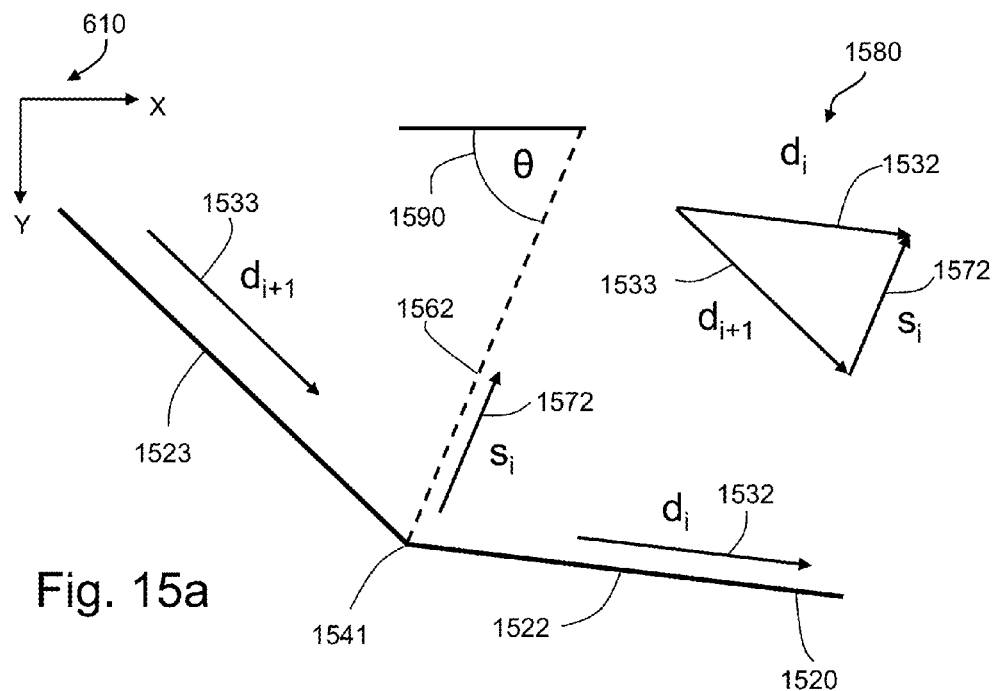
FIGS. 15a and 15b illustrate the manner in which displacement vectors and shear vectors are computed in the vicinity of fault bends, related to operation 1300, according to one embodiment of the invention.

FIG. 15a illustrates part of a fault 1520, in which there is a concave-upward fault bend 1541 where a lower fault segment 1522, with index number i, joins a an upper fault segment 1523, with an index number i+1. Because the fault bend is concave-upwards, there is an antithetic shear surface 1562 originating at the fault bend 1541. This shear surface 1562 dips at an angle θ 1590 in the opposing direction to the overall direction of dip of the fault 1520.

Consider a surface element moving downwards in the hangingwall of fault 1520. In the area above the fault segment 1523, the displacement vector is $d_{i+1}$ as shown by the vector 1533. In the area above the fault segment 1522, the displacement vector is $d_i$ as shown by the vector 1532. To accommodate the difference in displacement vectors as material passes through the fault bend 1541, a vectorial shear acts along the shear surface 1562. This shear is denoted $s_i$ and is shown by the vector 1572. To achieve material balance, the vector equation $d_i = d_{i+1} + s_i$ must be satisfied as shown in the vector diagram 1580 in the upper right hand part of FIG. 15a. In this vector diagram, the direction of each vector is known. In particular, vector 1533 is parallel to fault segment 1523, vector 1532 is parallel to fault segment 1522 and vector 1572 is parallel to the shear surface 1562. Consequently, by trigonometry, if the magnitude of one of the vectors in the vector diagram 1580 is known, the magnitude of the other two can be determined. Thus, for example, given the magnitude of $d_i$, the displacement along the lower fault segment 1522, one can determine the magnitudes of the shear $s_i$ and the displacement $d_{i+1}$ along the upper fault segment 1523.

Figure 15B:
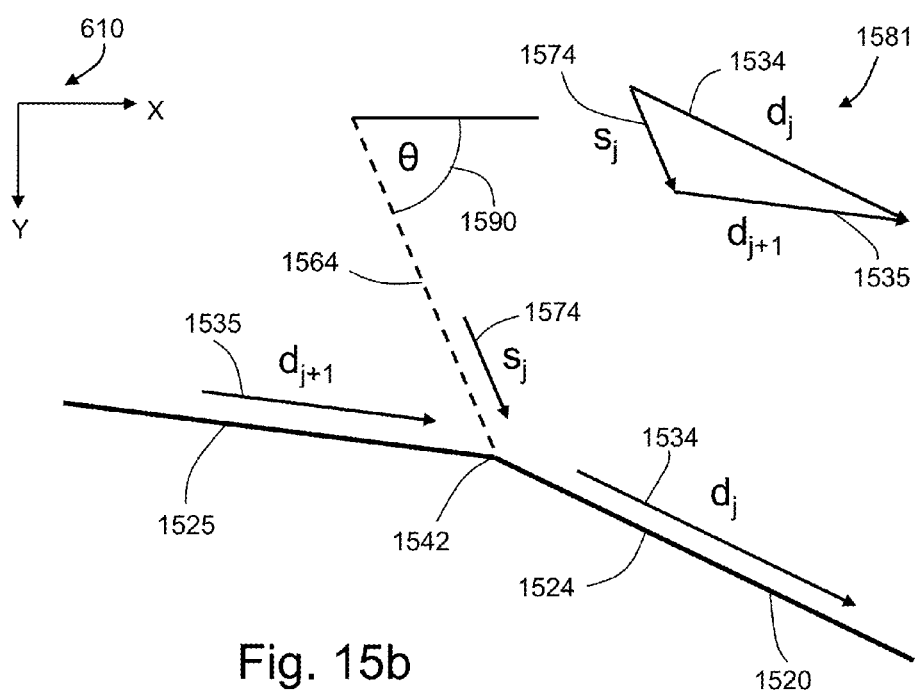

FIG. 15b illustrates another part of a fault 1520, in which there is a convex-upward fault bend 1542 where a lower fault segment 1524, with index number j, joins a an upper fault segment 1525, with an index number j+1. Because the fault bend 1542 is convex-upwards, there is a synthetic shear surface 1564 originating at the fault bend 1542. This shear surface 1564 dips at an angle θ 1590 in the same direction as the overall direction of dip of the fault 1520.

Consider a surface element moving downwards in the hangingwall of fault 1520. In the area above the fault segment 1525, the displacement vector is $d_{j+1}$ as shown by the vector 1535. In the area above the fault segment 1524, the displacement vector is $d_j$ as shown by the vector 1534. To accommodate the difference in displacement vectors as material passes through the fault bend 1542, a vectorial shear acts along the shear surface 1564. This shear is denoted $s_j$ and is shown by the vector 1574, which is downward directed in contrast to the vector 1572 in FIG. 15$a$. To achieve material balance, the vector equation $d_j = d_{j+1} + s_j$ must be satisfied as shown in the vector diagram 1581 in the upper right hand part of FIG. 15$b$. In this vector diagram, the direction of each vector is known. In particular, vector 1535 is parallel to fault segment 1525, vector 1534 is parallel to fault segment 1524 and vector 1574 is parallel to the shear surface 1564. Consequently, by trigonometry, if the magnitude of one of the vectors in the vector diagram 1581 is known, the magnitude of the other two can be determined. Thus, for example, given the magnitude of $d_j$, the displacement along the lower fault segment 1524, one can determine the magnitudes of the shear $s_j$ and the displacement $d_{j+1}$ along the upper fault segment 1525.

The relationships shown in FIGS. 15$a$ and 15$b$ allow the computations of shear vectors for each hangingwall shear surface, scaled to the magnitude of a reference displacement vector. Together with the determination of the geometries axes themselves, these computations together comprise the computation "define shear axes and shear vectors for fault" 1310 in FIG. 13.

For a fault which has multiple crossing hangingwall shear surfaces, an important geometric property can be deduced as a consequence of the vectorial nature of shear along shear surfaces. This geometric property is that the displacement vector at position B in the hangingwall of a fault can determined from the displacement vector at position A by traversing the hangingwall along an arbitrary path between A and B, while adding the appropriately scaled shear vectors for shear surfaces in the order that they are crossed. Appropriate scaling means that the shear vector should be scaled according to the magnitude of the "incoming" displacement vector as in FIGS. 15$a$ and 15$b$. This geometric property provides the key to determining the deformed positions of hangingwall surface elements, as will be discussed in the narrative for FIGS. 16$a$ and 16$b$.

Figure 16A:
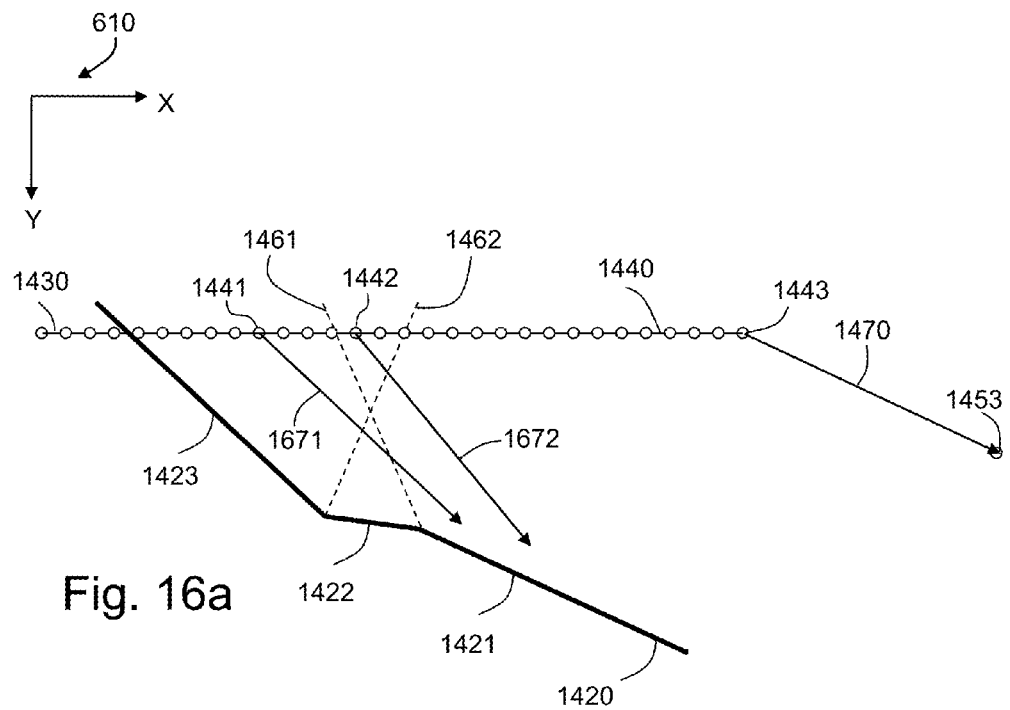
FIGS. 16a and 16b are vertical cross-sections across a structural model of an extensional fault structure, illustrating how structural surface elements and their displacement vectors are defined, related to operation 1300, according to one embodiment of the invention.
Figure 16B:
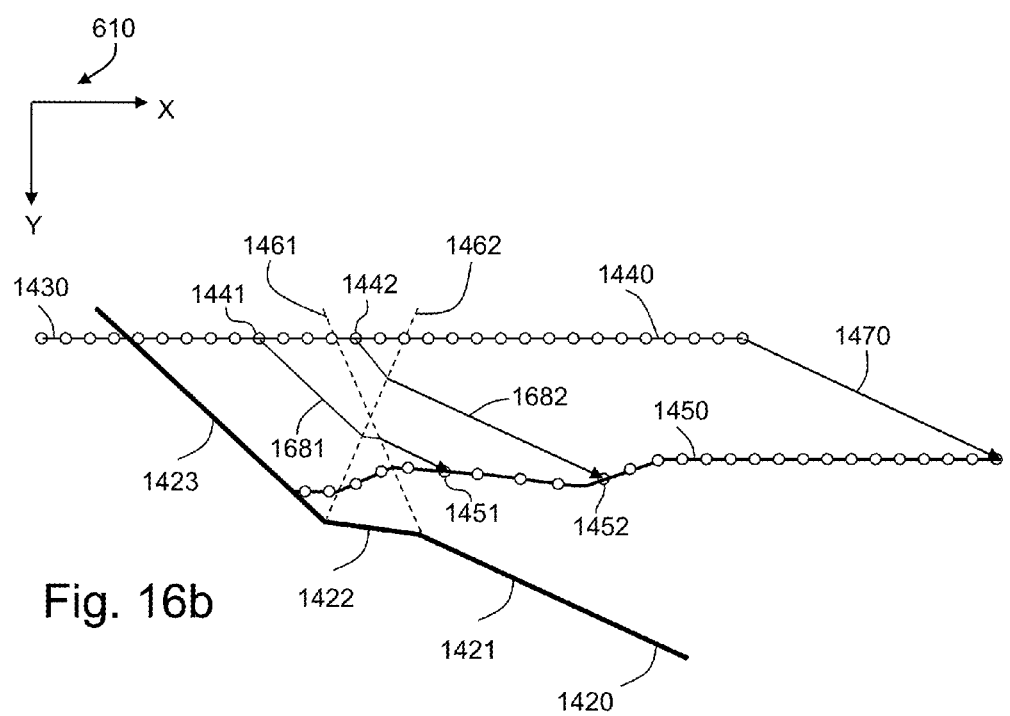

FIG. 16$a$ shows an elaboration of parts of FIG. 14. Line 1430 is again a footwall part of a modeled structural surface. Line 1440 again represents the hangingwall part of the same structural surface prior to deformation on the fault 1420. The small circles on surface 1430 and surface 1440 again depict evenly spaced surface elements that are sufficiently close to represent the structural surface.

In FIG. 16$a$ let us suppose that the hangingwall displaces in such a way that the extreme hangingwall surface element 1443 displaces to hangingwall reference point 1453 according to the vector 1470, which is parallel to the deepest fault segment 1420. We refer to this vector as the "reference displacement vector". Consider the undeformed hangingwall surface element 1442. We wish to determine the "initial displacement vector" for this surface element, which is the vector that is geometrically consistent with the reference displacement vector 1470. According to the geometric property discussed above, this vector can be found by traversing from surface element 1443 to surface element 1442. We note that only one shear surface 1462 is crossed in this traverse. Accordingly we add an appropriately scaled shear vector for shear surface 1462 to vector 1470, yielding the initial displacement vector 1672 for surface element 1442. Applying similar logic to surface element 1441 we find that we need to add appropriately scaled versions of the shear vectors for shear surfaces 1462 and then 1461 to the vector 1470. This yields the initial displacement vector 1671 for surface element 1441. The same sort of computation can be carried out for each undeformed hangingwall surface element. These computations collectively comprise the computations "define initial displacement vector" 1332 that are executed for each hangingwall surface element within the loop 1330 of FIG. 13.

Referring again to FIG. 16$a$ it is clear that surface elements 1441 and 1442 cannot be displaced simply by the vectors 1671 and 1672 respectively. This is because each of these vectors crosses one or more shear surfaces where the direction of hangingwall displacement must change.

FIG. 16$b$ shows an elaboration of parts of FIG. 16$a$. In this case the simple initial displacement vector 1671 for surface element 1441 has been replaced by the composite displacement path 1681. This composite displacement path 1681 bends first where it crosses shear surface 1462 and then where it crosses shear surface 1461. The path 1681 eventually ends at the deformed surface element position 1451. Likewise the simple initial displacement vector 1672 for surface element 1442 has been replaced by the composite displacement path 1682. This composite displacement path 1682 bends where it crosses shear surface 1462 and eventually ends at the deformed surface element position 1452.

Each composite displacement path is computed in the following way. First the initial displacement vector is intersected with all shear surfaces and the closest intersection is found, if any. The remaining initial displacement vector beyond the closest shear surface intersection is added to an appropriately scaled shear vector for the shear surface that has been crossed. This creates a partial displacement vector for the geometric domain beyond the shear surface. This partial displacement vector is intersected with all shear surfaces that have not yet been crossed, and the computation iterates until no more shear surfaces are crossed. These computations collectively comprise the computation "trace displacement vector through shear axes to define deformed position for surface element" 1334 that is executed for each hangingwall surface element within the loop 1330 of FIG. 13. Note that this method of transforming an initial displacement vector into a composite displacement is another application of the geometric property discussed above.

We now note an important additional principle associated with the method for instantaneous computation of the structural model 1300 which we have described above. Referring to various elements in FIGS. 14 and 15, this principle is that the shape of a modeled structural surface is fully determined by the following variables: (1) the (X, Y) coordinates of the points defining the fault trace 1420, (2) the inclination angle of the hangingwall shear surfaces 1590 and, (3) the (X, Y) coordinates of the footwall reference point 1431 and, (4) the (X, Y) coordinates of the hangingwall reference point 1443. Furthermore if the footwall X-limit 1480 is determined from the fault geometry, variable (3) reduces to the specification of the "footwall reference depth", that is, the Y-coordinate of the footwall reference point 1431. If the hangingwall X-limit 1490 is determined from the fault geometry, variable (4) reduces to the specification of the "hangingwall reference depth", that is, the Y-coordinate of the hangingwall reference point 1443. This latter relationship is because the reference displacement vector 1470 is parallel to the lowest segment 1421 of the fault 1420.

The data associated with each structural model is stored as part of the data hierarchy for the solution object 360, which is illustrated in FIGS. 27 through 32 and is discussed in the associated narrative.

Figure 18:
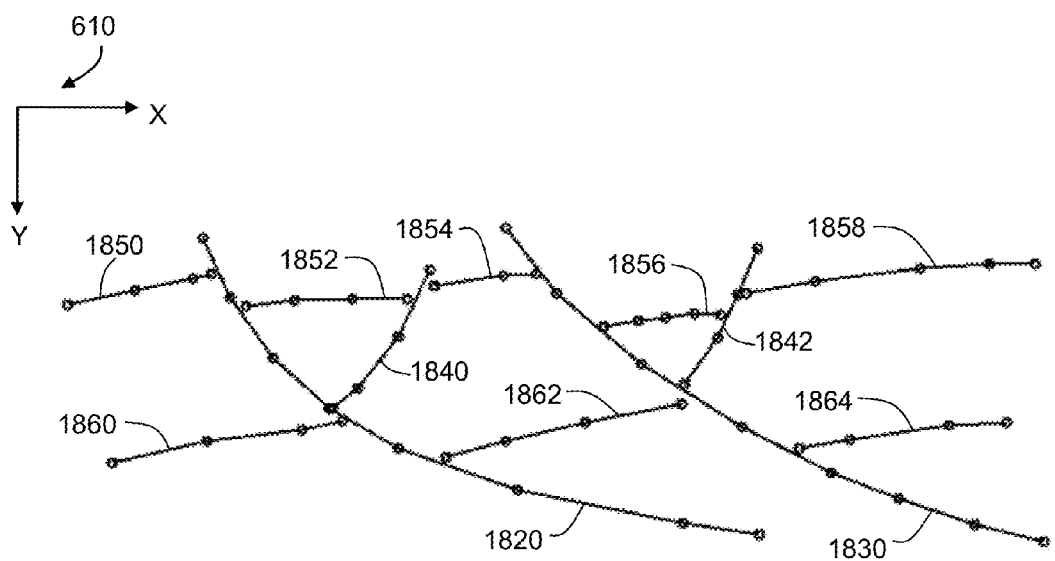
FIG. 18 illustrates the nature of curve segments and curve categories within an interactive interpretation, according to one embodiment of the invention.

Interactively Interpret Geologic Structures—FIGS. 17-18

FIG. 17 is an operational flow diagram that shows the plurality of subordinate operations that comprise operation 1700 of FIG. 12. These subordinate operations are executed by the software module 300 under interactive direction of an interpreter. The operations 1720 through 1748 shown in FIG.

17 collectively allow the interpretation of geologic structures on an earth profile 250. The operation 1700 is designed, in its component parts, to optimally support both the tight integration of interpretation and modeling 1200, and the capability of "one-click" structural restoration 3300.

In FIG. 17, there are two related higher-level operations: "interpret curve segments" 1720 and "manage curve categories" 1740 each of which comprises a plurality of subordinate operations also shown in FIG. 17.

The operation "interpret curve segments" 1720 of FIG. 17 allows the interpreter to direct the software module 300 to create, augment, modify and store a list of entities known as "curve segments". A curve segment is a data structure within software module 300 which contains a list of (X, Y) coordinates representing a connected set of locations within the earth profile 250. The curve segment data structure also contains a reference to the "curve category" to which the curve segment is assigned. The operation 1720 comprises a number of subordinate operations 1722 through 1734 which will be described below. In the software module 300, the operation 1720 and the subordinate operations 1722 to 1734 are implemented by the software object "curve segment manager" 353 of FIG. 3.

The operation Manage Curve Categories 1740 of FIG. 17 allows the interpreter to direct the software module 300 to create, augment, modify and store a list of entities known as "curve categories". A "curve category" is a data structure within software module 300 that allows curve segments within an interpretation to be appropriately categorized. The curve category comprise a series of attributes including a "curve type", which can be "Fault" or "Horizon", a "curve name" which can be an arbitrary alphanumeric string, and various curve display attributes such as "color" and "line width". As an aside to the current discussion, note that curve category objects are also attached to structural surfaces in structural models, in which case the "curve type" is "Modeled Structural Surface". The operation 1740 comprises a number of subordinate operations 1742 through 1748 which are described below. In the software module 300, the operation 1740 and the subordinate operations 1742 to 1748 are implemented by the software object "curve category manager" 354 of FIG. 3.

To illustrate the nature of curve segments and curve categories, FIG. 18 shows an example of an interpretation overlain on a blank cross-section. The interpretation comprises a plurality of curve segments 1820 through 1864. Each curve segment consists of a list of connected points. Each point is indicated by a circle in the representation of FIG. 18 and is stored within software module 300 as an (X, Y) coordinate pair. Each curve segment has an associated curve category. More than one curve segment can belong to the same curve category. Thus in the example of FIG. 18, curve segment 1820 belongs to a curve category with type "Fault" and name "Fault_1", curve segment 1830 belongs to a curve category with type "Fault" and name "Fault_2", and both curve segments 1840 and 1842 belong to a curve category with type "Fault" and name "Minor_Fault". In the same example, curve segments 1850, 1852, 1854, 1856, and 1858 all belong to a curve category with type "Horizon" and name "Horizon_1" whereas curve segments 1860, 1862, and 1864 all belong to a curve category with type "Horizon" and name "Horizon_2".

The data associated with the current interpretation is stored as part of the data hierarchy for the solution object 360, which is illustrated in FIGS. 27 through 32 and is discussed in the associated narrative. In the particular case of faults, the data for any structural model associated with a fault is stored subordinate to the data object for the fault.

Interpret Curve Segments—FIG. 17

Referring again to FIG. 17, we now discuss the detailed subordinate operations 1722 through 1734 by which the interpreter can direct the software module 300 to manage a list of curve segments that is stored by the software module 300. The interpreter initiates each of these operations by selecting the appropriate menu item from the menu system 320 of software module 300.

The descriptions below refer to "highlighting" a curve segment or points within a curve segment. In the software module 300, curve segments are instantaneously highlighted by thickening their displayed line widths and points within a curve segment are highlighted by displaying them as circles.

In operation 1722 of FIG. 17 the interpreter interactively directs the software module 300 to draw a new curve segment. The curve category to which the new curve segment belongs is determined by the currently "active curve category". If there is no currently active curve category, the interpreter is prompted to specify an active curve category via operation 1744 of FIG. 17. The interpreter moves the cursor and successively "left clicks" to add points to the new curve segment. The software module 300 connects previously added points by line segments in a color and style appropriate to the curve category to which the curve segment belongs. Between clicks the software module 300 draws a continuously variable "rubber band" line segment between the previously added point and the cursor. The interpreter "right clicks" to terminate the drawing of a new segment, at which point the software module 300 stores the new segment.

In operation 1724 of FIG. 17, the interpreter directs the software module 300 to identify curve segments that have been interpreted on the current earth profile 250. The interpreter moves the cursor and the software module 300 highlights the nearest curve segment and displays details of the curve category to which it belongs as a dynamic label close to the cursor. If the interpreter "left clicks" when a curve segment is highlighted the curve category to which the curve segment belongs is made the active curve category for subsequent drawing operations 1722 and reassign curve segment operations 1732. A right click terminates the "identify" operation 1724.

In operation 1726 of FIG. 17, the interpreter directs the software module 300 to modify curve segments that have been interpreted on the current earth profile 250. The software module 300 highlights the points on all curve segments. If the interpreter "left clicks" on or near a point on a curve segment, then that point becomes active and moves with the cursor, along with the line segments to which it connects. A second left click places the point in a new position. A right click terminates the "modify" operation 1726.

In operation 1728 of FIG. 17, the interpreter directs the software module 300 to add points to a curve segment. The interpreter moves the cursor and the software module 300 highlights the nearest curve segment. If the interpreter "left clicks" when a curve segment is highlighted the curve segment becomes active for the addition of points. Wherever the interpreter "left clicks" a new point is added to the curve segment, either within or beyond the end of the curve segment depending on geometry. A "right click" terminates the "add points" operation 1728.

In operation 1730 of FIG. 17, the interpreter directs the software module 300 to delete points from curve segments. The software module 300 highlights the points on all curve segments. If the interpreter "left clicks" on or near a point on a curve segment, then that point is deleted from the curve segment. A right click terminates the "delete points" operation 1730.

In operation 1732 of FIG. 17, the interpreter directs the software module 300 to reassign a curve segment to belong to a different curve category. The interpreter moves the cursor and the software module 300 highlights the nearest curve segment. If the interpreter "left clicks" when a curve segment is highlighted the curve segment is reassigned to belong to the current active curve category. A right click terminates the "reassign curve segment" operation 1732.

In operation 1734 of FIG. 17, the interpreter directs the software module 300 to delete a curve segment. The interpreter moves the cursor and the software module 300 highlights the nearest curve segment. If the interpreter "left clicks" when a curve segment is highlighted the curve segment is deleted. A "right click" terminates the "delete curve segment" operation 1734.

Manage Curve Categories—FIG. 17

Referring again to FIG. 17, we now discuss the detailed subordinate operations 1742 through 1748 by which the interpreter can direct the software module 300 to manage the list of curve categories that is stored by the software module 300. The interpreter initiates each of these operations by selecting the appropriate menu item from menu system 320 of software module 300.

In operation 1742 of FIG. 17, the interpreter directs the software module 300 to create and store a new curve category. The software module 300 displays a dialog box within which the interpreter can specify the attributes of the new curve category including the curve type, name, and display attributes.

In operation 1744 of FIG. 17, the interpreter directs the software module 300 to set the active curve category for "draw" operation 1722 and for the "reassign curve segment" operation 1732. The software module 300 displays a dialog box containing a list of curve categories from which the interpreter chooses.

In operation 1746 of FIG. 17, the interpreter directs the software module 300 to redefine the attributes of a curve category. The software module 300 displays a dialog box containing a list of curve categories from which the interpreter chooses a curve category to redefine. The software module 300 displays another dialog box within which the interpreter can specify the new attributes of the new curve category including the curve type, name, and display attributes. When a curve category is redefined the display of all curve segments belonging to that curve category is instantaneously changed in appropriate fashion.

In operation 1748 of FIG. 17, the interpreter directs the software module 300 to delete a curve category. The software module 300 displays a dialog box containing a list of curve categories from which the interpreter chooses a curve category to delete. When a curve category is deleted all curve segments belonging to that curve category are also deleted.

Figure 19:
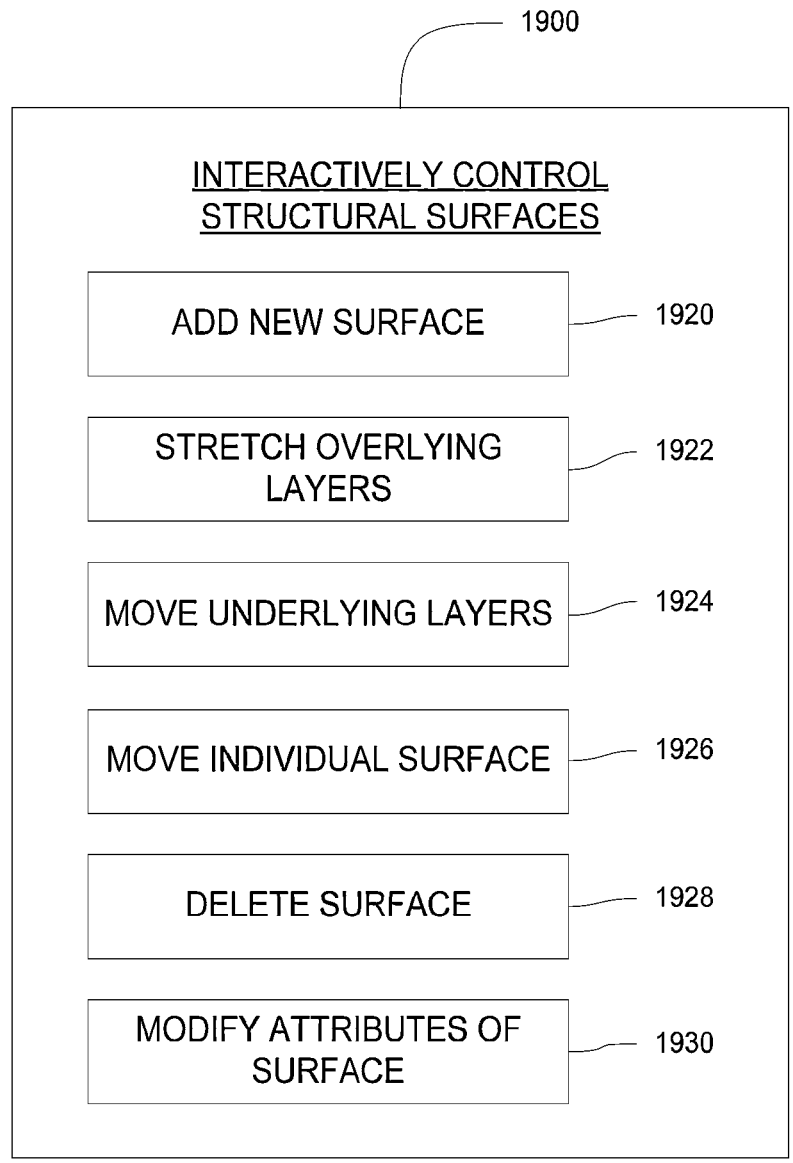
FIG. 19 is an operational flow diagram showing the plurality of subordinate operations comprising the operation 1900 of FIG. 12 for interactively controlling structural surfaces, according to one embodiment of the invention.

Interactively Control Structural Surfaces—FIG. 19

FIG. 19 is an operational flow diagram that shows the plurality of subordinate operations that comprise operation "interactively control structural surfaces" 1900 of FIG. 12. These subordinate operations are executed by the software module 300 under interactive direction of an interpreter. The operations 1920 through 1930 shown in FIG. 19 collectively allow the creation and modification of a structural model. In the software module 300, the operation 1900 and the subordinate operations 1920 to 1930 are implemented by the software object "model manager" 355 of FIG. 3. The interpreter initiates each of these operations by selecting the appropriate menu item from the menu system 320 of software module 300.

Operations 1920 through 1926 all modify the geometry of the structural surfaces in a structural model with the control being provided by cursor movements. In operations 1920 through 1926 the interpreter does not need to designate in advance whether he or she is acting on the footwall or the hangingwall side of the fault. As the interpreter moves the cursor, the software module 300 automatically determines whether the cursor is on the footwall side or the hangingwall side of the fault. For ease of description we can designate the side of the fault where the cursor is situated as the "active side" and the other side of the fault as the "other side". Thus if the cursor is on the footwall side of the fault, the active side is the footwall side and the other side is the hangingwall side, whereas if the cursor is on the hangingwall side of the fault the reverse designations apply. It will also be recalled from the discussion related to the operation "instantaneously compute structural model" 1300 that a structural surface is uniquely determined if its footwall and hangingwall reference depths are known. Thus in operations 1920 through 1930 it is sufficient to define reference depths for the active side and the other side of the fault and then to perform the computation of the structural model in operation 1300.

In operation 1920 of FIG. 19 the interpreter interactively directs the software module 300 to add a new structural surface to the active structural model. The interpreter can add new surfaces to a structural model at any stage of its development.

In the execution of operation 1920 the interpreter is first presented with a dialog box in which he or she enters the description of the structural surface that will be added. Then as the interpreter moves the cursor a new surface is added and continuously adjusted based on the position of the cursor. On the active side of the fault, the reference depth for the new surface is set equal to the Y-value of the cursor in the coordinate system of the earth profile 250. The reference depth for the surface on the other side of the fault is computed in conditional fashion as follows:

(1) If the active side reference depth for the new surface is above the reference depths for all existing surfaces, then the reference depth of the new surface on the other side is set equal to the reference depth on the active side. This condition ensures that a new surface that is added above all existing surfaces is horizontal and is not offset by the fault.

(2) If the active side reference depth of the new surface is below the active side reference depths for all the existing surfaces then the difference between the active side reference depth for the new surface and the active side reference depth for the deepest existing surface is computed. This difference is added to the other side reference depth for the deepest surface to give the other side reference depth for the new surface. This ensures that the new surface defines the base of a layer that has constant thickness prior to deformation.

(3) If the active side reference depth of the new surface lies between the active side reference depths for two existing surfaces then its fractional relationship within the intervening interval is computed. The other side reference depth is inserted in the same fractional relationship to the corresponding intervening interval on the other side. This ensures that new surfaces are inserted in a way that preserves expansion ratios.

In operation 1922 of FIG. 19 the interpreter interactively directs the software module 300 to stretch overlying layers in the active structural model. The interpreter can stretch overlying layers in a structural model at any stage of its development. This operation is very useful in situations where the initial strata were deposited before fault movement ("pregrowth" strata) and the later strata were deposited during fault movement ("growth" strata). Stretching overlying layers is an efficient technique for creating simple models where the expansion ratio changes in a discrete fashion.

In the execution of operation 1922 the software module 300 highlights the reference points for all structural surfaces. If the interpreter "left clicks" on or near a reference point then the corresponding active side surface is selected. As the interpreter subsequently moves the cursor, the active side reference depth for the surface changes accordingly. The overlying active side layers are stretched or contracted by proportionally changing the offset of the each reference depth with respect to the reference depth of the uppermost surface. The reference depths for surfaces below the selected surface are shifted up or down in response to the movement of the selected reference depth. The reference depths on the other side of the fault are not modified. A second left click places active side surfaces in their new positions. A right click terminates the "stretch overlying layers" operation 1922.

If in operation 1922 the interpreter has clicked on a hangingwall reference point and is controlling the movement of the surface using the cursor, the software module 300 uses an indirect method of calculating the new reference depth for selected surface. Rather than simply using the Y-coordinate of the cursor to control the reference depth, the software module 300 uses the X-coordinate of the cursor to control the horizontal position of the reference point and then back-calculates the new reference depth independent of the Y-coordinate of the cursor. This provides a sensitive way of defining the new reference depth in situations where the deepest fault segment is close to horizontal. If the interpreter has clicked on a footwall reference point the software module 300 uses the cursor Y-coordinate directly to control the new reference depth for selected surface.

In operation 1924 of FIG. 19 the interpreter interactively directs the software module 300 to move underlying layers in the active structural model. This operation allows the interpreter to control the expansion ratio of the individual layer immediately above the surface that is displaced while preserving the expansion ratios of all other layers. There are no changes to the shapes of the surfaces above the surface is being modified. This operation is useful when it is wished to model a structure in an incremental fashion from the top down.

In the execution of operation 1924 the software module 300 highlights the reference points for all structural surfaces. If the interpreter "left clicks" on or near a reference point then the corresponding active side surface is selected. As the interpreter subsequently moves the cursor, the active side reference depth for the selected surface changes accordingly, depending on either the vertical or horizontal position of the cursor as described above for operation 1922. The reference depths for surfaces below the selected surface are shifted up or down in response to the movement of the selected reference depth. The reference depths on the other side of the fault are not modified. A second left click places active side surfaces in their new positions. A right click terminates the "move underlying layers" operation 1924. As described above for operation 1922 the software module uses the horizontal movement of the cursor to determine the new reference depth for a selected surface on the hangingwall side of the fault.

In operation 1926 of FIG. 19 the interpreter interactively directs the software module 300 to move an individual surface in a currently active structural model. This operation lets the interpreter move an individual surface on the footwall or hangingwall of a fault. The shape of the surface that is being moved changes along with the expansion ratios of the layers above and below. All other surfaces remain the same. This operation allows fine control of the position of an individual surface on the hangingwall or footwall of a fault.

In the execution of operation 1926 the software module 300 highlights the reference points for all structural surfaces. If the interpreter "left clicks" on or near a reference point then the corresponding active side surface is selected. As the interpreter subsequently moves the cursor, the active side reference depth for the selected surface changes accordingly, depending on either the vertical or horizontal position of the cursor as described above for operation 1922. The reference depths for other surfaces are not modified. A second left click places the selected surface in its new positions. A right click terminates the "move individual surface" operation 1926.

In operation 1928 of FIG. 19 the interpreter interactively directs the software module 300 to delete a surface in a currently active structural model. The software module 300 highlights the reference points for all structural surfaces. If the interpreter "left clicks" on or near a reference point, then the selected structural surface is deleted in its entirety, including both footwall and hangingwall parts. A right click terminates the "delete surface" operation 1926.

In operation 1930 of FIG. 19 the interpreter interactively directs the software module 300 to modify the attributes of a surface in a currently active structural model. The interpreter is first presented with a list of all structural surfaces. After selecting a surface from the list, the interpreter modifies the attributes of the surface in another dialog box.

Examples of Interactive Interpretation and Modeling—FIGS. 20-24

FIGS. 20*a*, 20*b*, 20*c*, 21*a*, 21*b*, 22*a*, 22*b*, 22*c*, and 22*d* all show a variety of examples of interactive modifications of a structural model illustrating various operations from FIGS. 12, 17 and 19.

It is impossible to illustrate fully the nature of interactive interpretation and modeling in this illustration without the benefit of a real-time demonstration of the software module 300. Each of these examples shows an instantaneous snapshop of a dynamically changing display, in which the structural model is changing in real-time in response to movements of the cursor as directed by the interpreter.

Figure 20:
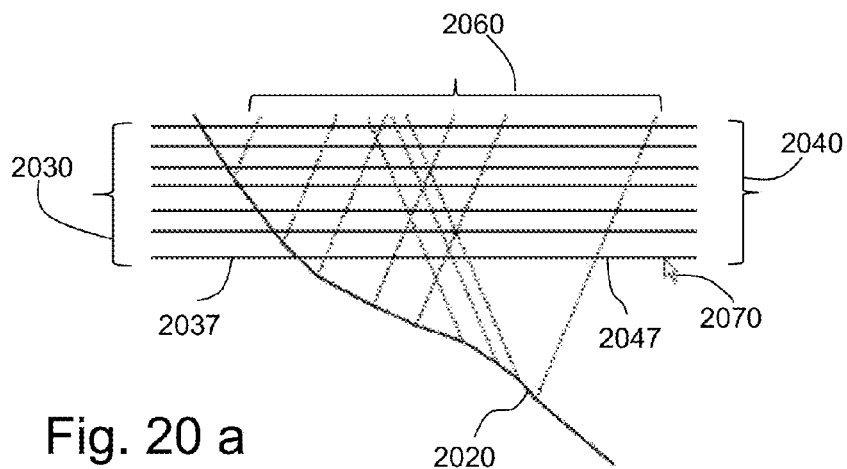
FIG. 20a illustrates an example of adding a structural surface to a structural model, related to operation 1920 of FIG. 19, according to one embodiment of the invention.
FIG. 20b illustrates an example of stretching overlying layers in a structural model, related to operation 1922 of FIG. 19, according to one embodiment of the invention.
FIG. 20c illustrates an example of interactively controlling the deformation mechanism in a structural model, related to operation 1220 of FIG. 12, according to one embodiment of the invention.
Figure 20:
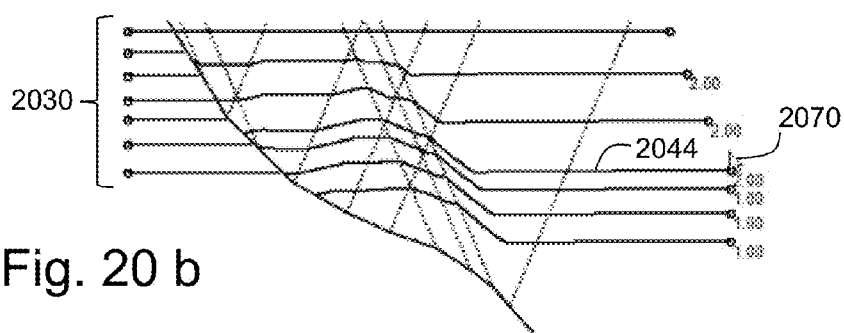
Figure 20:
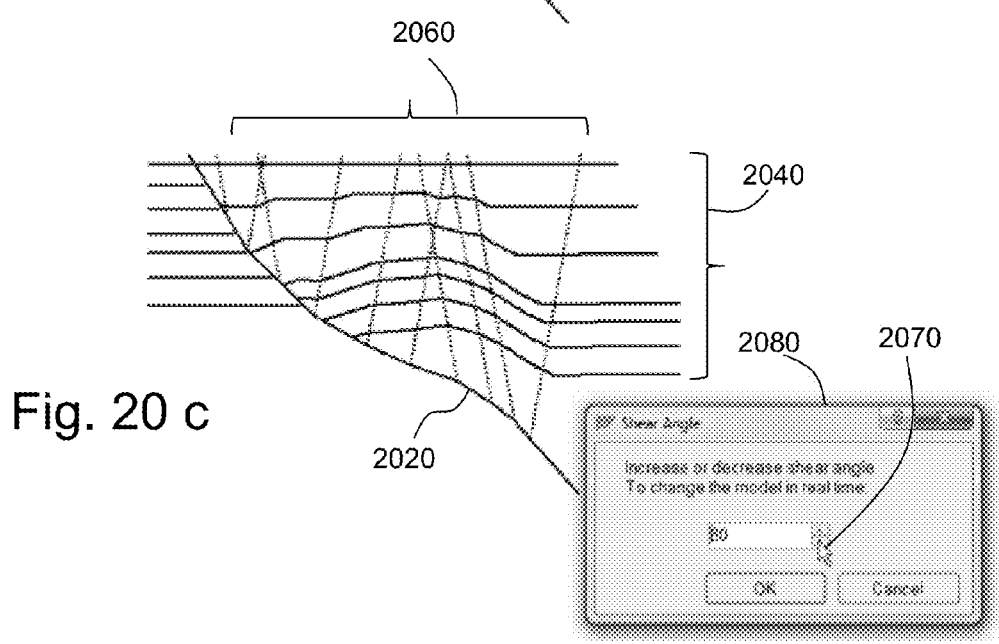
Figure 21:
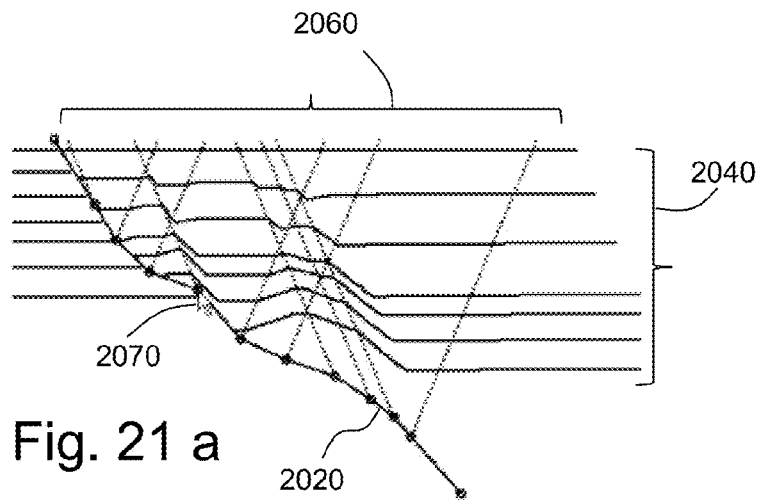
FIG. 21a illustrates an example of modifying a fault interpretation and thereby changing a structural model, related to operation 1726 of FIG. 17, according to one embodiment of the invention.
FIG. 21b illustrates an example of modifying a fault interpretation by adding a point and thereby changing a structural model, related to operation 1728 of FIG. 17, according to one embodiment of the invention.
Figure 21:
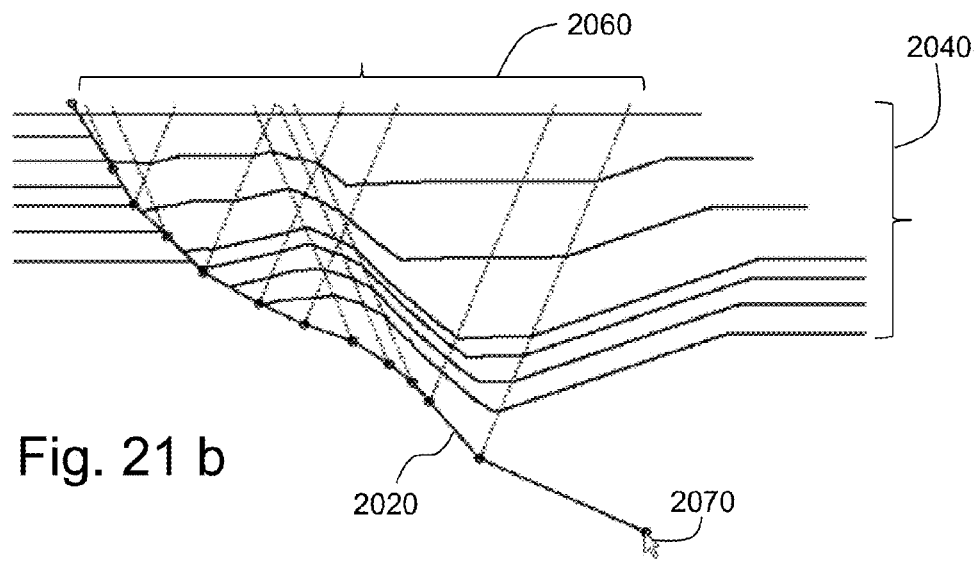
Figure 22:
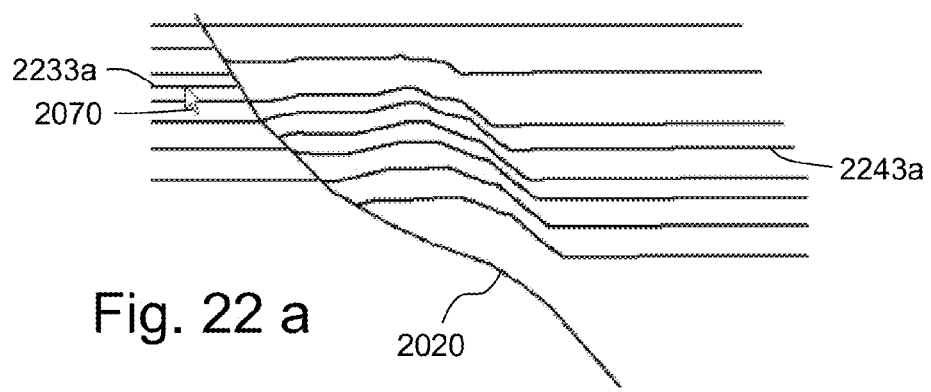
FIG. 22a illustrates an example of adding a structural surface to a structural model, between existing surfaces, related to operation 1920 of FIG. 19, according to one embodiment of the invention.
FIG. 22b illustrates an example of adding a structural surface to a structural model, below existing surfaces, related to operation 1920 of FIG. 19, according to one embodiment of the invention.
FIG. 22c illustrates an example of moving underlying layers in a structural model, related to operation 1924 of FIG. 19, according to one embodiment of the invention.
FIG. 22d illustrates an example of moving an individual surface in a structural model, related to operation 1926 of FIG. 19, according to one embodiment of the invention.
Figure 22:
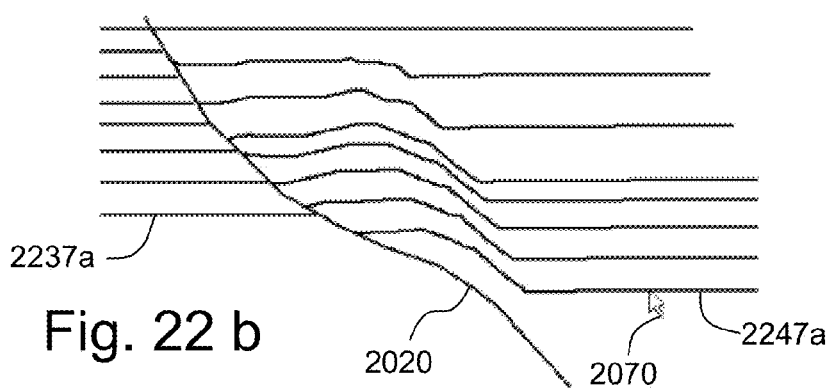
Figure 22:
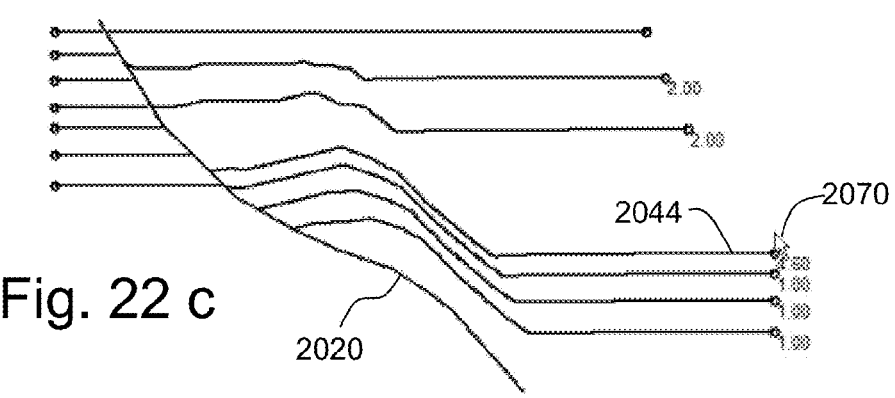
Figure 22:
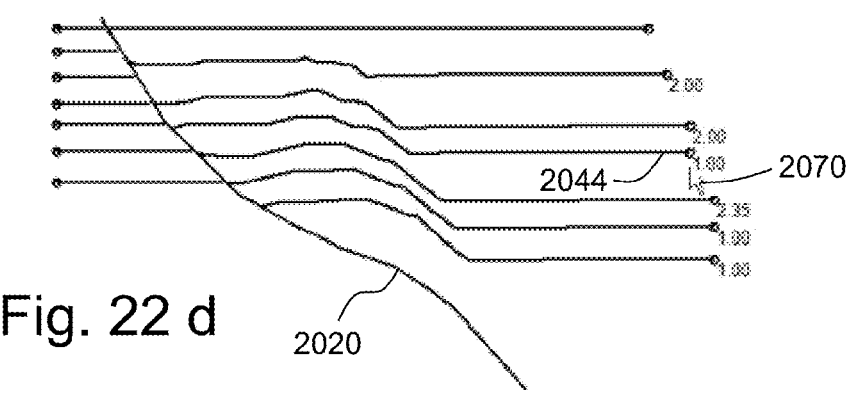

FIG. 20*a* provides a partial key to common features in FIGS. 20*a* through 22*d*. A fault 2020 has been previously selected for modeling (operation 1210 of FIG. 12). The structural model for the fault has a plurality of footwall structural surfaces 2030, hangingwall structural surfaces 2040, and shear axes 2060. The interpreter is providing interactive input to guide the operations of the software module 300 by moving an arrow cursor 2070.

FIG. 20*a* illustrates an example of the operation "add new surface" 1920 of FIG. 19. Six structural surfaces have already been added, but have not yet been deformed, and the interpreter is in the process of adding a seventh structural surface. The interpreter has specified the attributes of the new surface in a dialog box (not shown). The reference depth of the new hangingwall surface 2047 tracks the Y-coordinate of the cursor 2070. Because the new structural surface is deeper than all existing surfaces, and there is no displacement on any of the existing surfaces, the reference depth of the footwall structural surface 2037 also tracks the Y-coordinate of the cursor 2070. Thus in this instance, the new structural surface is an undeformed horizontal surface.

FIG. 20b illustrates an example of the operation "stretch overlying layers" 1922 of FIG. 19. The interpreter has "left-clicked" on the reference point for hangingwall surface 2044. The horizontal movement of the cursor controls the reference point position, and hence reference depth, for the selected hangingwall surface 2044. All the overlying hangingwall layers are stretched proportionally. Each number next to a hangingwall reference point gives the instantaneous value of the expansion ratio for the overlying layer, that is, the ratio of hangingwall to footwall reference thickness. In this case, the top three hangingwall layers have been stretched to an expansion ratio of 2.0

FIG. 20c illustrates an example of the operation "interactively control deformation mechanism" 1220 of FIG. 12. In this case the interpreter is interactively modifying the shear angle for coulomb collapse by interacting with a dialog box 2080. The shear surfaces 2060 associated with the fault 2020 instantaneously change along with the configuration of hangingwall surfaces 2040.

FIG. 21a illustrates an example of the operation "modify curve segment" 1726 of FIG. 17. The interpreter has "left-clicked" on a point on the fault 2020. As the cursor moves, the local shape of the fault 2020 changes. There is an instantaneous change in the shear surfaces 2060 and the configuration of hangingwall surfaces 2040.

FIG. 21b illustrates an example of the operation "add points to curve segment" 1728 of FIG. 17. The interpreter has selected the fault 2020 to add points. Left clicking at the position of the cursor adds a new point to the bottom end of the fault. There is an instantaneous change in the shear surfaces 2060 and the configuration of hangingwall surfaces 2040. The interpreter could also add a point at an interior position within the fault.

FIG. 22a illustrates another example of the operation "add new surface" 1920 of FIG. 19. In this case, the preexisting hangingwall surfaces are already deformed as in FIG. 20b and the interpreter is adding a new footwall surface between existing surfaces. The interpreter has specified the attributes of the new surface in a dialog box (not shown). The interpreter is adding a new footwall surface 2233a between the third and fourth deepest existing surfaces by moving the cursor 2070 on the footwall side of the fault 2020. The reference depth of the new footwall surface 2233a tracks the Y-coordinate of the cursor 2070. A new deformed hangingwall surface 2243a is automatically and instantaneously added at an equivalent proportional position on the other side of the fault.

FIG. 22b illustrates another example of the operation "add new surface" 1920 of FIG. 19. In this case, the preexisting hangingwall surfaces are already deformed as in FIG. 20b and the interpreter is adding a new hangingwall surface below existing surfaces. The interpreter has specified the attributes of the new surface in a dialog box (not shown). The interpreter is adding a new hangingwall surface 2247a below existing surfaces by moving the cursor 2070 on the hangingwall side of the fault 2020. The reference depth of the new hangingwall surface 2247a tracks the Y-coordinate of the cursor 2070. A new footwall surface 2237a is automatically added on the other side of the fault in such a position that the thickness of the overlying layer is same as the equivalent reference layer thickness on the hangingwall.

FIG. 22c illustrates an example of the operation "move underlying layers" 1924 of FIG. 19. In this case, the hangingwall surfaces are already deformed as in FIG. 20b. The interpreter has "left-clicked" on the reference point for hangingwall surface 2044. The horizontal movement of the cursor controls the reference point position, and hence reference depth, for the selected hangingwall surface 2044. All the underlying hangingwall surfaces move in such a way that reference layer thicknesses are preserved. This operation changes the expansion ratio for the layer above hangingwall surface 2044 to 4.60 but leaves all other expansion ratios unchanged FIG. 22d illustrates an example of the operation "move individual surface" 1926 of FIG. 19. In this case, the hangingwall surfaces are already deformed as in FIG. 20b. The interpreter has "left-clicked" on the reference point for hangingwall surface 2044. The horizontal movement of the cursor controls the reference point position, and hence reference depth, for the selected hangingwall surface 2044. No other hangingwall surfaces are modified. By virtue of the individual movement of surface 2044, the expansion ratio for the layer above decreases to 1.00 and the expansion ratio for the layer below increases to 2.35.

Figure 23A:
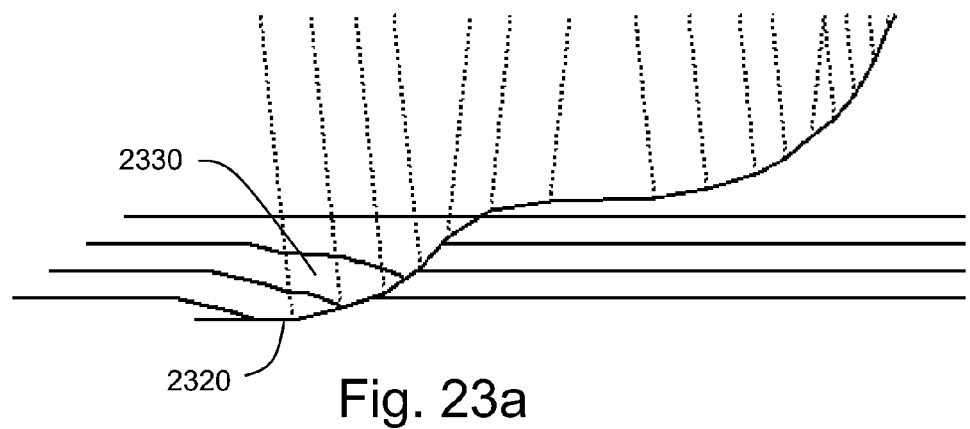
FIGS. 23a through 23c illustrate how the software module can be used to model geologic structures that exhibit both extensional and contractional deformation, according to one embodiment of the invention.
Figure 23B:
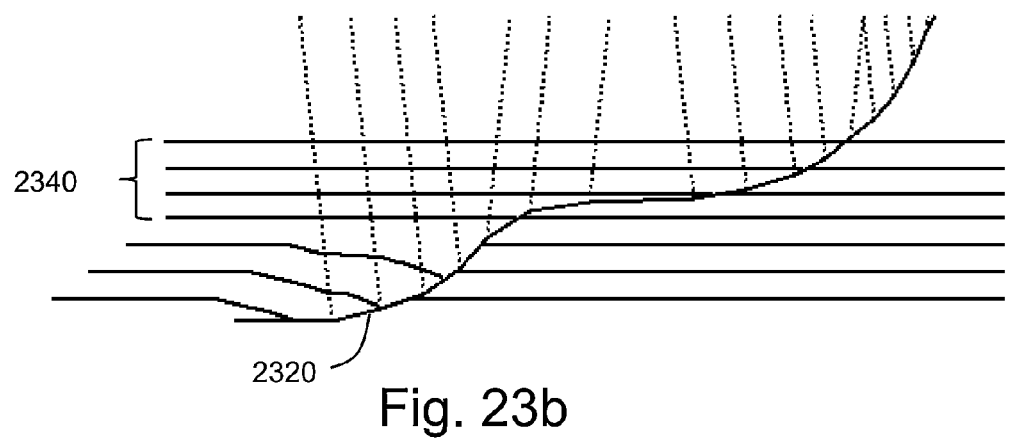
Figure 23C:
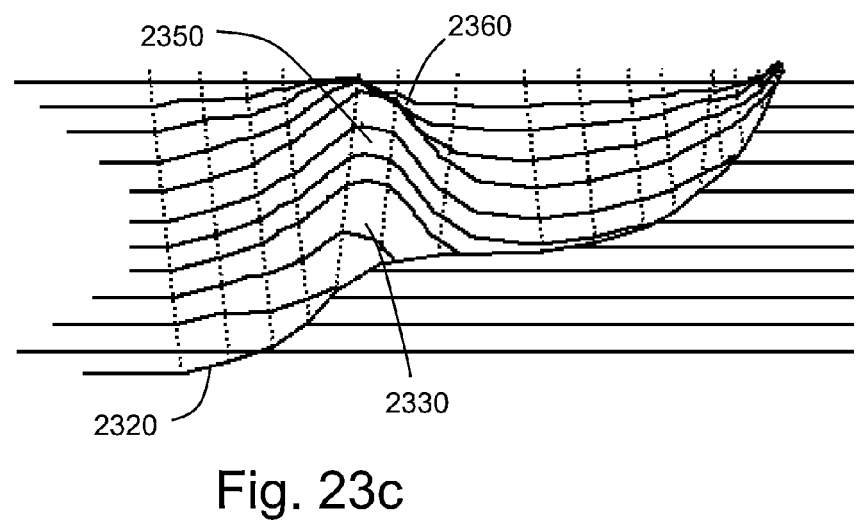

FIG. 23 illustrates how the method and system of the invention can be used to analyze geological structures that exhibit combinations of extensional and contractional deformation. FIGS. 23a through 23c show successive stages of development of a modeled structure associated with a fault 2320, produced by interactively animating structural development (operation 130 of FIG. 1). In an early phase, illustrated by FIG. 23a the movement on fault 2320 is extensional, resulting in "rollover" of "growth strata" 2330 in the hangingwall of the fault 2320. In an intermediate phase, illustrated by FIG. 23b, movement on the fault 2320 ceases and strata accumulate with equal thickness 2340 on both hangingwall and footwall sides of the fault 2320. In a final phase, illustrated by FIG. 23c, movement on fault 2320 reverses and becomes contractional. The growth strata 2330 associated with the early extension are "inverted". A contractional fault bend fold 2350 forms above the lower ramp in fault 2320 and there is stratal thinning in the forelimb 2360 of the "compressional growth structure" associated with the uppermost strata above the fold 2350. The demonstrated capability to model complex geologic histories in a straightforward way is useful for interpreters working in "inverted basins" and in deepwater thrust belts among other areas.

Figure 24A:
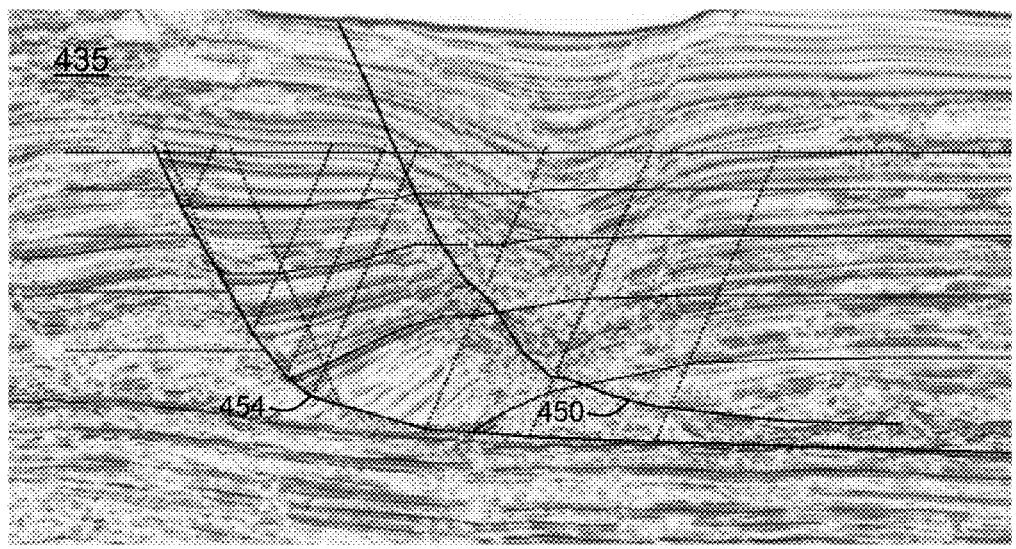
FIGS. 24a and 24b illustrate how the software module can be used to analyze a complex structure with multiple faults, according to one embodiment of the invention.
Figure 24B:
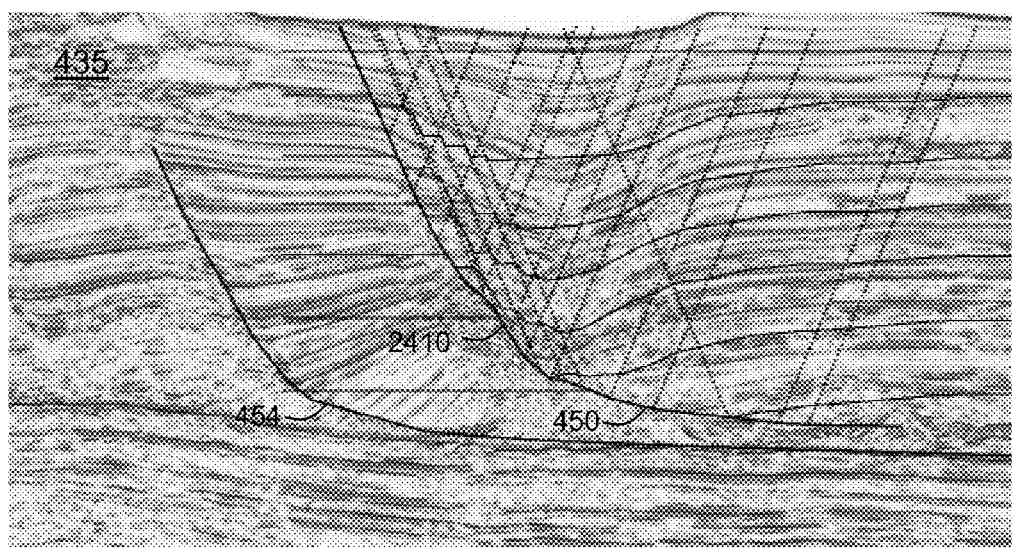

FIGS. 24a and 24b show how the method and system of the invention can be used to analyze a complex structure with multiple faults. The example is based on the same earth profile 435 and fault interpretation illustrated in FIG. 4. Most of the structural development can be modeled using two faults, 454 and 450.

FIG. 24a illustrates a structural model developed for the left fault 454 that is overlain on the earth profile 435. Fault 454 soles into a regional detachment. The net effect of growth across this fault is simple "rotational" fanning of geological strata represented by seismic reflection events. The modeled hangingwall structural surfaces match the configuration of observed seismic reflections between the faults 454 and 450. The structural model establishes the correlation of strata across fault 454.

FIG. 24b illustrates a structural model developed for the right fault 450 that is overlain on the earth profile 435. Fault 450 also soles into a regional detachment. The fault 450 has a convex pillowed shape 2410 superimposed on its overall listric shape (probably associated with movement on the fault 454). The modeled hangingwall structural surfaces match the configuration of observed seismic reflections in the hangingwall of fault 450. The structural model establishes the correlation of strata across fault 450. Synthetic shear surfaces associated with the fault pillow 2410 produce the pronounced syncline in the hangingwall strata of fault 450, as represented by the seismic reflection events within the earth profile 435.

Data Model for the Solution Object—FIGS. 25-31

The solution object 360 within the software module 300 (FIG. 3) comprises a hierarchy of data objects, which are illustrated in progressive levels of detail in FIGS. 25 through 31.

Figure 25:
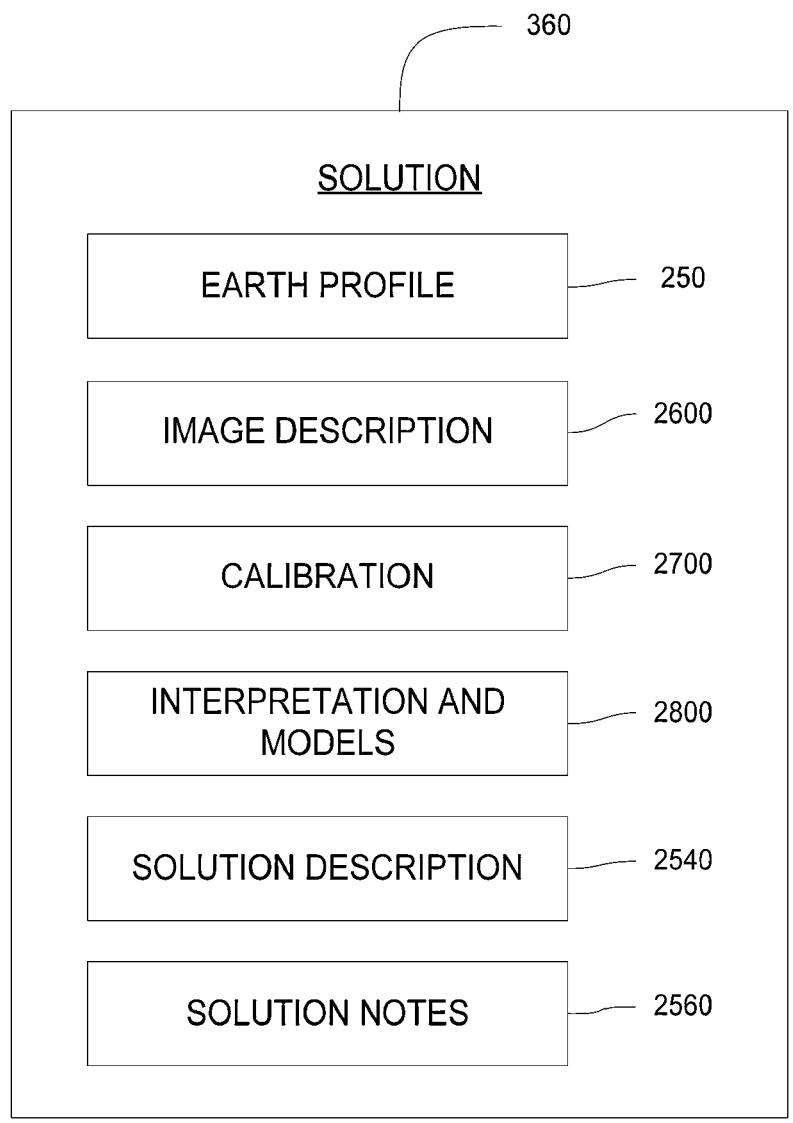
FIG. 25 illustrates a block diagram illustrating the principal components in the solution object 360 of FIG. 3, according to one embodiment of the invention.

FIG. 25 illustrates the solution object 360 itself comprising:
  An earth profile 250 in appropriate image or bitmap format.
  An image description object 2600 which contains information sufficient to characterize the earth profile 250, as will be described in more detail below in narrative associated with FIG. 26.
  A calibration object 2700 which contains information sufficient to transform in both directions between display and real world coordinates, as will be described in more detail below in narrative associated with FIG. 27.
  An interpretation and models object 2800 which contains information to describe an interpretation in its entirety together with associated structural models, as will be described in more detail below in narrative associated with FIG. 28.
  A solution description object 2540 which contains appropriate metadata about the solution, the earth profile 250, the asset class and the interpreter and his or her organization.
  Solution notes 2560 containing textual information about the solution as entered by the interpreter.

Figure 26:
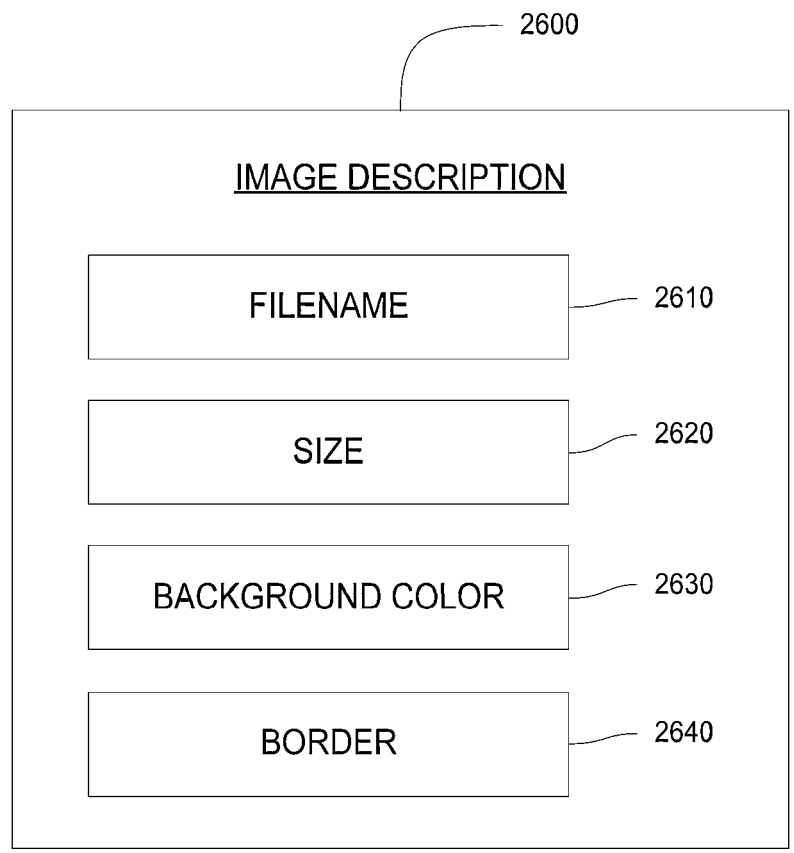
FIG. 26 illustrates a block diagram illustrating the principal components in the image description object 2600 of FIG. 25, according to one embodiment of the invention.

FIG. 26 illustrates the image description object 2600 comprising:
  The filename 2610 from which the image containing the earth profile 250 was originally obtained.
  The size 2620 of the earth profile 250 in pixels wide and pixels high.
  The background color 2630 of the border around the displayed image of the earth profile 250.
  The border 2640 around the image in pixels wide and pixels high.

Figure 27:
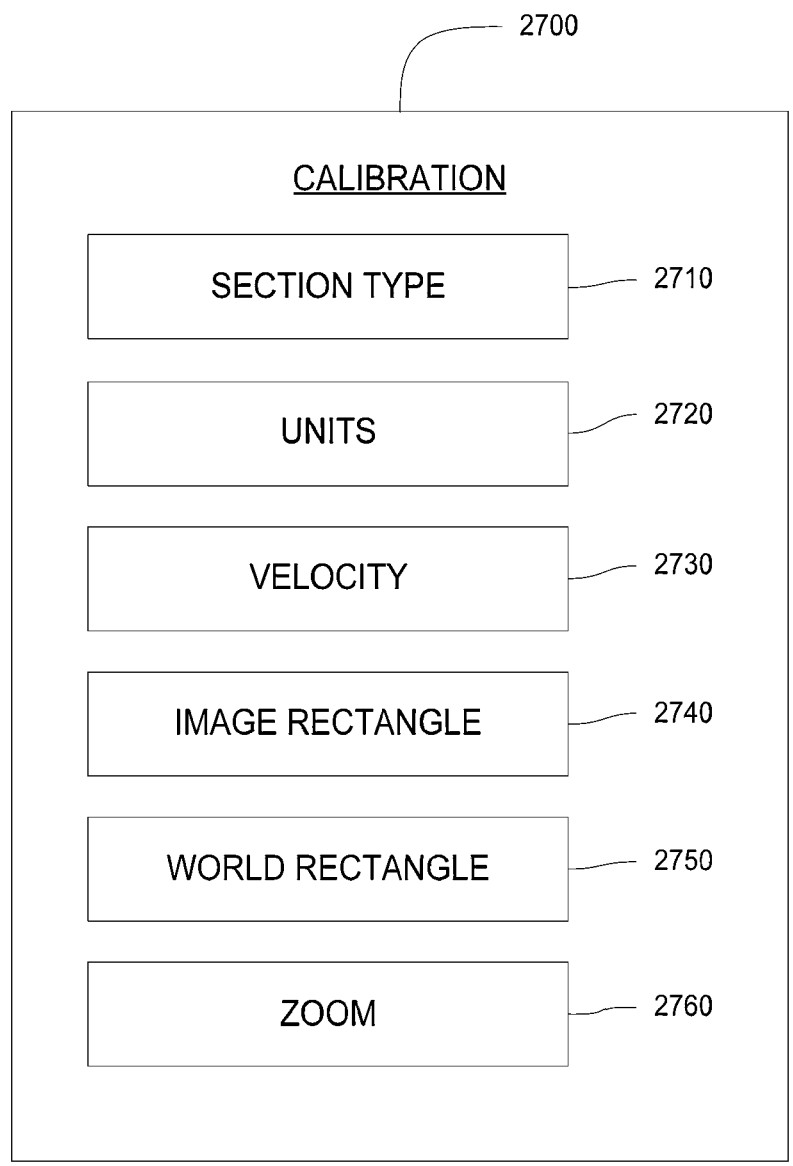
FIG. 27 illustrates a block diagram illustrating the principal components in the calibration object 2700 of FIG. 25, according to one embodiment of the invention.

FIG. 27 illustrates the calibration object 2700 comprising:
  The section type 2710 for the earth profile 250, designating whether the vertical axis is in depth or two-way seismic reflection time.
  The units 2720 for the horizontal distance and vertical depth as in meters or feet.
  The velocity 2730 for conversion between seismic reflection time and depth, if necessary.
  An image rectangle 2740 within the image representing the earth profile 250.
  A world rectangle 2750 in real world coordinates corresponding to the image rectangle 2740.
  The zoom 2760 designating display zoom factors in X and Y directions.

Figure 28:
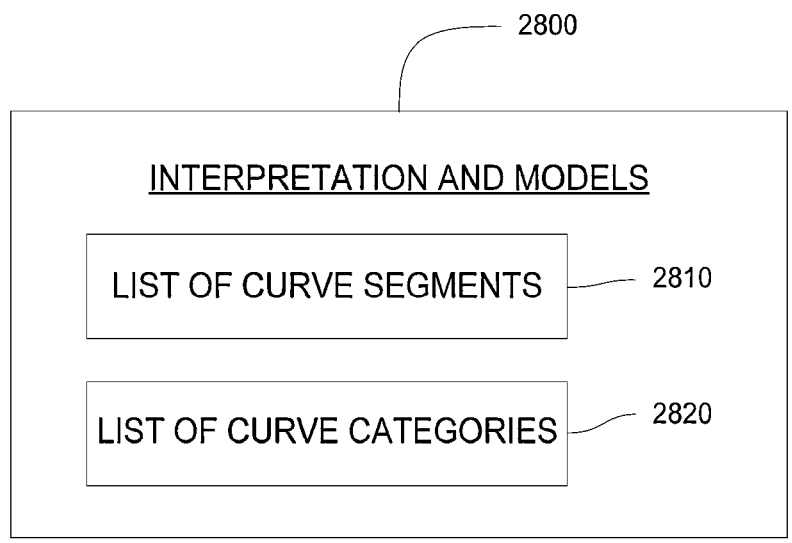
FIG. 28 illustrates a block diagram illustrating the principal components in the interpretation and models object 2800 of FIG. 25, according to one embodiment of the invention.

FIG. 28 illustrates the interpretation and models object 2800 comprising:
  A list 2810 of curve segment 3000 objects as will be described in more detail below in narrative associated with FIG. 30. Any structural models associated with faults are contained subordinately within this list.
  A list 2820 of curve category 2900 objects as will be described in more detail below in narrative associated with FIG. 29.

Figure 29:
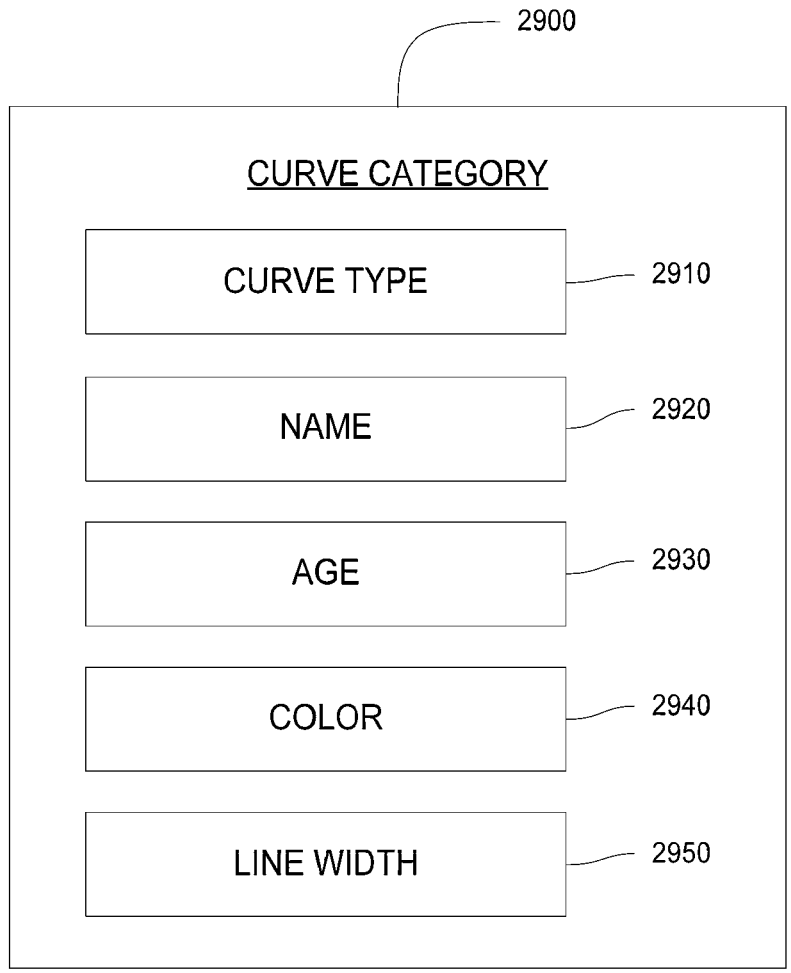
FIG. 29 illustrates a block diagram illustrating the principal components in the curve category object 2900, according to one embodiment of the invention.

FIG. 29 illustrates the curve category object 2900 comprising:
  A curve type 2910 designating whether the curve category represents a Fault or Horizon, or Modeled Structural Surface
  A name 2920 describing the curve category.
  An age 2930 representing the age of deposition in the case that the curve category represents a Horizon, or Modeled Structural Surface.
  A color 2940 which can be used to display curve segments belonging to the curve category.
  A line width 2950 which can be used to display curve segments belonging to the curve category.

Figure 30:
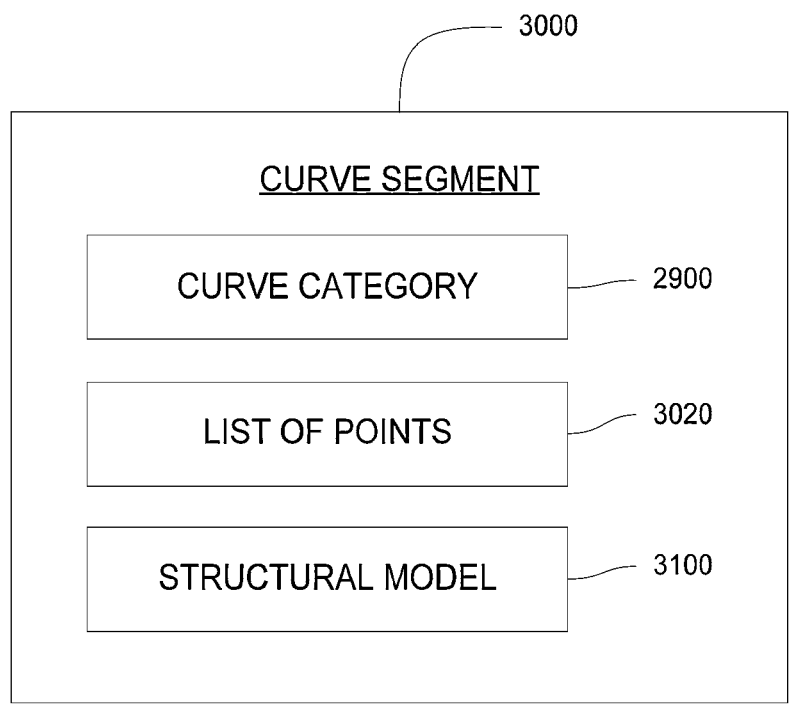
FIG. 30 illustrates a block diagram illustrating the principal components in the curve segment object 3000, according to one embodiment of the invention.

FIG. 30 illustrates the curve segment object 3000 comprising:
  The curve category 2900 to which the curve segment belongs.
  A list of points 3020 designating the (X, Y) coordinates of curve segment vertices.
  A structural model 3100 if the curve segment is a fault and has an associated structural model 3100 defined.

Figure 31:
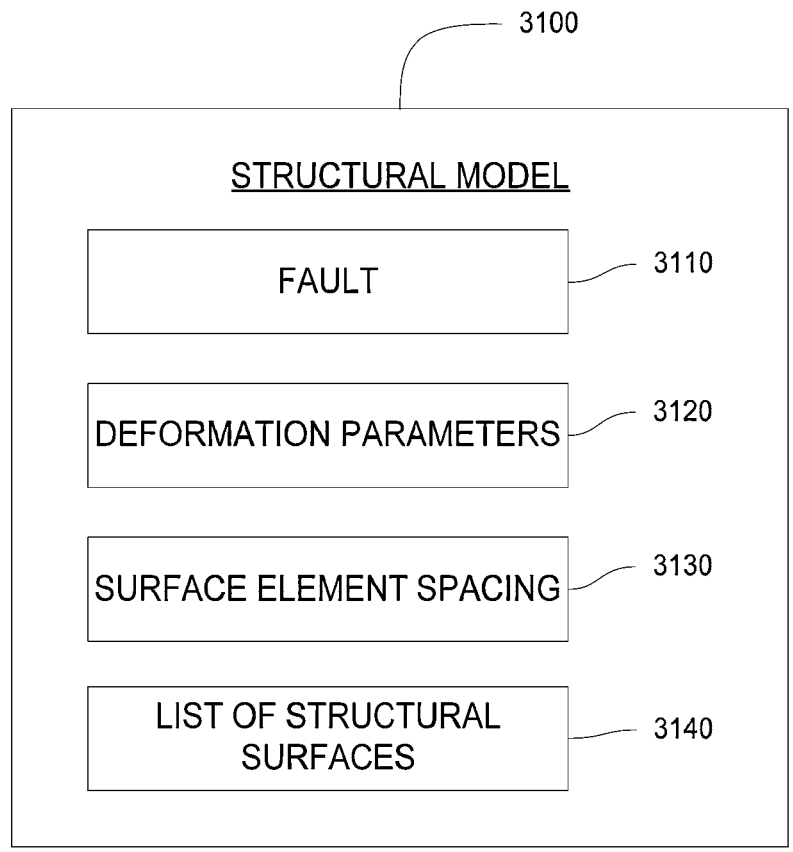
FIG. 31 illustrates a block diagram illustrating the principal components in the structural model object 3100, according to one embodiment of the invention.

FIG. 31 illustrates the structural model object 3100 comprising:
  A reference to the Fault 3110 with which the structural model 3100 is associated.
  Deformation parameters 3120 for the structural model 3100, for example the coulomb collapse angle.
  The surface element spacing 3130 for elements within structural surfaces.
  An ordered list 3140 of structural surface 3200 objects progressing from deepest to shallowest.

Figure 32:
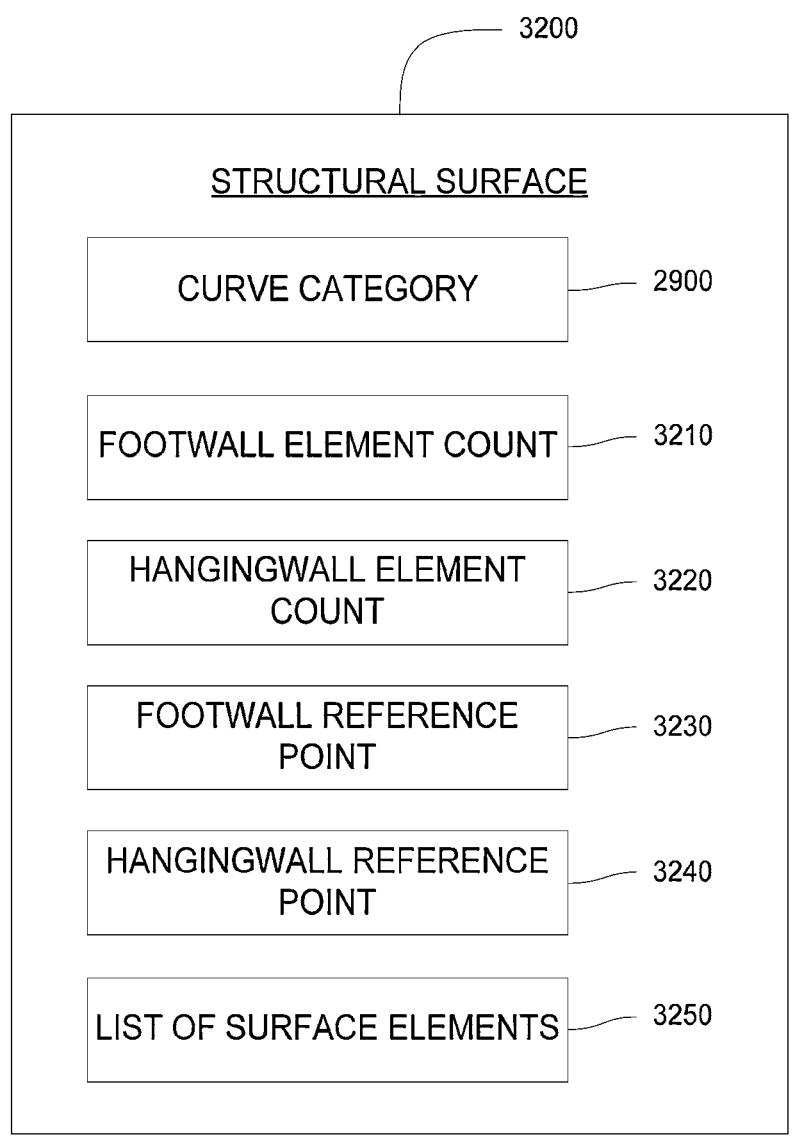
FIG. 32 illustrates a block diagram illustrating the principal components in the structural surface object 3200, according to one embodiment of the invention.

FIG. 32 illustrates the structural surface object 3200 comprising:
  The curve category 2900 to which the structural surface 3200 belongs.
  The footwall element count 3210 giving how many surface elements there are in the footwall part of the structural surface 3200.
  The hangingwall element count 3220 giving how many surface elements there are in the footwall part of the structural surface.
  The footwall reference point 3230 giving the (X, Y) coordinates of the footwall reference point.
  The hangingwall reference point 3240 giving the (X, Y) coordinates of the hangingwall reference point.
  An ordered list 3250 of surface elements each surface element being a point giving the (X, Y) coordinates of a point on the surface, progressing from the footwall to the hangingwall side of the fault.

Format of Solution File

The software module 300 encodes the solution object 360 (FIGS. 3 and 25) into a solution file 260 (FIG. 2) via the modalities and methods of the Open Packaging Convention defined by Microsoft Corporation.

The format of the solution file 360 consists of a "zipped package" of primary file parts corresponding to the highest level data objects 2500, 2600, 2700, 2800, 2540 and 2560 within the solution data object 360 (FIG. 25), together with secondary file parts required by the Open Packaging Convention.

First, the software module 300 creates the primary file parts in the following formats:
  JPEG format for the earth profile object 250 (FIG. 25).
  XML format for the image description object 2600 (FIG. 26).
  XML format for the calibration object 2700 (FIG. 27).
  XML format for the interpretation and models object 2800 and its component objects 2810 through 3140 in hierarchical descending order (FIGS. 28-31).
  XML format for the solution description object 2540 (FIG. 25).
  TXT format for the solution notes object 2560 (FIG. 25)

Second, the software module 300 adds additional parts and encoding required by the Open Packaging Convention to create a package representing the totality of data in the solution object 360.

Third, the software module 300 "zips" the resulting package into a single file, thereby further encoding and compressing the data.

In operation 140 (FIG. 1) the software module 300 writes the current solution object 360 (FIG. 3) to a solution file 260 (FIG. 2) in the file format described above. The file format, which is designated as the "STRUCTX" file format, is uniquely designed to support the method and system of the invention. Additionally, the STRUCTX file format is efficient in terms of storage requirements and is portable across computer systems. The STRUCTX file format delivers a data structure that is embodied in computer-readable media.

In operation 115 (FIG. 1) the software module 300 reads a solution file 260 (FIG. 2), and decodes it into a solution object 360 (FIG. 3) by reversing the procedure described above.

Figure 33:
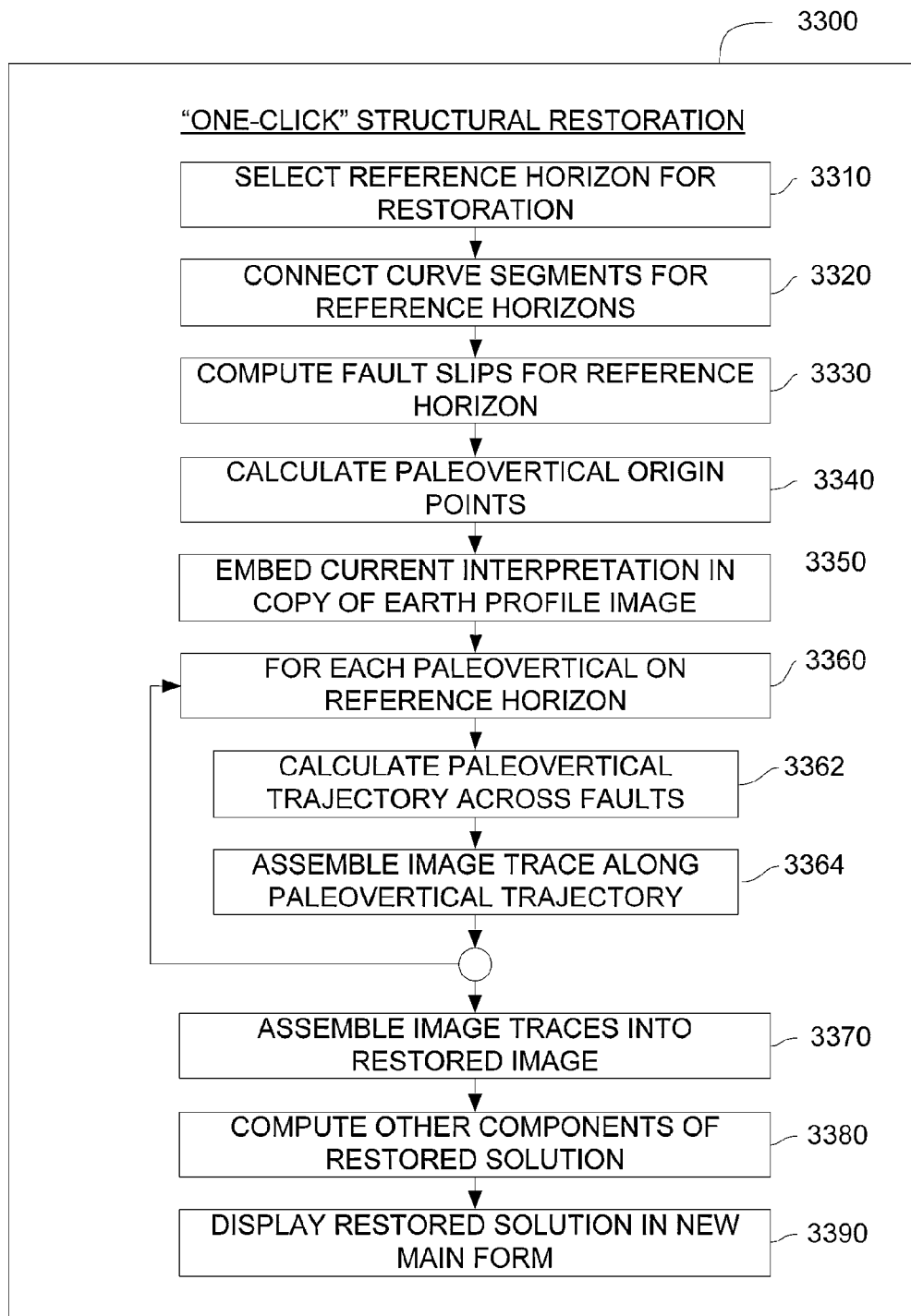
FIG. 33 is an operational flow diagram showing the plurality of subordinate operations comprising the operation 3300 of FIG. 1 for "one-click" structural restoration, according to one embodiment of the invention.
Figure 34:
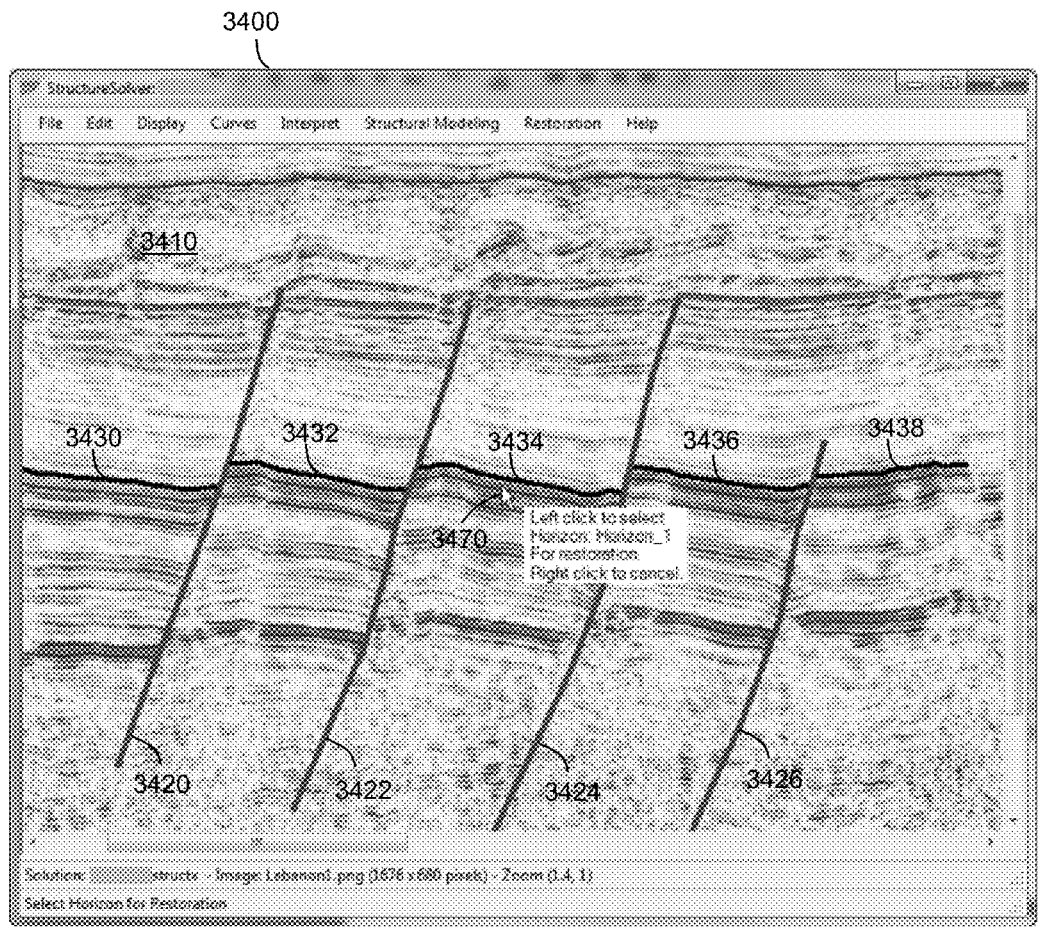
FIG. 34 illustrates a display of the main form of the software module as the interpreter prepares to select a reference horizon for "one-click" structural restoration, according to one embodiment of the invention.
Figure 35:
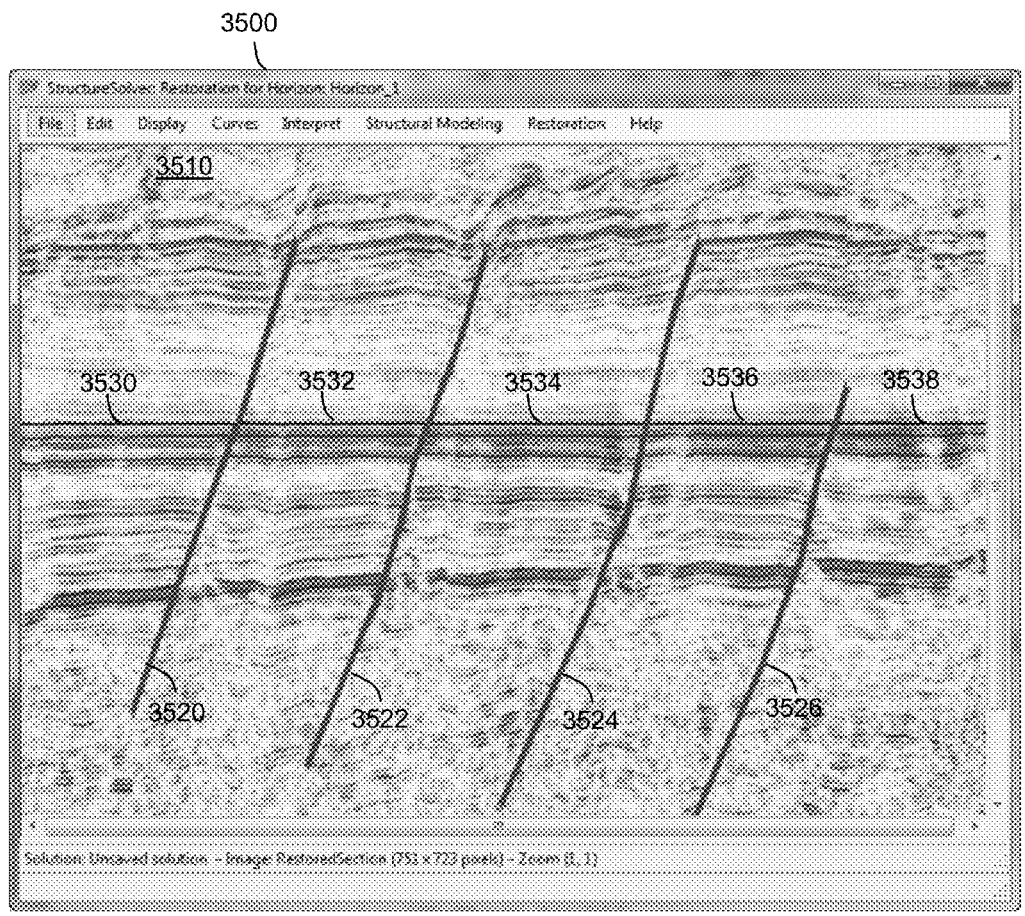
FIG. 35 illustrates a display of a new main form containing the results of "one-click" restoration, according to one embodiment of the invention.

"One-click" Structural Restoration—FIGS. 33-35

FIG. 33 shows the key operational steps within the operation of "one click restoration 3300. All of these steps are managed and performed by the restoration manager 358 (FIG. 3) with interactive input from an interpreter. In the software module 300 (FIG. 3), the restoration manager 358 functions within the main event loop under direction from the orchestrator 350, as the manner above. The algorithmic approach is an adaptation of the method of "paleoverticals" described by Nunns (1991).

Referring to FIG. 33, in operation 3310, the interpreter selects a "reference horizon" for restoration. The reference horizon corresponds to the surface of deposition at the point in geologic time represented by the structural restoration. The interpreter selects the reference horizon by moving the cursor over the graphical window 330 (FIG. 3). The software module 300 highlights the closest interpreted curve segment that is of a horizon type. The interpreter left clicks the highlighted curve segment to select it as a representative of the reference horizon. The reference horizon will typically comprise a plurality of curve segments all belonging to the same curve category, which has been identified by the interpreter's selection. The plurality of curve segments will typically be separated by a plurality of interpreted faults that dissect and displace the reference horizon.

In operation 3320, the software module 300 assembles all of the curve segments belonging to the reference horizon. The software module 300 connects the segments in an order that is geologically reasonable using the relative distances between segment end points and related topological criteria.

In operation 3330, the software module 300 finds the intersections between the connected reference horizon and the plurality of interpreted faults. By appropriate projection the software module 3330 determines the slip, that is, the displacement, of the reference horizon across each fault that displaces it.

In operation 3340, the software module 300 calculates the equally-spaced origin points of "paleoverticals" along the reference horizon, taking fault gaps into account.

In operation 3350, the software module 300 embeds a graphical representation of the current interpretation and models into a copy of the earth profile, so that a representation of the interpretation and models will be restored along with the image of the original earth profile.

In the operational loop 3360, the software module 300 iterates over each paleovertical originating from the reference horizon.

In the paleovertical operation 3362, the software module 300 calculates the geometric trajectory of a paleovertical by tracing through the plurality of interpreted faults and successively displacing the paleovertical across the closest fault by a distance equal to the slip of the reference horizon on that fault.

In paleovertical operation 3364, the software module 300 computes an image trace along the paleovertical trajectory by means of extracting appropriately interpolated samples from within the augmented copy of the earth profile that was created in operation 3350.

In operation 3370, the software module 300 assembles all of the image traces, corresponding to the totality of computed paleovertical trajectories, into a new image that represents a structurally restored version of the augmented copy of the earth profile that was created in operation 3350.

In operation 3380, the software module 300 computes other components of a solution object for the restoration, including appropriate values for its calibration object.

In operation 3390, the software module 300 instantiates a new main form 380 that manages a new solution containing the restored version of the original earth profile. The new main form 380 is displayed independently of the original main form 310 on the display device 240 of the computer system 200.

Because the structural restoration is instantiated in a new main form 380 that is fully functional, the method and system of the invention can support multiple, sequential structural restoration.

Example of "One-Click" Structural Restoration

FIG. 34 illustrates a main form 3400 produced by the software module 300. The displayed earth profile 3410 is a seismic reflection section representing a faulted geological structure. A plurality of curve segments 3430 through 3438 has been interpreted, separated by a plurality of interpreted faults, 3420 through 3426. The order and direction of the interpreted horizon and fault curve segments is arbitrary.

The interpreter has indicated by a menu selection that he or she wishes to perform a structural restoration. He or she is moving the cursor, and the software module 300 is highlighting the reference horizon comprised of the curve segments 3430 through 3438.

As soon as the interpreter "left clicks" on the selected reference horizon, the software module produces a structural restoration in a new main form 3500, as illustrated in FIG. 35. In the main form 3500 the earth profile 3510 is a restored version of the earth profile 3410 with the restored interpretation graphically embedded. The restored version of the reference horizon is flat as represented by the segments 3530 through 3538. An appropriate amount of slip has been removed across each fault. The restored faults are represented by the segments 3520 through 3526. The restoration has been performed "above and below" the reference horizon which is one option in operation 3300. Another option is to perform the restoration only below the reference horizon. The excellent continuity of seismic reflection events in the restored earth profile confirms the validity of the original interpretation shown in FIG. 34.

Embodiments and Versions

In the embodiment of the method and system of the invention that we have described above, the structural forward modeling theory described by Xiao and Suppe (1992) is used as a scientific basis in designing the algorithm employed in the operation 1300 (FIGS. 12 and 13) wherein the structural model is instantaneously computed. This theory works very well for a wide variety of extensional fault systems in extensional sedimentary basins. If the shear angle (1590 in FIGS. 15a and 15b) is adjusted to be close to 90 degrees, then the theory also works well for contractional fault systems in sedimentary basins, as is shown in the example illustrated in FIG. 23.

The novelty and usefulness of the method and system of the invention lie in the tight integration of interactive interpretation and modeling of real world data. The method and system of the invention allows the interpreter to readily modify both the interpretation and the controls on the structural model and render results instantaneously in real time. The incorporation of an algorithm based on the theory of Xiao and Suppe (1992) is illustrative rather than exclusive of possibilities that will be apparent to one skilled in the art.

In other embodiments of the method and system of the invention, a plurality of algorithms based on varied theoretical bases for structural modeling can be implemented as alternatives within operation 1300. For example, algorithms based on the theories described by Medwedeff and Suppe (1997), Allmendinger (1998), Zehnder and Allmendinger (2006) can be adapted as alternative methods of modeling contractional fault systems in sedimentary basins. These publications are incorporated herein by reference, but do not represent a comprehensive inventory of sources for theories of structural modeling that are adaptable to the method and system of the invention.

Adaptation of alternative algorithms for structural modeling may require some adaptations to the operation 1900 (FIGS. 12 and 19) and its subordinate operations 1920 through 1930 in which the creation and modification of structural surfaces is interactively controlled, but these adaptations will be obvious to one skilled in the art without undue experimentation.

The previously described versions of the present invention have many advantages. All the advantageous features and all the advantages need not be incorporated into every embodiment of the invention.

Further, although the present invention has been described in considerable detail with reference to certain preferred versions thereof, other versions are possible. For example, the present invention can support and adapt various geologic models which have been previously described in this disclosure. Therefore, the spirit and scope of the invention should not be limited to the description of the preferred versions contained herein. The reader's attention is directed to all papers and documents which are incorporated herein by reference. All the features disclosed in this specification (including in any accompanying abstract and drawings and incorporated references) may be replaced by alternative features serving the same, equivalent or similar purpose, unless expressly stated otherwise. Thus, unless expressly stated otherwise, each feature disclosed is one example only of a generic series of equivalent or similar features.

I claim:

1. A computer-implemented method for an interactive analysis of geological structures by an interpreter using a computer system and a software module, the method comprising:
   (a) importing an earth profile comprising a digital image of one or more geologic structures;
   (b) displaying said earth profile;
   (c) interpreting and modeling said one or more geologic structures by operations comprising:
      creating and modifying an interpretation, said interpretation comprising faults and horizons observed and inferred in said earth profile;
      creating and modifying one or more structural models, said one or more structural models embodying principles of syndepositional fault-related folding, said operation of creating and modifying one or more structural models further comprising:
         specifying one or more faults selected for modeling from said interpretation;
         associating one of said one or more structural models with each of said one or more faults selected for modeling;
         controlling deformation mechanisms applying within each of said one or more structural models;
         specifying controls for one or more structural surfaces within each of said one or more structural models;
         computing configurations instantaneously of said one or more structural models by computations incorporating said principles and further depending on: configurations of said one or more faults selected for modeling; said deformation mechanisms; and said controls for one or more structural surfaces; and
         computing instantaneously errors and warnings related to said one or more structural models;
   (d) encapsulating digitally a state of analysis as a solution comprising contents:
      said earth profile;
      ancillary data related to calibration and display of said earth profile;
      said interpretation;
      said one or more structural models; and
      additional notes and descriptions;
   (e) updating said solution after each operation that changes said contents;
   (f) updating instantaneously a graphical display by overlaying said interpretation and said one or more structural models over said earth profile together with a display of said errors and warnings, wherein said graphical display varies in response to said operations of: creating and modifying said interpretation; and
   creating and modifying said one or more structural models; and
   (g) repeating any or all of said operations of interpreting and modeling said one or more geologic structures until there exists a match between said interpretation and said one or more structural models and said earth profile.

2. The computer-implemented method of claim 1 wherein said interpretation further comprises one or more curve segments representing configurations of faults and horizons in said interpretation and one or more curve categories describing attributes assigned to said one or more curve segments, wherein creating and modifying said interpretation comprises one or more of:
   (a) creating a new curve category describing a fault or a horizon within said interpretation and adding said new curve category to said interpretation;
   (b) redefining attributes of a curve category within said interpretation;
   (c) deleting a curve category from said interpretation;
   (d) establishing an active curve category by specifying a curve category within said interpretation or by identifying a curve category corresponding to a curve segment within said interpretation;
   (e) drawing a new curve segment assigned to said active curve category;
   (f) adding said new curve segment to said interpretation;
   (g) modifying a shape of a curve segment within said interpretation;

(h) adding one or more points to a curve segment within said interpretation;
(i) deleting one or more points from a curve segment within said interpretation;
(j) reassigning a curve segment within said interpretation to a different curve category; and
(k) deleting a curve segment from said interpretation.

3. The computer-implemented method of claim 2, further comprising:
(a) specifying controls for one or more structural surfaces by operations comprising for each of said one or more structural surfaces:
  determining a fault selected for modeling that is associated with said structural surface; and
  specifying for each said structural surface a footwall reference point in a footwall of said fault selected for modeling and a hangingwall reference point in a hangingwall of said fault selected for modeling;
(b) using said controls in operations comprising one or more of:
  adding a new structural surface to said one or more structural models;
  selecting a structural surface from within said one or more structural models and identifying said structural surface;
  selecting a structural surface from within said one or more structural models and stretching overlying layers above said structural surface;
  selecting a structural surface from within said one or more structural models and moving underlying layers below said structural surface;
  selecting a structural surface from within said one or more structural models and moving said structural surface;
  selecting a structural surface from within said one or more structural models and deleting said structural surface; and
  selecting a structural surface from within said one or more structural models and modifying attributes of said structural surface; and
(c) computing configurations instantaneously of said one or more structural models depending on any of one or more conditions comprising:
  changing count of said one or more faults selected for modeling;
  changing configurations of said one or more faults selected for modeling;
  changing said deformation mechanisms for said one or more structural models; and
  changing said controls for said one or more structural surfaces.

4. The computer-implemented method of claim 3 wherein:
(a) controlling deformation mechanisms applying within said one or more structural models comprises specifying for each said fault selected for modeling, one or more shear angles in a hangingwall of each said fault; and
(b) computing instantaneously configuration of said one or more structural models further comprises for each said fault selected for modeling:
  defining a plurality of shear axes and a plurality of shear vectors for said fault depending on configuration of said fault and said principles;
  iterating over each structural surface associated with said fault performing computations comprising:
    defining a plurality of footwall surface elements representing said structural surface in footwall of said fault;
    defining a plurality of hangingwall surface elements representing said structural surface in hangingwall of said fault;
    defining a reference displacement vector for said structural surface corresponding to a displacement of a hangingwall reference point for said structural surface; and
    iterating over each of said hangingwall surface elements performing computations comprising:
      defining an initial displacement vector for each said hangingwall surface element; and
      tracing said initial displacement vector through said plurality of shear axes and adding appropriately scaled versions of said plurality of shear vectors thereby defining a deformed position for each said hangingwall surface element.

5. The computer-implemented method of claim 2 further comprising creating, at any point during said operation of interpreting and modeling, a structural restoration of said earth profile; said interpretation; and said one or more structural models, said structural restoration representing a likely structural configuration at a time in the geological past, by operations comprising:
(a) selecting from said interpretation a reference horizon for restoration, said reference horizon corresponding to a surface of deposition at said time in the geologic past;
(b) connecting curve segments in said interpretation for said reference horizon;
(c) computing fault slips for said reference horizon where said reference horizon crosses faults in said interpretation;
(d) calculating origin points of paleoverticals along said reference horizon;
(e) embedding a graphical representation of said interpretation and said one or more structural models in a copy of said earth profile;
(f) for each of said origin points of paleoverticals;
  calculating a paleovertical trajectory across faults in said interpretation; and
  assembling an image trace along said paleovertical trajectory;
(g) assembling each of said image traces into a restored image representing said structural restoration;
(h) creating a restored solution using said restored image as an earth profile for said restored solution;
(i) computing one or more additional components of said restored solution; and
(j) displaying and operating upon said restored solution.

6. The computer-implemented method of claim 1 further comprising:
(a) saving a copy of said solution each time a significant operation has been completed;
(b) undoing via an undo operation one or more of said significant operations; and
(c) redoing via a redo operation one or more significant operations that have previously been undone.

7. The computer-implemented method of claim 1 further comprising creating an animation depicting structural development forward or backward through geologic time by operations comprising:
(a) storing a copy of said solution for later retrieval and reinstatement;
(b) selecting a structural model for animation from said one or more structural models;
(c) specifying a speed and a direction of said animation;
(d) animating through a sequence of frames by operations comprising for each said frame:

creating an intermediate structural model appropriate to each said frame by manipulating controls of structural surfaces associated with said structural model selected for animation;

computing configuration instantaneously of said intermediate structural model; and updating instantaneously said graphical display, thereby displaying said intermediate structural model for each said frame in sequence; and (e) replacing said solution with said stored copy of solution upon completion of said animation.

8. The computer-implemented method of claim 1 further comprising:

(a) packaging said contents of said solution according to a data packaging protocol and writing said packaged contents as a solution file;

(b) transmitting said solution file to external parties and systems to communicate said state of analysis; and (c) reading said solution file at a later time to continue analysis from said state of analysis.

9. A computer system for interactive analysis of geological structures adapted for storing and executing a software module and further adapted for continuous interactive control of said software module, and continuous graphical display of results, said computer system comprising:

(a) storage for storing: system software; an earth profile; a solution file; and said software module configured to perform operations comprising:

importing an earth profile comprising a digital image of one or more geologic structures;

displaying said earth profile;

interpreting and modeling said one or more geologic structures by operations comprising:

creating and modifying an interpretation, said interpretation comprising faults and horizons observed and inferred in said earth profile;

creating and modifying one or more structural models, said one or more structural models embodying principles of syndepositional fault-related folding, said operation of creating and modifying one or more structural models further comprising:

specifying one or more faults selected for modeling from said interpretation;

associating one of said one or more structural models with each of said one or more faults selected for modeling;

controlling deformation mechanisms applying within each of said one or more structural models;

specifying controls for one or more structural surfaces within each of said one or more structural models;

computing configurations instantaneously of said one or more structural models by computations incorporating said principles and further depending on: configurations of said one or more faults selected for modeling; said deformation mechanisms; and said controls for one or more structural surfaces; and computing instantaneously errors and warnings related to said one or more structural models;

updating instantaneously a graphical display by overlaying said interpretation and said one or more structural models over said earth profile together with a display of said errors and warnings, wherein said graphical display varies in response to said operations of: creating and modifying said interpretation; and creating and modifying said one or more structural models; and repeating any or all of said operations of interpreting and modeling said one or more geologic structures until there exists a match between said interpretation and said one or more structural models and said earth profile;

(b) processors configured to execute said system software and said software module;

(c) a set of peripheral devices and network connections configured for: providing input to said storage; providing output from said storage;

providing interactive control of operations of said computer system and said software module by continuously detecting events comprising cursor movements, button clicks and text inputs; and displaying results of operations performed in said software module; and (d) a system interconnect and interface between said storage, said processors and said set of peripheral devices and network connections.

10. The computer system of claim 9, wherein said software module further comprises:

(a) a main form, said main form being a software object with a representation in a graphical display, said main form configured to perform operations comprising:

instantiating and managing a plurality of subordinate objects; and handling interactive events comprising:
selections from a menu system;
cursor movements in a graphical window; and
button clicks in said graphical window;

(b) an orchestrator object configured for commanding one or more manager objects to initiate, continue, or complete primary interactive operations corresponding to said selections from said menu system, depending on said interactive events;

(c) one or more manager objects, each configured for updating contents of a solution object by operations depending on said cursor movements, said button clicks and further depending on information obtained through dialog box interactions;

(d) said solution object encapsulating a state of analysis computed by said software module, said solution object comprising:

said earth profile;
ancillary data related to calibration and display of said earth profile;
said interpretation;
said one or more structural models; and
additional notes and descriptions; and (e) a draftsman object configured to perform said operation of updating instantaneously a graphical display and further configured to render instantaneously status updates and instructions in a status and instruction bar.

11. The computer system of claim 10 wherein data components of said solution object comprise:

(a) said earth profile in bitmap or image format;

(b) a description of said earth profile comprising:
a name of a file from which said earth profile was originally obtained;
an image size of said earth profile;
a background color of a border around said earth profile; and
dimensions of said border around said earth profile;

(c) a calibration object containing information sufficient to transform in both directions between display and real world coordinates, comprising:
a section type designating whether the vertical axis is in depth or two-way seismic reflection time;
units of measurement;

a velocity for conversion between seismic reflection time and depth;
a calibration rectangle in image coordinates;
a calibration rectangle in world coordinates; and
a zoom designating display zoom factors in X and Y directions;
(d) one or more curve category objects, each curve category object representing a curve category in said interpretation, comprising:
a designation of whether said curve category describes a fault or a horizon;
a name of said curve category;
a geologic age corresponding to said curve category;
a display color for said curve category; and
a display line width for said curve category; and
(e) one or more curve segment objects, each curve segment object representing a curve segment in said interpretation, comprising:
a reference to a curve category to which said curve segment belongs;
a list of points designating coordinates of vertices of said curve segment;
conditionally on said curve segment representing a fault with an associated structural model, a structural model object representing said structural model, comprising:
one or more deformation parameters for said structural model;
one or more surface element spacing parameters;
one or more structural surface objects, each said structural surface object representing a structural surface associated with said structural model, comprising:
a curve category object describing said structural surface;
a count of footwall surface elements in said structural surface;
a count of hangingwall surface elements in said structural surface;
a footwall reference point for said structural surface;
a hangingwall reference point for said structural surface; and
a list of surface elements comprising said structural surface.

12. The computer system of claim 11, wherein:
(a) said solution file comprises said data components packaged in external file format according to a data protocol;
(d) said solution file is transmittable to external parties and systems thereby communicating a state of analysis; and
(e) said solution file is readable at a later time to continue an analysis from said state of analysis.

13. The computer system of claim 10, said one or more manager objects comprising:
(a) an input output manager object configured to perform operations of reading a file containing said earth profile, reading a solution file, and writing a solution file;
(b) a calibration manager object configured to perform operations of calibrating said earth profile so that said software module has a correct transformation between display coordinates and real world coordinates;
(c) a curve category manager object configured to create and modify one or more curve categories describing faults and horizons within said interpretation, by operations comprising:
creating a new curve category and adding said new curve category to said interpretation;
specifying an active curve category within said interpretation;
redefining attributes of a curve category within said interpretation; and
deleting a curve category from said interpretation;
(d) a curve segment manager object configured to create and modify one or more curve segments representing configurations of faults and horizons in said interpretation, by operations comprising:
drawing a new curve segment assigned to said active curve category;
adding said new curve segment to said interpretation;
modifying a shape of a curve segment within said interpretation;
adding one or more points to a curve segment within said interpretation;
deleting one or more points from a curve segment within said interpretation;
reassigning a curve segment within said interpretation to said active curve category; and
deleting a curve segment from said interpretation;
(e) a model manager object configured to perform said operation of creating and modifying one or more structural models by operations comprising:
specifying controls for one or more structural surfaces by operations comprising for each of said one or more structural surfaces:
determining a fault selected for modeling that is associated with said structural surface; and
specifying for each said structural surface a footwall reference point in a footwall of said fault selected for modeling and a hangingwall reference point in a hangingwall of said fault selected for modeling;
using said controls in operations comprising one or more of:
adding a new structural surface to said one or more structural models;
selecting a structural surface from within said one or more structural models and identifying said structural surface;
selecting a structural surface from within said one or more structural models and stretching overlying layers above said structural surface;
selecting a structural surface from within said one or more structural models and moving underlying layers below said structural surface;
selecting a structural surface from within said one or more structural models and moving said structural surface;
selecting a structural surface from within said one or more structural models and deleting said structural surface; and
selecting a structural surface from within said one or more structural models and modifying attributes of said structural surface; and
computing configurations instantaneously of said one or more structural models depending on any of one or more conditions comprising:
changing count of said one or more faults selected for modeling;
changing configurations of said one or more faults selected for modeling;
changing said deformation mechanisms for said one or more structural models; and
changing said controls for said one or more structural surfaces.

14. The computer system of claim 13 wherein said model manager object is further configured to perform:
 (a) controlling deformation mechanisms applying within said one or more structural models comprising, specifying, for each said fault selected for modeling, one or more shear angles in a hangingwall of each said fault;
 (b) computing instantaneously configuration of said one or more structural models further comprising for each said fault selected for modeling:
  defining a plurality of shear axes and a plurality of shear vectors for said fault depending on configuration of said fault and said principles;
  iterating over each structural surface associated with said fault performing computations comprising:
   defining a plurality of footwall surface elements representing said structural surface in footwall of said fault;
   defining a plurality of hangingwall surface elements representing said structural surface in hangingwall of said fault;
   defining a reference displacement vector for said structural surface corresponding to a displacement of a hangingwall reference point for said structural surface; and
   iterating over each of said hangingwall surface elements performing computations comprising:
    defining an initial displacement vector for each said hangingwall surface element; and
    tracing said initial displacement vector through said plurality of shear axes and adding appropriately scaled versions of said plurality of shear vectors thereby defining a deformed position for each said hangingwall surface element.

15. The computer system of claim 13 wherein said one or more manager objects further comprises an undo manager object configured to manage undoing and redoing of previous interactive operations by:
 (a) managing a "last-in-first-out" undo stack of solution objects;
 (b) managing a "last-in-first-out" redo stack of solution objects;
 (c) pushing a copy of a current solution object onto said undo stack as commanded by said orchestrator object upon completion of each significant operation;
 (d) undoing a most recent operation by operations comprising popping a solution object from said undo stack and pushing said solution object onto said redo stack and then replacing said current solution object with a copy of a solution object at a top of said undo stack; and
 (e) redoing a most recently undone interactive operation by operations comprising popping a solution object from said redo stack and pushing said solution object onto said undo stack and then replacing said current solution object with a copy of a solution object at said top of said undo stack.

16. The computer system of claim 13 wherein said one or more manager objects further comprises an animation manager configured to create an animation depicting structural development forward or backward through geologic time by operations comprising:
 (a) storing a copy of said solution object for later retrieval and reinstatement;
 (b) selecting a structural model for animation from said one or more structural models;
 (c) specifying a speed and a direction of said animation;
 (d) animating through a sequence of frames by operations comprising for each said frame:
  creating an intermediate structural model appropriate to each said frame by manipulating controls of structural surfaces associated with said structural model selected for animation;
  computing configuration instantaneously of said intermediate structural model; and
  updating instantaneously said graphical display, thereby displaying said intermediate structural model for each said frame in sequence; and
 (e) replacing said solution with said stored copy of solution upon completion of said animation.

17. The computer system of claim 13 wherein said one or more manager objects further comprises a restoration manager object configured to create, at any point during said operation of interpreting and modeling, a structural restoration of said earth profile; said interpretation; and said one or more structural models, said structural restoration representing a likely structural configuration at a time in the geological past, by operations comprising:
 (a) selecting from said interpretation a reference horizon for restoration, said reference horizon corresponding to a surface of deposition at said time in the geologic past;
 (b) connecting curve segments in said interpretation for said reference horizon;
 (c) computing fault slips for said reference horizon where said reference horizon crosses faults in said interpretation;
 (d) calculating origin points of paleoverticals along said reference horizon;
 (e) embedding a graphical representation of said interpretation and said one or more structural models in a copy of said earth profile;
 (f) for each of said origin points of paleoverticals;
  calculating a paleovertical trajectory across faults in said interpretation; and
  assembling an image trace along said paleovertical trajectory;
 (g) assembling each of said image traces into a restored image representing said structural restoration;
 (h) creating a restored solution object using said restored image as an earth profile for said restored solution;
 (i) computing one or more additional components of said restored solution object; and
 (j) instantiating a new main form using said restored solution object, wherein said restored image is displayed.

18. The computer system of claim 17 wherein said operation of selecting from said interpretation a reference horizon requires one button click and subsequent operations to create and display said structural restoration occur without need for interaction by an interpreter.

19. The computer system of claim 17 wherein all operations of said software module are independently performable in said new main form.

* * * * *